(12) United States Patent
Manning et al.

(10) Patent No.: US 11,149,108 B1
(45) Date of Patent: Oct. 19, 2021

(54) SELF-ASSEMBLY ASSISTED ADDITIVE MANUFACTURING OF THERMOSETS

(71) Applicant: National Technology & Engineering Solutions of Sandia, LLC, Albuquerque, NM (US)

(72) Inventors: Kylie Manning, Royersford, PA (US); Mathias C. Celina, Albuquerque, NM (US); Adam Cook, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 295 days.

(21) Appl. No.: 16/453,431

(22) Filed: Jun. 26, 2019

Related U.S. Application Data

(60) Provisional application No. 62/690,296, filed on Jun. 26, 2018.

(51) Int. Cl.
| | |
|---|---|
| *C08G 59/22* | (2006.01) |
| *C08G 59/50* | (2006.01) |
| *C08G 71/02* | (2006.01) |
| *B29C 64/264* | (2017.01) |
| *B29C 64/129* | (2017.01) |
| *C08L 63/00* | (2006.01) |
| *C08K 5/21* | (2006.01) |
| *C08K 5/3462* | (2006.01) |
| *B33Y 80/00* | (2015.01) |

(Continued)

(52) U.S. Cl.
CPC ............ *C08G 59/22* (2013.01); *B29C 64/129* (2017.08); *B29C 64/264* (2017.08); *C08G 59/50* (2013.01); *C08G 71/02* (2013.01); *C08K 5/21* (2013.01); *C08K 5/3462* (2013.01); *C08L 63/00* (2013.01); *B33Y 10/00* (2014.12); *B33Y 70/00* (2014.12); *B33Y 80/00* (2014.12)

(58) Field of Classification Search
CPC ......... B33Y 70/00; B33Y 70/10; B33Y 10/00; C08G 59/4021; C08G 59/5073; C08K 5/21; C08K 5/3462; C08L 63/00–10; C09D 163/00–10; C09J 163/00–10; C08J 2363/00–10
See application file for complete search history.

(56) References Cited

U.S. PATENT DOCUMENTS

| | | | |
|---|---|---|---|
| 4,552,933 A | 11/1985 | Sellstrom et al. | |
| 5,536,775 A | 7/1996 | Curatolo et al. | |

(Continued)

FOREIGN PATENT DOCUMENTS

WO  WO 2017/044381 A1  3/2017

OTHER PUBLICATIONS

Cetepox, Nonylphenol-/Benzylalcohol-free CeTePox Hardeners (2008).*

(Continued)

*Primary Examiner* — Kregg T Brooks
(74) *Attorney, Agent, or Firm* — Helen S. Baca; Kevin W. Bieg

(57) ABSTRACT

The present invention relates to formulations including a self-assembly monomer. In particular embodiments, the self-assembly monomer provides a thermoset having beneficial viscoelastic properties for printing methodologies. Methods of making and using such formulations are also provided.

18 Claims, 37 Drawing Sheets

(51) Int. Cl.
B33Y 10/00 (2015.01)
B33Y 70/00 (2020.01)

(56) References Cited

U.S. PATENT DOCUMENTS

| | | | |
|---|---|---|---|
| 6,576,689 B2* | 6/2003 | Noda | C09D 5/4434 523/406 |
| 7,223,820 B2 | 5/2007 | Fischer et al. | |
| 7,511,097 B2 | 3/2009 | Frick et al. | |
| 8,003,730 B1 | 8/2011 | Celina | |
| 8,193,256 B1 | 6/2012 | Celina | |
| 8,292,492 B2 | 10/2012 | Ho et al. | |
| 8,796,346 B1 | 8/2014 | Celina et al. | |
| 9,656,926 B1 | 5/2017 | Thoma et al. | |
| 10,058,881 B1 | 8/2018 | Keicher et al. | |
| 10,130,961 B2 | 11/2018 | Keicher et al. | |
| 2010/0118642 A1 | 5/2010 | Ho et al. | |
| 2010/0193972 A1* | 8/2010 | Yamamoto | C04B 35/62655 257/789 |
| 2012/0010329 A1 | 1/2012 | Hunter et al. | |
| 2012/0074353 A1* | 3/2012 | Van Hemelryck | C08G 59/3263 252/182.17 |
| 2012/0328811 A1 | 12/2012 | Patel et al. | |
| 2015/0045510 A1* | 2/2015 | Braendli | C09J 163/00 525/111 |
| 2016/0129634 A1 | 5/2016 | Keicher et al. | |
| 2017/0057172 A1 | 3/2017 | Keicher et al. | |
| 2017/0174823 A1* | 6/2017 | Weippert | G02B 6/0001 |
| 2017/0181291 A1 | 6/2017 | Bell et al. | |

OTHER PUBLICATIONS

Scifinder Properties of CAS 914307-13-4 (2020).*
U.S. Appl. No. 16/016,452, filed Jun. 22, 2018, Kaehr et al.
Aida T et al., "Functional supramolecular polymers," *Science* 2012;335:813-7.
Alexander AM et al., "Probing the solvent-induced tautomerism of a redox-active ureidopyrimidinone," *Chem. Commun.* 2007;(22):2246-8.
Appel WPJ et al., "Aggregation of ureido-pyrimidinone supramolecular thermoplastic elastomers into nanofibers: a kinetic analysis." *Macromolecules* 2011;44:6776-64.
Balkenende DWR et al., "Epoxy resin-inspired reconfigurable supramolecular networks," *Macromolecules* 2016;49:7877-885.
Bang J et al., "Facile routes to patterned surface neutralization layers for block copolymer lithography," *Adv. Mater.* 2007; 19:4552-7.
Beijer FH et al., "Strong dimerization of ureidopyrimidones via quadruple hydrogen bonding," *J. Am. Chem. Soc.* 1998;120:6761-9.
Bosman AW et al., "Supramolecular polymers at work," *Mater. Today* 2004; 7:34-9.
Brunsveld L et al., "Supramolecular polymers," *Chem. Rev.* 2001;101:4071-98.
Callies X et al., "Combined effect of chain extension and supramolecular interactions on rheological and adhesive properties of acrylic pressure-sensitive adhesives," *ACS Appl. Mater. Interfaces* 2016; 8:33307-15.
Celina M et al., "An overview of high temperature micro-ATR IR spectroscopy to monitor polymer reactions," *Polymer* 2012;53:4461-71.
Chai ZY et al., "High impact resistance epoxy resin by incorporation of quadruply hydrogen bonded supramolecular polymers." *Chinese J. Polym. Sci.* 2016;34:850-7.
Chan ML et al., Mechanism of reinforcement in a nanoclay/polymer composite. *Composites B Eng.* 2011;42:1708-12.
Chandrasekaran S et al., "3D printing of high performance cyanate ester thermoset polymers," *J. Mater. Chem. A* 2018;6:853-8.
Chen K et al., "Fabrication of tough epoxy with shape memory effects by UV-assisted direct-ink write printing," *Soft Matter* 2018:14:1879-86.

Coleman MM et al., "Hydrogen bonding in polymers. 4. Infrared temperature studies of a simple polyurethane," *Macromolecules* 1986:19:2149-57.
Comi M et al., "Adaptive bio-based polyurethane elastomers engineered by ionic hydrogen bonding interactions," *Eur. Polym. J.* 2017;97:408-19.
Compton BG et al., "3D-printing of lightweight cellular composites," *Adv. Mater.* 2014;26:5930-5.
Compton BG et al.. "Electrical and mechanical properties of 3D-printed graphene-reinforced epoxy," *JOM* 2018:70:292-7.
Cravotto G et al., "Molecular self-assembly and patterning induced by sound waves: the case of gelation," Chem. Soc. Rev. 2009:38:2684-97.
Cross MM. "Rheology of non-Newtonian fluids: a new flow equation for pseudoplastic systems." *J. Colloid Sci.* 1965:20:417-37.
De Leon AC et al., "High performance polymer nanocomposites for additive manufacturing applications." *Reactive Funct. Polym.* 2016;103:141-55.
Elacqua E et al., "Engineering orthogonality in supramolecular polymers: from simple scaffolds to complex materials," *Acc. Chem. Res.* 2014;47:2405-16.
Elkins CE et al., "Synthesis and characterization of poly(2-ethylhexyl methacrylate) copolymers containing pendant, self-complementary multiple-hydrogen-bonding sites," *J. Polym. Sci. A* 2005;43:4618-31.
Folmer BJB et al., "Polymeric materials based on reversible supramolecular assemblies," in *Proceedings of the Polymer Processing Society*: 15th annual meeting (PPS-15), held in 's-Hertogenbosch, The Netherlands, from 31 May 31-Jun. 4, 1999.
Folmer BJB et al., "Supramolecular polymer materials: chain extension of telechelic polymers using a reactive hydrogen-bonding synthon," *Adv. Mater.* 2000;12:874-8.
Griffini G et al., "3D-printable CFR polymer composites with dual-cure sequential IPNs," *Polymer* 2016,91:174-9.
Guo M et al., "Tough stimuli-responsive supramolecular hydrogels with hydrogen-bonding network junctions," *J. Am. Chem. Soc.* 2014;136:6969-77.
Hart LR el al., "3D printing of biocompatible supramolecular polymers and their composites," *ACS Appl. Mater. Interfaces* 2016;8:3115-22.
Heinzmann C et al., "Supramolecular polymer adhesives; advanced materials inspired by nature." *Chem. Soc. Rev.* 2016;45:342-58.
Herbst F et al., "Self-healing polymers via supramolecular, hydrogen-bonded networks," in *Self-healing polymers: from principles to applications* (WH Binder, ed.), 2013 (Wiley-VCH Verlag GmbH & Co. KGaA, Weinheim, Germany). Chapter 11 (pp. 273-300).
Hmeidat NS et al., "High-strength epoxy nanocomposites for 3D printing," *Composites Sci. Technol.* 2018;160:9-20.
Ho MW et al., "Mechanical properties of epoxy-based composites using nanoclays," *Composite Struct.* 2006:75:415-21.
Houston KR et al., "Supramolecular engineering polyesters: endgroup functionalization of glycol modified PET with ureidopyrimidinone," *Polym. Chem.* 2016;7:6744-51.
Invernizzi M et al., "UV-assisted 3D printing of glass and carbon fiber-reinforced dual-cure polymer composites," *Materials* 2016;9:583 (12 pp.).
Jaishankar A et al., "Probing hydrogen bond interactions in a shear thickening polysaccharide using nonlinear shear and extensional rheology," *Carbohydr. Polym.* 2015;123:136-45.
Kim BC et al., "Fracture toughness of the nano-particle reinforced epoxy composite," *Composite Struct.* 2008;86:69-77.
Kim DH et al., "Waterproof characteristics of nanoclay/epoxy nanocomposite in adhesively bonded joints," *Composites B Eng.* 2013;55:86-95.
Krushnamurty K et al., "Effect of nanoclay on the toughness of epoxy and mechanical, impact properties of E-glass-epoxy composites," *Adv. Mater. Lett.* 2015;6:684-9.
Kuang X et al., "3D printing of highly stretchable, shape-memory, and self-healing elastomer toward novel 4D printing," *ACS Appl. Mater. Interfaces* 2018;10:7381-8.
Kushner AM et al., "Biomimetic design of reversibly unfolding cross-linker to enhance mechanical properties of 3D network polymers." *J. Am. Chem. Soc.* 2007;129:14110-1.

(56) References Cited

OTHER PUBLICATIONS

Ladd C et al., "3D Printing of free standing liquid metal microstructures," *Adv. Mater.* 2013;25:5081-5.
Lam CK et al., "Effect of ultrasound sonication in nanoclay clusters of nanoclay/epoxy composites," *Mater. Lett.* 2005;59:1369-72.
Lebel LL et al., "Ultraviolet-assisted direct-write fabrication of carbon nanotube/polymer nanocomposite microcoils," *Adv. Mater.* 2010;22:592-6.
Lee HS et al., "Spectroscopic analysis of phase separation behavior of model polyurethanes," *Macromolecules* 1987;20:2080-95.
Lehn JM, Supramolecular Chemistry: Concepts and Perspectives, Wiley-VCH: Weinheim, Germany, 1995(271 pp.).
Lewicki JP et al., "3D-Printing of meso-structurally ordered carbon fiber/polymer composites with unprecedented orthotropic physical properties," *Sci. Rep.* 2017:7: Art. 43401 (14 pp.).
Lewis CL et al., "Synthesis, swelling behavior, and viscoelastic properties of functional poly(hydroxyethyl methacrylate) with ureidopyrimidinone side-groups," *Soft Matter* 2013;9:4058-66.
Lewis JA et al., "Direct ink writing of three-dimensional ceramic structures," *J. Am. Ceram. Soc.* 2006;89:3599-609.
Lewis JA, "Direct ink writing of 3D functional materials." *Adv. Funct. Mat.* 2006;16:2193-204.
Li F et al., "Multi-responsive wrinkling patterns by the photoswitchable supramolecular network," *ACS Macro Lett.* 2017:6:848-53.
Li L et al., "Hierarchical co-assembly enhanced direct ink writing," *Angew. Chem. Int. Ed.* 2018;57:5105-9; *Angew. Chem.* 2018;130:5199-230.
Ligon SC et al., "Polymers for 3D printing and customized additive manufacturing," *Chem. Rev.* 2017:117:10212-90.
Lortie F et al., "N,N'-disubstituted ureas: influence of substituents on the formation of supramolecular polymers," *Chemistry* 2003;9:3008-14.
Manning KB et al., "Self assembly-assisted additive manufacturing: direct ink write 3D printing of epoxy-amine thermosets," *Macromol. Mater. Eng.* 2019;304:1800511 (16 pp.).
Manning KB el al, Supporting Information for "Self assembly-assisted additive manufacturing: direct ink write 3D printing of epoxy-amine thermosets," *Macromol. Mater. Eng.* 2019;304:1800511 (34 pp.).
Meis NNAH et al., "Extreme wet adhesion of a novel epoxy-amine coating on aluminum alloy 2024-T3," *Prog. Org. Coatings* 2014;77:176-83.
Monemian S et al., "Exploring the role of supramolecular associations tn mechanical toughening of interpenetrating polymer networks," *Macromolecules* 2015;48:7146-55.
Monemian S et al., "Probing the interplay of ultraviolet crosslinking and noncovalent interactions in supramolecular elastomers," *Macromolecules* 2014:47:5633-42.
Montamal D et al., "Epoxy-based networks combining chemical and supramolecular hydrogen-bonding crosslinks." *J. Polym. Sci. A Polym. Chem.* 2010:48:1133-41.
Natarajan B et al., "Binary cellulose nanocrystal blends for bioinspired damage tolerant photonic films," *Adv. Functional Mater.* 2018:28:Art. 1800032 (11 pp.).
Nesaei S et al., "Additive manufacturing with conductive, viscoelastic polymer composites: direct-ink-writing of electrolytic and anodic poly(ethylene oxide) composites." *J. Manuf. Sci. Eng.* 2017;137:Art. 111004 (12 pp.).

Pekkanen AM et al., "3D printing polymers with supramolecular functionality for biological applications," *Biomacromolecules* 2017;18:2669-87.
Prins LJ el al., "Noncovalent-synthesis using hydrogen bonding," *Angew. Chem. Int. Ed.* 2001;40:2382-426.
Shi Q et al., "Recyclable 3D printing of vitrimer epoxy," *Mater. Horizons* 2017;4:598-607.
Söntjens SHM et al., "Stability and lifetime of quadruply hydrogen bonded 2-ureido-4[1H]-pyrimidinone dimers." *J. Am. Chem. Soc.* 2000;122:7487-93.
Stansbury JW et al., "3D printing with polymers: challenges among expanding options and opportunities," *Dent. Mater.* 2016;32:54-64.
Teunissen AJP et al., "Mechanically-induced gelation of a kinetically trapped supramolecular polymer," *Macromolecules* 2014;47:8429-36.
Teunissen AJP et al., "Supramolecular polymerization of a ureidopyrimidinone-based [2]catenane prepared via ring-closing metathesis," *J. Polym. Sci. A Polym. Chem.* 2017:55:2971-6.
Van Beek DJM et al., "Unidirectional dimerization and stacking of ureidopyrimidinone end groups in polycaprolactone supramolecular polymers," *Macromolecules* 2007;40:8464-75.
Vaezi M et al., "A review on 3D micro-additive manufacturing technologies," *Int. J. Adv. Manuf. Technol.* 2013;67:1721-54.
Villani M et al., "Superior relaxation of stresses and self-healing behavior of epoxy-amine coatings." *RSC Adv.* 2016,6:245-59.
Wang X et al., "3D printing of polymer matrix composites: a review and prospective," *Composites B* 2017;110:442-58.
White JE, "Thermoplastic epoxy polymers." in Epoxy Polymers : New Materials and Innovations (eds. Jean-Pierre Pascault and Roberto J. J. Wiliams), John Wiley & Sons, Inc. (Hoboken, NJ), Chapter 2, pp. 15-38.
Xiao T et al., "Novel self-assembled dynamic [2]catenanes interlocked by the quadruple hydrogen bonding ureidopyrimidinone motif," *Chem. Sci.* 2012:3:1417-21.
Xu D et al., "Mechanism of shear thickening ins reversibly crosslinked supramolecular polymer networks," *Macromolecules* 2010;43:3556-65.
Yan X et al., "Dendronized organoplatinum(II) metallacyclic polymers constructed by hierarchical coordination-driven self-assembly and hydrogen-bonding interfaces," *J. Am. Chem. Soc.* 2013;135:16813-6.
Yang L et al., "Supramolecular polymers: historical development, preparation, characterization, and functions," *Chem. Rev.* 2015;115:7196-239.
Yoon J et al., "Thermochromic block copolymer photonic gel," *Macromolecules* 2008:41:4582-4.
Yu R et al., "Three-dimensional printing of shape memory composites with epoxy-acrylate hybrid photopolymer," *ACS Appl. Mater. Interfaces* 2017;9:1820-9.
Zhou Z et al., "Engineering functionalization in a supramolecular polymer: hierarchical self-organization of triply orthogonal noncovalent interactions on a supramolecular coordination complex platform," *J. Am. Chem Soc.* 2016;138:806-9.
Zhu B et al., "Hierarchical nacre mimetics with synergistic mechanical properties by control of molecular interactions in self-healing polymers," *Angew. Chem. Int. Ed.* 2015;54:8653-7.
Zhu B et al., "Light-adaptive supramolecular nacre-mimetic nanocomposites." *Nano Lett.* 2016;16:5176-82.

\* cited by examiner

SELF-ASSEMBLY ASSISTED ADDITIVE MANUFACTURING OF THERMOSETS

CROSS-REFERENCE TO RELATED APPLICATION

This application claims the benefit of U.S. Provisional Application No. 62/690,296, filed Jun. 26, 2018, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to formulations including a self-assembly monomer. In particular embodiments, the self-assembly monomer provides a thermoset having beneficial viscoelastic properties for printing methodologies. Methods of making and using such formulations are also provided.

BACKGROUND OF THE INVENTION

Recent advances in three-dimensional (3D) printing could benefit from tunable synthetic thermosets. Such tuning can provide thermosets having the appropriate viscoelastic properties for the particular structure being printed. Yet many challenges remain. For instance, as yet, printable inks are designed for the particular use, and general design rules are still being developed. Accordingly, there is a need for additional thermoset components and resins having rheological tunability.

SUMMARY OF THE INVENTION

The present invention relates, in part, to chemical components that undergo self-assembly to promote spontaneous and reversible organization of molecular units into ordered structures via non-covalent interactions. Such self-assembly systems can provide reversible supramolecular interactions, which can facilitate the manufacturing of an array of 3D printed objects due to the beneficial rheological performance. Furthermore, the chemical properties of a formulation including such components can be controlled. Exemplary chemical properties arising from self-assembling and disassembling events include, e.g., changes in viscosity, molecular alignment, and/or templation.

In a first aspect, the present invention features a formulating including: (i) an epoxy monomer having one or more epoxy groups; (ii) a self-assembly monomer having one or more reactive moieties configured to react with the one or more epoxy groups of the epoxy monomer; (iii) a curative monomer having one or more reactive moieties configured to react with the one or more epoxy groups of the epoxy monomer, and (iv) an optional filler.

In some embodiments, each of $R^{A1}$ in the self-assembly monomer is, independently, an amino.

In a second aspect, the present invention features a formulation including: (i) an epoxy monomer having a structure of formula (III):

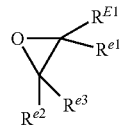

(III)

or a salt thereof, wherein: $R^{E1}$ is a moiety including one or more epoxy groups, optionally substituted alkyl, optionally substituted alkoxyalkyl, optionally substituted aryloxyalkyl, haloalkyl, optionally substituted aryl, or optionally substituted aryloxy, and each of $R^{e1}$, $R^{e2}$, and $R^{e3}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl; (ii) a self-assembly monomer having a structure of formula (I) or (Ia):

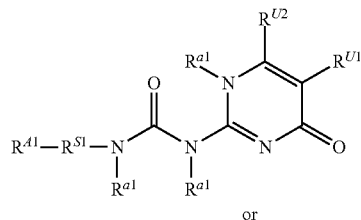

or a salt thereof, wherein: each of $R^{U1}$ and $R^{U2}$ is, independently, H, optionally substituted alkyl, optionally substituted heteroalkyl, optionally substituted aryl, or optionally substituted alkaryl, each of $R^{a1}$ is, independently, H or optionally substituted alkyl, each of $R^{S1}$, $R^{S2}$, and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an aryl ether subunit, a polyethylene glycol subunit, or a combination thereof, and each of $R^{A1}$ is, independently, a reactive moiety configured to react with the one or more epoxy groups of the epoxy monomer; (iii) a curative monomer having a structure of formula (II):

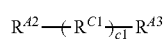

(II)

or a salt thereof, wherein: $R^{C1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an aryl ether subunit, a polyethylene glycol subunit, or a combination thereof, or a combination thereof; c1 is a number of from about 1 to about 500; and each of $R^{42}$ and $R^{43}$ is, independently, H, optionally substituted alkyl, or a reactive moiety, in which at least one of $R^{42}$ and $R^{43}$ is a reactive moiety configured to react with the one or more epoxy groups of the epoxy monomer; and (iv) an optional filler.

In some embodiments, the formulation includes: from about 10 wt. % to about 90 wt. % of the epoxy monomer (e.g., such as of from about 10 wt. % to 20 wt. %, 10 wt. % to 30 wt. %, 10 wt. % to 40 wt. %, 10 wt. % to 50 wt. %, 10 wt. % to 60 wt. %, 10 wt. % to 75 wt. %, 10 wt. % to 80 wt. %, 10 wt. % to 85 wt. %, 15 wt. % to 20 wt. %, 15 wt. % to 30 wt. %, 15 wt. % to 40 wt. %, 15 wt. % to 50 wt. %, 15 wt. % to 60 wt. %, 15 wt. % to 75 wt. %, 15 wt. % to 80 wt. %, 15 wt. % to 85 wt. %, 15 wt. % to 90 wt. %, 20 wt. % to 30 wt. %, 20 wt. % to 40 wt. %, 20 wt. % to 50 wt. %, 20 wt. % to 60 wt. %, 20 wt. % to 75 wt. %, 20 wt. % to 80 wt. %, 20 wt. % to 85 wt. %, 20 wt. % to 90 wt. %, 25 wt. % to 30 wt. %, 25 wt. % to 40 wt. %, 25 wt. % to 50 wt. %, 25 wt. % to 60 wt. %, 25 wt. % to 75 wt. %, 25 wt. % to 80 wt. %, 25 wt. % to 85 wt. %, 25 wt. % to 90 wt. %, 30 wt. % to 40 wt. %, 30 wt. % to 50 wt. %, 30 wt. % to 60 wt. %, 30 wt. % to 75 wt. %, 30 wt. % to 80 wt. %, 30 wt. % to 85 wt. %, 30 wt. % to 90 wt. %, 35 wt. % to 40 wt. %, 35 wt. % to 50 wt. %, 35 wt. % to 60 wt. %, 35 wt. % to 75 wt. %, 35 wt. % to 80 wt. %, 35 wt. % to 85 wt. %, 35 wt. % to 90 wt. %, 40 wt. % to 50 wt. %, 40 wt. % to 60 wt. %, 40 wt. % to 75 wt. %, 40 wt. % to 80 wt. %, 40 wt. % to 85 wt. %, 40 wt. % to 90 wt. %, 50 wt. % to 60 wt. %, 50 wt. % to 75 wt. %, 50 wt. % to 80 wt. %, 50 wt. % to 85 wt. %, 50 wt. % to 90 wt. %, 55 wt. % to 60 wt. %, 55 wt. % to 75 wt. %, 55 wt. % to 80 wt. %, 55 wt. % to 85 wt. %, 55 wt. % to 90 wt. %, 60 wt. % to 75 wt. %, 60 wt. % to 80 wt. %, 60 wt. % to 85 wt. %, 60 wt. % to 90 wt. %, 65 wt. % to 75 wt. %, 65 wt. % to 80 wt. %, 65 wt. % to 85 wt. %, 65 wt. % to 90 wt. %, 70 wt. % to 75 wt. %, 70 wt. % to 80 wt. %, 70 wt. % to 85 wt. %, 70 wt. % to 90 wt. %, 75 wt. % to 80 wt. %, 75 wt. % to 85 wt. %, 75 wt. % to 90 wt. %, 80 wt. % to 85 wt. %, 80 wt. % to 90 wt. %. or 85 wt. % to 90 wt. %), from about 5 wt. % to about 40 wt. % of the self-assembly monomer (e.g., such of from about 5 wt. % to 10 wt. %, 5 wt. % to 15 wt. %, 5 wt. % to 20 wt. %, 5 wt. % to 25 wt. %, 5 wt. % to 30 wt. %, 5 wt. % to 35 wt. %, 7 wt. % to 10 wt. %, 7 wt. % to 15 wt. %, 7 wt. % to 20 wt. %, 7 wt. % to 25 wt. %, 7 wt. % to 30 wt. %, 7 wt. % to 35 wt. %, 7 wt. % to 40 wt. %, 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 15 wt. % to 20 wt. %, 15 wt. % to 25 wt. %, 15 wt. % to 30 wt. %, 15 wt. % to 35 wt. %, 15 wt. % to 40 wt. %, 20 wt. % to 25 wt. %, 20 wt. % to 30 wt. %, 20 wt. % to 35 wt. %, 20 wt. % to 40 wt. %, 25 wt. % to 30 wt. %, 25 wt. % to 35 wt. %, 25 wt. % to 40 wt. %, 30 wt. % to 35 wt. %, 30 wt. % to 40 wt. %, or 35 wt. % to 40 wt. %); from about 1 wt. % to about 15 wt. % of the curative monomer (e.g., such as of from about 1 wt. % to 1.5 wt. %, 1 wt. % to 2 wt. %, 1 wt. % to 3 wt. %, 1 wt. % to 4 wt. %, 1 wt. % to 5 wt. %, 1 wt. % to 6 wt. %, 1 wt. % to 7 wt. %, 1 wt. % to 8 wt. %, 1 wt. % to 9 wt. %, 1 wt. % to 10 wt. %, 1 wt. % to 13 wt. %, 1.5 wt. % to 2 wt. %, 1.5 wt. % to 0.3 wt. %, 1.5 wt. % to 4 wt. %, 1.5 wt. % to 5 wt. %, 1.5 wt. % to 6 wt. %, 1.5 wt. % to 7 wt. %, 1.5 wt. % to 8 wt. %, 1.5 wt. % to 9 wt. %, 1.5 wt. % to 10 wt. %, 1.5 wt. % to 13 wt. %, 1.5 wt. % to 15 wt. %, 2 wt. % to 3 wt. %, 2 wt. % to 4 wt. %, 2 wt. % to 5 wt. %, 2 wt. % to 6 wt. %, 2 wt. % to 7 wt. %, 2 wt. % to 8 wt. %, 2 wt. % to 9 wt. %, 2 wt. % to 10 wt. %, 2 wt. % to 13 wt. %, 2 wt. % to 15 wt. %, 2.5 wt. % to 3 wt. %, 2.5 wt. % to 4 wt. %, 2.5 wt. % to 5 wt. %, 2.5 wt. % to 6 wt. %, 2.5 wt. % to 7 wt. %, 2.5 wt. % to 8 wt. %, 2.5 wt. % to 9 wt. %, 2.5 wt. % to 10 wt. %, 2.5 wt. % to 13 wt. %, 2.5 wt. % to 15 wt. %, 0.3 wt. % to 4 wt. %, 3 wt. % to 5 wt. %, 3 wt. % to 6 wt. %, 3 wt. % to 7 wt. %, 3 wt. % to 8 wt. %, 3 wt. % to 9 wt. %, 3 wt. % to 10 wt. %, 3 wt. % to 13 wt. %, 3 wt. % to 15 wt. %, 4 wt. % to 5 wt. %, 4 wt. % to 6 wt. %, 4 wt. % to 7 wt. %, 4 wt. % to 8 wt. %, 4 wt. % to 9 wt. %, 4 wt. % to 10 wt. %, 4 wt. % to 13 wt. %, 4 wt. % to 15 wt. %, 5 wt. % to 6 wt. %, 5 wt. % to 7 wt. %, 5 wt. % to 8 wt. %, 5 wt. % to 9 wt. %, 5 wt. % to 10 wt. %, 5 wt. % to 13 wt. %, 5 wt. % to 15 wt. %, 6 wt. % to 7 wt. %, 6 wt. % to 8 wt. %, 6 wt. % to 9 wt. %, 6 wt. % to 10 wt. %, 6 wt. % to 13 wt. %, 6 wt. % to 15 wt. %, 7 wt. % to 8 wt. %, 7 wt. % to 9 wt. %, 7 wt. % to 10 wt. %, 7 wt. % to 13 wt. %, 7 wt. % to 15 wt. %, 8 wt. % to 9 wt. %, 8 wt. % to 10 wt. %, 8 wt. % to 13 wt. %, 8 wt. % to 15 wt. %, 9 wt. % to 10 wt. %, 9 wt. % to 13 wt. %, 9 wt. % to 15 wt. %, 10 wt. % to 13 wt. %, 10 wt. % to 15 wt. %, 12 wt. % to 13 wt. %, 12 wt. % to 15 wt. %, or 13 wt. % to 15 wt. %); and from about 5 wt. % to about 60 wt. % of the filler (e.g., such as of from about 5 wt. % to 20 wt. %, 5 wt. % to 40 wt. %, 10 wt. % to 20 wt. %, 10 wt. % to 40 wt. %, 10 wt. % to 60 wt. %, 20 wt. % to 40 wt. %, 20 wt. % to 60 wt. %, 30 wt. % to 40 wt. %, 30 wt. % to 60 wt. %, 40 wt. % to 60 wt. %, or 50 wt. % to 60 wt. %).

In other embodiments, each of $R^{41}$ in the self-assembly monomer is, independently, an amino. In some embodiments, each of $R^{42}$ and $R^{43}$ in the curative monomer is, independently, an amino.

In some embodiments, a ratio of a number of the one or more epoxy groups and a number of reactive moieties of the self-assembly monomer and the curative monomer are of from about 4:1 to 1:4.

In a third aspect, the present invention features a method including: printing a structure with a formulation (e.g., any described herein) at a first temperature (e.g., any described herein), thereby providing a printed structure.

In some embodiments, the formulation is treated with a first stimulus (e.g., such as exposure to heat, such as of from about 30° C. to about 150° C., including any ranges described herein).

In other embodiments, the method further includes: treating the printed structure with a second stimulus (e.g., including exposure to heat, such as of from about 30° C. to about 150° C., including any ranges described herein). In some instances, the temperature of the second stimulus is greater than the temperature of the first stimulus.

In a fourth aspect, the present invention features a method including: printing a structure with a formulation (e.g., any described herein) at a first temperature (e.g., of from about 20° C. to about 40° C.), thereby providing a printed structure; and curing the printed structure at a second temperature that is greater than the first temperature, thereby providing a cured structure.

In some embodiments, the first temperature is of from about 20° C. to about 40° C., about 20° C. to about 35° C., about 20° C. to about 30° C., about 20° C. to about 25° C., about 25° C. to about 40° C., about 25° C. to about 35° C., or about 25° C. to about 30° C.

In some embodiments, the second temperature is of from about 30° C. to about 150° C. (e.g., such as of from about 30° C. to 50° C., 30° C. to 60° C., 30° C. to 80° C., 30° C. to 100° C., 30° C. to 120° C., 30° C. to 125° C., 30° C. to 130° C., 30° C. to 135° C., 30° C. to 140° C., 30° C. to 145° C., 40° C. to 50° C., 40° C. to 60° C., 40° C. to 80° C., 40° C. to 100° C., 40° C. to 120° C., 40° C. to 125° C., 40° C.

to 130° C., 40° C. to 135° C., 40° C. to 140° C., 40° C. to 145° C., 40° C. to 150° C., 45° C. to 50° C., 45° C. to 60° C., 45° C. to 80° C., 45° C. to 100° C., 45° C. to 120° C., 45° C. to 125° C., 45° C. to 130° C., 45° C. to 135° C., 45° C. to 140° C., 45° C. to 145° C., 45° C. to 150° C., 50° C. to 60° C., 50° C. to 80° C., 50° C. to 100° C., 50° C. to 120° C., 50° C. to 125° C., 50° C. to 130° C., 50° C. to 135° C., 50° C. to 140° C., 50° C. to 145° C., 50° C. to 150° C., 55° C. to 60° C., 55° C. to 80° C., 55° C. to 100° C., 55° C. to 120° C., 55° C. to 125° C., 55° C. to 130° C., 55° C. to 135° C., 55° C. to 140° C., 55° C. to 145° C., 55° C. to 150° C., 60° C. to 80° C., 60° C. to 100° C., 60° C. to 120° C., 60° C. to 125° C., 60° C. to 130° C., 60° C. to 135° C., 60° C. to 140° C., 60° C. to 145° C., 60° C. to 150° C., 65° C. to 80° C., 65° C. to 100° C., 65° C. to 120° C., 65° C. to 125° C., 65° C. to 130° C., 65° C. to 135° C., 65° C. to 140° C., 65° C. to 145° C., 65° C. to 150° C., 70° C. to 80° C., 70° C. to 100° C., 70° C. to 120° C., 70° C. to 125° C., 70° C. to 130° C., 70° C. to 135° C., 70° C. to 140° C., 70° C. to 145° C., 70° C. to 150° C., 75° C. to 80° C., 75° C. to 100° C., 75° C. to 120° C., 75° C. to 125° C., 75° C. to 130° C., 75° C. to 135° C., 75° C. to 140° C., 75° C. to 145° C., 75° C. to 150° C., 80° C. to 100° C., 80° C. to 120° C., 80° C. to 125° C., 80° C. to 130° C., 80° C. to 135° C., 80° C. to 140° C., 80° C. to 45° C., 80° C. to 150° C., 85° C. to 100° C., 85° C. to 120° C. 85° C. to 125° C., 85° C. to 130° C., 85° C. to 135° C., 85° C. to 140° C., 85° C. to 145° C., 85° C. to 150° C., 90° C. to 100° C., 90° C. to 120° C., 90° C. to 125° C., 90° C. to 130° C., 90° C. to 135° C., 90° C. to 140° C., 90° C. to 145° C., 90° C. to 150° C., 95° C. to 120° C., 95° C. to 125° C., 95° C. to 130° C., 95° C. to 135° C., 95° C. to 140° C., 95° C. to 145° C., 95° C. to 150° C., 100° C. to 120° C., 100° C. to 125° C., 100° C. to 130° C., 100° C. to 135° C., 100° C. to 140° C., 100° C. to 145° C., 100° C. to 150° C., 110° C. to 120° C., 110° C. to 125° C., 110° C. to 130° C., 110° C. to 135° C., 110° C. to 140° C., 110° C. to 145° C., 110° C. to 150° C., 120° C. to 125° C., 120° C. to 130° C., 120° C. to 135° C., 120° C. to 140° C., 120° C. to 145° C., 120° C. to 150° C., 130° C. to 135° C., 130° C. to 140° C., 130° C. to 145° C., 130° C. to 150° C., 140° C. to 145° C., or 140° C. to 150° C.).

In some embodiments, the method further includes: treating the cured structure at a third temperature that is greater than the second temperature, thereby providing a fully cured structure. In other embodiments, the third temperature is of from about 80° C. to about 180° C. (e.g., such as of from about 80° C. to 120° C., 80° C. to 150° C., 80° C. to 175° C., 90° C. to 120° C., 90° C. to 150° C., 90° C. to 175° C., 90° C. to 180° C., 100° C. to 120° C., 100° C. to 150° C., 100° C. to 175° C., 100° C. to 180° C., 110° C. to 120° C., 110° C. to 150° C., 110° C. to 175° C., or 110° C. to 180° C.).

In a fifth aspect, the present invention features a method including: treating a formulation (e.g., any described herein) under a first stimulus, thereby providing a treated formulation; printing a structure with the treated formulation, thereby providing a printed structure; and curing the printed structure with a second stimulus, thereby providing a cured structure.

In some embodiments, the first stimulus includes exposure to a first temperature of from about 30° C. to about 150° C., including any ranges described herein.

In other embodiments, the second stimulus includes exposure to an ultraviolet light (e.g., having a wavelength of from about 10 nm to about 400 nm). In some embodiments, the ultraviolet light has a wavelength of from about 200 nm to about 390 nm (e.g., of from about 200 nm to 250 nm, 200 nm to 280 nm, 200 nm to 300 nm, 200 nm to 350 nm, 200 nm to 380 nm, 220 nm to 250 nm, 220 nm to 280 nm, 220 nm to 300 nm, 220 nm to 350 nm, 220 nm to 380 nm, 220 nm to 390 nm, 240 nm to 250 nm, 240 nm to 280 nm, 240 nm to 300 nm, 240 nm to 350 nm, 240 nm to 380 nm, 240 nm to 390 nm, 260 nm to 280 nm, 260 nm to 300 nm, 260 nm to 350 nm, 260 nm to 380 nm, 260 nm to 390 nm, 280 nm to 300 nm, 280 nm to 350 nm, 280 nm to 380 nm, 280 nm to 390 nm, 300 nm to 350 nm, 300 nm to 380 nm, 300 nm to 390 nm, 320 nm to 350 nm, 320 nm to 380 nm, 320 nm to 390 nm, 360 nm to 380 nm, or 360 nm to 390 nm).

In some embodiments, the second stimulus includes exposure to a second temperature of from about 30° C. to about 130° C., including any ranges described herein. In particular embodiments, the second temperature is greater than the first temperature.

In any embodiment therein, the self-assembly monomer has a structure of formula (I):

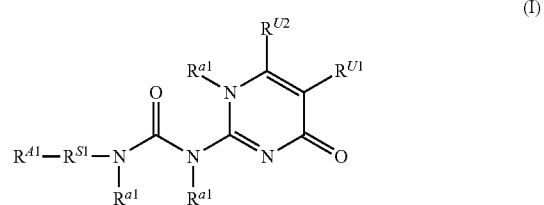

(I)

or a salt thereof, wherein: each of $R^{U1}$ and $R^{U2}$ is, independently, H, optionally substituted alkyl, optionally substituted heteroalkyl, optionally substituted aryl, or optionally substituted alkaryl; each of $R^{a1}$ is, independently, H or optionally substituted alkyl; $R^{S1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an aryl ether subunit, a polyethylene glycol subunit, or a combination thereof, and each of $R^{A1}$ is, independently, a reactive moiety configured to react with the one or more epoxy groups of the epoxy monomer. In some embodiments, $R^{A1}$ is amino (e.g., as defined herein, such as $-NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein).

In any embodiment herein, the self-assembly monomer has a structure of formula (Ia):

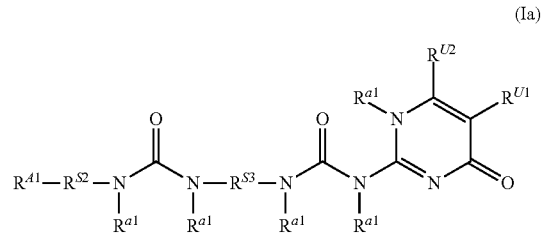

(Ia)

or a salt thereof, wherein: each of $R^{U1}$ and $R^{U2}$ is, independently, H, optionally substituted alkyl, optionally substituted heteroalkyl, optionally substituted aryl, or optionally substituted alkaryl; each of $R^{a1}$ is, independently, H or optionally substituted alkyl; each of $R^{S2}$ and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, and each of $R^{A1}$ is, independently, a reactive moiety configured to react with the one or more epoxy groups of the epoxy monomer. In some embodiments, $R^{A1}$ is amino (e.g., as defined herein, such as —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein).

In any embodiment herein, the self-assembly monomer has a structure of formula (IV-1), (IV-2), (IV-3), (V-1), (V-2), (V-3), (VI-1), (VI-2), (VI-3), or a salt thereof. In some embodiments, each of $R^{U1}$, $R^{U2}$, $R^{U3}$, $R^{U4}$, $R^{U5}$, and $R^{U6}$ is, independently, H, optionally substituted alkyl, optionally substituted heteroalkyl, optionally substituted aryl, or optionally substituted alkaryl; $R^{S1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof; each of $R^a$, $R^b$, and $R^c$ is, independently, —$CR^d$— or —N—, wherein $R^d$ is H, optionally substituted alkyl, optionally substituted heteroalkyl, optionally substituted aryl, or optionally substituted alkaryl; and each of $R^{A1}$ is, independently, a reactive moiety.

In any embodiment herein, the curative monomer includes a structure of formula (II):

(II)

or a salt thereof, wherein: $R^{C1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof; c1 is a number of from about 1 to about 500; and each of $R^{A2}$ and $R^{A3}$ is, independently, H, optionally substituted alkyl, or a reactive moiety, in which at least one of $R^{A2}$ and $R^{A3}$ is a reactive moiety.

In any embodiment herein, the curative monomer includes a structure of formula (IIa):

(IIa)

or a salt thereof, and wherein: each of $R^{C2}$ and $R^{C3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an aryl ether subunit, a polyethylene glycol subunit, or a combination thereof or a combination thereof; each of c2 and c3 is, independently, a number of from 1 to about 500; and each of $R^{A2}$ and $R^{A3}$ is, independently, H, optionally substituted alkyl, or a reactive moiety, in which at least one of $R^{A2}$ and $R^{A3}$ is a reactive moiety.

In any embodiment herein, the curative monomer includes a structure of formula (IIb):

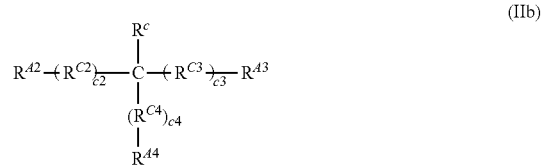

(IIb)

or a salt thereof, wherein: each of $R^{C2}$, $R^{C3}$, and $R^{C4}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an aryl ether subunit, a polyethylene glycol subunit, or a combination thereof, or a combination thereof; $R^C$ is, independently, H, optionally substituted alkyl, optionally substituted heteroalkyl, optionally substituted aryl, or optionally substituted alkaryl; each of c2, c3, and c4 is, independently, a number of from about 1 to about 500; and each of $R^{A2}$, $R^{A3}$, and $R^{A4}$ is, independently, H, optionally substituted alkyl, or a reactive moiety, in which at least one of $R^{A2}$ and $R^{A3}$ and $R^{A4}$ is a reactive moiety.

In any embodiment herein, the epoxy monomer includes a structure of formula (III):

(III)

or a salt thereof, wherein: $R^{E1}$ is a moiety including one or more epoxy groups, optionally substituted alkyl, optionally substituted alkoxyalkyl, optionally substituted aryloxyalkyl, haloalkyl, optionally substituted aryl, or optionally substituted aryloxy; each of $R^{e1}$, $R^{e2}$, and $R^{e3}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl; and $R^{EL}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof.

In any embodiment herein, the epoxy monomer includes a structure of formula (IIIa):

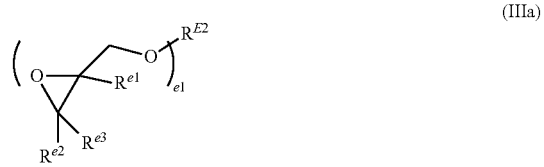

(IIIa)

or a salt thereof, wherein: $R^{E2}$ is a moiety including one or more epoxy groups, optionally substituted alkyl, optionally substituted alkoxyalkyl, optionally substituted aryloxyalkyl, haloalkyl, optionally substituted aryl, or optionally substituted aryloxy; each of $R^{e1}$, $R^{e2}$, and $R^{e3}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl; and e1 is, independently, a number of from about 1 to about 500.

In any embodiment herein, the epoxy monomer includes a structure of formula (IIIb):

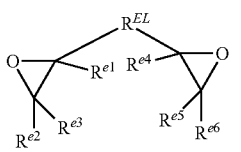
(IIIb)

or a salt thereof wherein: each of $R^{e1}$, $R^{e2}$, $R^{e3}$, $R^{e4}$, $R^{e3}$, and $R^{e6}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl; and $R^{EL}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof.

In any embodiment herein, the epoxy monomer includes a structure of formula (Die):

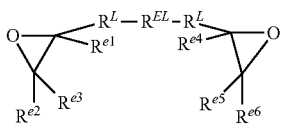
(IIIc)

or a salt thereof, wherein: each of $R^{e1}$, $R^{e2}$, $R^{e3}$, $R^{e4}$, $R^{e5}$, and $R^{e6}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl; $R^{EL}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof; and each $R^L$ is, independently, optionally substituted alkylene, optionally substituted alkenylene, optionally substituted heteroalkylene, thio, oxy, optionally substituted alkyleneoxy, or optionally substituted thioalkylene.

In any embodiment herein, a ratio of a number of the one or more epoxy groups and a number of reactive moieties of the self-assembly monomer and the curative monomer are of from about 10:1 to 1:10 (e.g., from 8:1 to 1:8, 6:1 to 1:6, 4:1 to 1:4, and 2:1 to 1:2).

In any embodiment herein, the self-assembly monomer is an amount of from about 3 mol. wt. % to about 40 mol. wt. % (e.g., from about 3 mol. wt. % to 10 wt. %, 3 mol. wt. % to 20 wt. %, 3 mol. wt. % to 30 wt. %, 5 mol. wt. % to 10 wt. %, 5 mol. wt. % to 20 wt. %, 5 mol. wt. % to 30 wt. %, 5 mol. wt. % to 40 wt. %, 7 mol. wt. % to 10 wt. %, 7 mol. wt. % to 20 wt. %, 7 mol. wt. % to 30 wt. %, 7 mol. wt. % to 40 wt. %, 10 mol. wt. % to 20 wt. %, 10 mol. wt. % to 30 wt. %, 10 mol. wt. % to 40 wt. %, 15 mol. wt. % to 20 wt. %, 15 mol. wt. % to 30 wt. %, 15 mol. wt. % to 40 wt. %, 20 mol. wt. % to 30 wt. %, 20 mol. wt. % to 40 wt. %, 25 mol. wt. % to 30 wt. %, mol. wt. % to 40 wt. %, 30 mol. wt. % to 40 wt. %, or 35 mol. wt. % to 40 wt. %).

In any embodiment herein, the filler includes clay, nanoclay, montmorillonite clay, silica, glass, carbon fiber, titanium oxide, aluminum oxide, barium sulfate, calcium carbonate, barium titanate, silicon oxide, talc, hydrotalcite, and/or mica, as well as particles, powders, or colloids thereof.

Additional details follow.

Definitions

As used herein, the term "about" means +/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$alk-$C_{4-18}$ aryl).

By "alkcycloalkyl" is meant a cycloalkyl group, as defined herein, attached to the parent molecular group through an alkylene group, as defined herein. The alkcycloalkyl group can be substituted or unsubstituted. For example, the alkcycloalkyl group can be substituted with one or more substitution groups, as described herein for alkyl.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkenylene" is meant a bivalent form of an alkenyl group, as described herein. In some embodiments, the alkenylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkenylene group. The alkenylene group can be branched or unbranched. The alkenylene group can also be substituted or unsubstituted. For example, the alkenylene group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy; (2) $C_{1-6}$ alkylsulfinyl; (3) $C_{1-6}$ alkylsulfonyl; (4) amino; (5) aryl; (6) arylalkoxy; (7) aryloyl; (8) azido; (9) cyano; (10) carboxyaldehyde; (11) $C_{3-8}$ cycloalkyl; (12) halo; (13) heterocyclyl; (14) heterocyclyloxy; (15) heterocyclyloyl; (16) hydroxyl; (17) N-protected amino; (18) nitro; (19) oxo; (20) $C_{3-8}$ spirocyclyl; (21) $C_{1-6}$ thioalkoxy; (22) thiol; (23) —$CO_2R^A$, where $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —$C(O)NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^D$, where $R^D$ is selected from the group consisting of (a) $C_{1-6}$ alkyl, (b) $C_{4-18}$ aryl, and (c) $C_{1-6}$alk-$C_{4-18}$ aryl, (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a bivalent form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched.

The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amidino" is meant —$C(NR^{N3})NR^{N1}R^{N2}$, where each of $R^{N1}$, $R^{N2}$, and $R^{N3}$ is, independently, H or optionally substituted alkyl, or $R^{N1}$ and $R^{N2}$, taken together with the nitrogen atom to which each are attached, form a heterocyclyl group, as defined herein.

By "amido" is meant —$C(O)NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "amino" is meant —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "aminoalkyl" is meant an alkyl group, as defined herein, substituted by an amino group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The and group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) aryl; (10) amino; (11) $C_{1-6}$ aminoalkyl; (12) heteroaryl; (13) $C_{1-6}$ alk-$C_{4-18}$ aryl; (14) aryloyl; (15) azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$ thioalkoxy; (35) thio-$C_{1-6}$ alkoxy-$C_{1-6}$ alkyl; (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ and, and (d) $C_{1-6}$ alk-$C_{4-8}$ aryl; (37) —$(CH_2)_rCONR^BR^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —$(CH_2)_rSO_2R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —$(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-5}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) aryl alkoxy. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylcarbonylalkyl" is meant an alkyl group, as defined herein, substituted by an aryloyl group, as defined herein. In some embodiments, the arylcarbonylalkyl group is Ar—C(O)-Ak-, in which Ar is an optionally substituted aryl group and Ak is an optionally substituted alkyl or optionally substituted alkylene group. In particular embodiments, an unsubstituted aryl carbonyl alkyl group is a $C_{4-20}$ aryl-C(O)—$C_{1-12}$ alkyl group or a $C_{4-12}$ aryl-C(O)—$C_{1-6}$ alkyl group or a $C_{4-18}$ aryl-C(O)—$C_{1-6}$ alkyl group.

By "arylene" is meant a bivalent form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl. In another example, further arylene groups are described herein.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxyalkyl" is meant an alkyl group, as defined herein, which is substituted with an aryloxy group, as defined herein. Exemplary unsubstituted aryloxyalkyl groups include between to 24 carbons ($C_{4-24}$ aryloxyalkyl), as well as those having an alkyl group with 1 to 6 carbons and an aryloxy group with 4 to 18 carbons (i.e., $C_{4-18}$-aryloxy-$C_{1-6}$ alkyl).

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl or $C_{5-19}$ aryloyl group.

By "azido" is meant an —$N_3$ group.

By "azo" is meant an —N=N— group.

By "azidoalkyl" is meant an azido group attached to the parent molecular group through an alkyl group, as defined herein.

By "carbonyl" is meant a —C(O)— group, which can also be represented as >C=O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant, a —$CO_2H$ group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "epoxy" is meant an oxygen atom directly attached to two adjacent or non-adjacent carbon atoms, in which the carbon atoms are a part of a cyclic system. Exemplary epoxy groups include $CH_2OCH$— or $CR^{e2}R^{e3}OCR^{e1}$—, in which each of $R^{e1}$, $R^{e2}$, and $R^{e3}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazoyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "imino" is meant —NH—.

By "nitrilo" is meant —N<. Exemplary nitrilo groups include —$NR^{L3}$—, where $R^{L3}$ is H, optionally substituted alkyl, optionally substituted haloalkyl, optionally substituted alkoxy, optionally substituted alkaryl, optionally substituted aryl, or halo.

By "nitro" is meant an —$NO_2$ group.

By "nitroalkyl" is meant an alkyl group, as defined herein, substituted by one to three nitro groups.

By "nitroso" is meant an —NO group.

By "oxo" is meant an =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —$OC_fF_{2f}$— or —$C_fF_{2f}O$—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphoryl" is meant a —P(O)<group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkyl sulfonate with reactive group O), such as —$SO_2$—$R^{S1}$, where $R^{S1}$ is optionally substituted $C_{1-12}$ alkyl, such as mesyl or benzylsulfonyl; an optionally substituted aryl sulfonyl group (e.g., forming an aryl sulfonate with reactive group O), such as —$SO_2$—$R^{S4}$, where $R^{S4}$ is optionally substituted $C_{4-18}$ aryl, such as tosyl or phenylsulfonyl, an optionally substituted alkoxycarbonyl or aryloxycarbonyl group (e.g., forming a carbonate with reactive group O), such as —C(O)—$OR^{T1}$, where $R^{T1}$ is optionally substituted $C_{1-12}$ alkyl or optionally substituted $C_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—$(R^{T2})_3$, where each $R^{T2}$ is, independently, optionally substituted $C_{1-12}$ alkyl or optionally substituted $C_{4-18}$ aryl, such as trimethyl silyl, t-butyldimethyl silyl, or t-butyl diphenyl silyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," J. Pharm. Sci. 1977 January; 66(1):1-19; and in "Handbook of Pharmaceutical Salts: Properties, Selection, and Use," Wiley-VCH, April 2011 (2nd rev, ed., eds, P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methyl sulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethyl amine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include ammonium, sulfonium, sulfoxonium, phosphonium, iminium, imidazolium, benzimidazolium, amidinium, guanidinium, phosphazinium, phosphazenium, pyridinium, etc., as well as other cationic groups described herein (e.g., optionally substituted isoxazolium, optionally substituted oxazolium, optionally substituted thiazolium, optionally substituted pyrrolium, optionally substituted furanium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinum, optionally substituted quinolizinium, optionally substituted dehydroquinolizinium, optionally substituted quinolinium, optionally substituted isoindolinium, optionally substituted benzimidazolinium, and optionally substituted purinium).

By "sulfinyl" is meant an —S(O)— group.

By "sulfo" is meant an —S(O)$_2$OH group.

By "sulfone" is meant R'—S(O)$_2$—R", where R' and R" is an organic moiety. Exemplary groups for R' and R" include, independently, optionally substituted alkyl, alkenyl, alkynyl, alkaryl, alkheterocyclyl, alkcycloalkyl, alkanoyl, alkoxy, alkoxyalkyl, alkoxycarbonyl, alkyl sulfinyl, alkylsulfonyl, alkyl sulfinylalkyl, alkylsulfonylalkyl, aminoalkyl, aryl, arylalkoxy, aryloxy, aryloxycarbonyl, aryloyl, arylsulfonyl, arylsulfonylalkyl, azidoalkyl, carboxyaldehyde, carboxyaldehydealkyl, carboxyl, cyano, cycloalkyl, cycloalkoxy, haloalkyl, heteroaryl, heterocyclyl, heterocyclyloxy, heterocyclyloyl, hydroxyalkyl, nitroalkyl, perfluoroalkyl, perfluoroalkoxy, spirocyclyl, thioalkaryl, thioalkheterocyclyl, or thioalkoxy, as defined herein. The sulfone can be unsubstituted or substituted. For example, the sulfone can be substituted with one or more substitution groups, as described herein for alkyl and/or aryl.

By "sulfonyl" is meant an —S(O)$_2$— group.

By "sulfonamide" is meant an —S(O)$_2$—NR$^{L3}$— or an —NR$^{L3}$—S(O)$_2$— group, in which R$^{L3}$ is any useful moiety. Exemplary R$^{L3}$ groups include H, optionally substituted alkyl, optionally substituted haloalkyl, optionally substituted alkoxy, optionally substituted alkaryl, optionally substituted aryl, or halo.

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include $C_{1-6}$ thioalkoxy.

By "thioamido" is meant —C(S)NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "thio" is meant an —S— group.

By "thioalkylene" is meant an alkylene group, as defined herein, attached to the parent molecular group through a sulfur atom.

By "thiol" is meant an —SH group.

By "triflate" is meant an —OSO$_2$—CF$_3$ or —OTf group.

By "triflimide" is meant an —N(SO$_2$—CF$_3$)$_2$ or —NTf$_2$ group.

By "trifyl" or "Tf" is meant an —SO$_2$—CF$_3$ group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

By "micro" is meant having at least one dimension that is less than 1 mm and, optionally, equal to or larger than about 1 μm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 μm but equal to or larger than 1 nm. In other instances, the nanostructure has a dimension that is of from about 1 nm to about 1 μm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

Figure 1A:
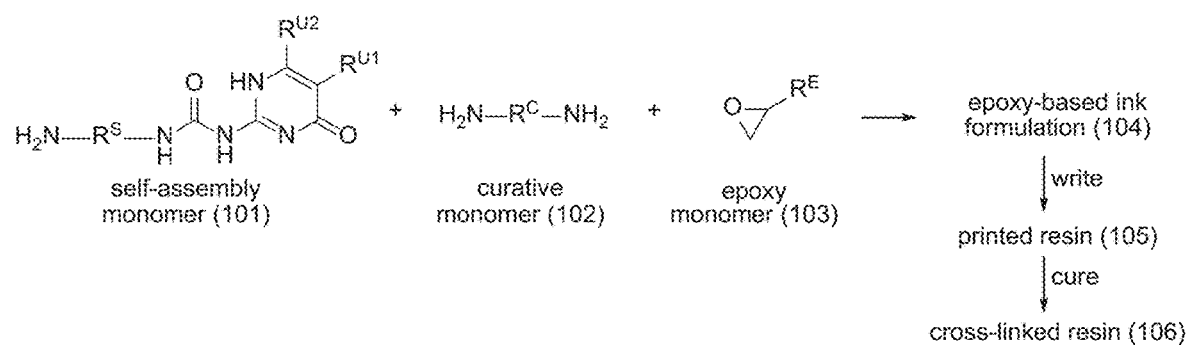
FIG. 1A-1D provides exemplary compounds and formulations. Provided are (A) a schematic of an exemplary formulation including a self-assembly monomer (101), a curative monomer (102), and an epoxy monomer (103), (B) a schematic of an exemplary method of employing a formulation, e.g., any herein; (C) a schematic of exemplary compounds; and (D) a schematic of further exemplary self-assembly monomers.

The present invention relates, in part, to a formulation. In some embodiments, the formulation includes a self-assembly monomer (101), a curative monomer (102), and an epoxy monomer (103) (FIG. 1A). Such a formulation (104) can be employed in any useful manner, such as to write a printed resin structure (105), which can be treated (with a stimulus, e.g., cured at elevated temperatures or cross-linked with UV light) to provide a cross-linked resin (106).

In particular embodiments, we describe herein a self-assembling supramolecular hydrogen-bonding monomer that was synthesized by reacting an amine hardener (e.g., Jeffamine® D230) with a ureidopyrimidinone (UPy) isocyanate, where the molar equivalents of amine to UPy-isocyanate was about 2:1. The synthesized monomer included one amine functional handle and one UPy supramolecular moiety ("UPyD230"). The protons of the amine of the supramolecular monomer was able to undergo a reaction with two epoxide functional groups and can be used as a novel hardener in epoxy thermosets, such as with bisphenol A derivatives (e.g., Epon® 828, Epon® 862, Eponex® 1510, etc.). This monomer was synthesized on a multi gram scale and incorporated into a variety of thermosetting monomer systems (e.g., those including amine and epoxy moieties). The addition of the supramolecular monomer to the native monomer resin formulation increased the viscosity, provided shear thinning, and increased yield stress of the monomer mixture. Without wishing to be limited by mechanism, we believe that these rheological changes endowed 3D printability of the monomer mixture at room temperature.

In other embodiments, the formulation including a filler (e.g., a nanoclay in an amount of from about 10-20%) in order to aid in homogenizing the monomer mixture, as well as, further aiding in shear-thinning behavior of the pre-polymer resin. It should be noted that a resin including the epoxy monomer, curative monomer, and nanoclay was not printable at room temperature in control formulations. Thus, the addition of the self-assembly monomer was required for printing at room temperature, and the resulting resin possessed increased yield stress and allowed the resin to hold a desired shape.

Figure 1B:
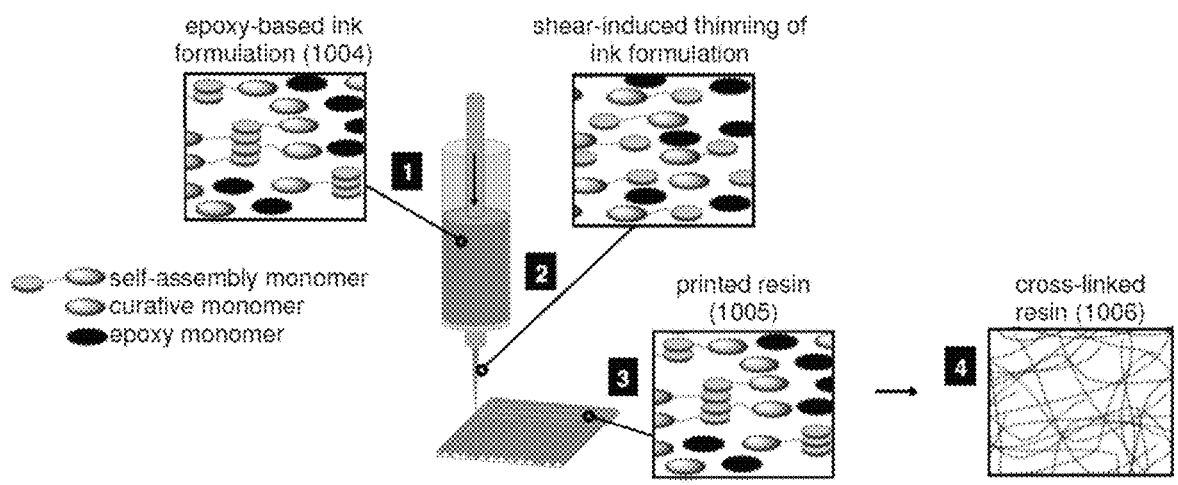

FIG. 1B provides an exemplary method for employing a formulation (1004). In particular, the formulation can have any useful property, e.g., shear-induced thinning. The method can further include providing a printed resin (1005), which can be further treated to provide a cross-linked resin.

Also described herein are printed structures including a pre-polymer resin having a self-assembly monomer. A direct-write printer was used to print the monomer formulation at room temperature. The object held its shape upon being deposited onto the print stage. The 3D object was left to cure at room temperature overnight and then cured in an oven at 65° C. for an additional 2 hours. The printed monomer resin could be lightly cured shortly after printing below temperatures of 80° C., where the hydrogen bonding nature of the ureidopyrimidinone derivative is disrupted. The resin could also be very lightly crosslinked prior to print in order to thicken the extruded material.

Formulations

The present invention relates, in part, to formulations including a self-assembly monomer, a curative monomer, and an epoxy monomer. Exemplary compounds are described herein. In particular embodiments, the self-assembly monomer and the curative monomer provide at least one primary amine group (N—H group) to react with the epoxy group (COC group) of the epoxy monomer. In some non-limiting embodiments, the primary amine and epoxy reactive functional groups are present in equimolar amounts.

Figure 1C:
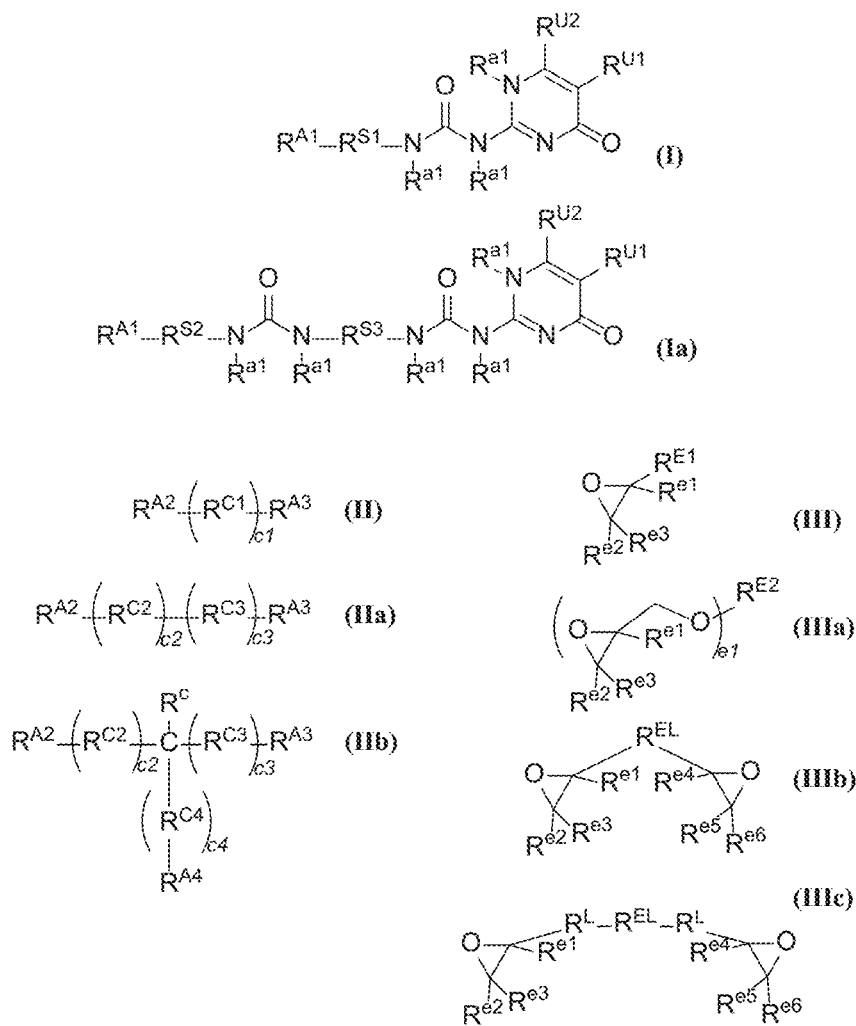

FIG. 1C provides a schematic of exemplary compounds, including exemplary self-assembly monomers (including a structure of formula (I), (Ia), or a salt thereof), a curative monomer (including a structure of formula (II), (IIa), (IIb), or a salt thereof), and an epoxy-monomer (including a structure of formula (III), (IIIa), (IIIb), (IIIc), or a salt thereof).

In some embodiments, each of $R^{U1}$ and $R^{U2}$ is, independently, H, optionally substituted alkyl, optionally substituted heteroalkyl, optionally substituted aryl, or optionally substituted alkaryl. In other embodiments, each of $R^{S1}$, $R^{S2}$, and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit (e.g., $—(X^1)_a—O—(X^2)_b—O—$ or $—(X^1)_a—O—(X^2)_b—$, wherein each $X^1$ and $X^2$ is, independently, any useful group, such as optionally substituted arylene or optionally substituted alkylene, and each a and b is an integer of about 0 to 100 and at least one of a or b is 1 or more), an arylether subunit (e.g., -(Ar)$_a$—O-(Ar)$_b$- or -(Ar)$_a$—O-(Ar)$_b$—O—, wherein Ar is an optionally substituted aryl ene group, as defined herein, and each a and b is an integer of about 0 to 100 and at least one of a or b is 1 or more), a polyethylene glycol subunit (e.g., including —OAk$^1$-, —(OAk$^1$)$_n$-, -Ak$^2$(OAk$^1$)$_n$-, —(OAk$^1$)$_n$Ak$^2$-, or -Ak$^2$(OAk$^1$)$_n$Ak$^3$-, wherein n is 1 to 500 and wherein each of Ak$^1$ and Ak$^2$ and Ak$^3$ is, independently, optionally substituted alkylene), or a combination thereof. In yet other embodiments, each of R$^{A1}$ is, independently, a reactive moiety (e.g., halo, amino, hydroxyl, carboxyl, cyano, nitro, nitroso, aminoalkyl, amido, thio, optionally substituted alkyl, optionally substituted haloalkyl, perfluoroalkyl, optionally substituted alkoxy, optionally substituted alkoxyalkyl, carboxyaldehyde, optionally substituted C$_{2-7}$ alkanoyl, optionally substituted C$_{7-11}$ aryloyl, or optionally substituted C$_{6-18}$ aryl).

In some embodiments, each of R$^{C1}$, R$^{C2}$, R$^{C3}$, and R$^{C4}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit (e.g., —(X$^1$)$_a$—O—(X$^2$)$_b$—O— or —(X$^1$)$_a$—O—(X$^2$)$_b$—, wherein each X$^1$ and X$^2$ is, independently, any useful group, such as optionally substituted arylene or optionally substituted alkylene, and each a and b is an integer of about 0 to 100 and at least one of a or b is 1 or more), an arylether subunit (e.g., -(Ar)$_a$—O-(Ar)$_b$— or -(Ar)$_a$—O-(Ar)$_b$—O—, wherein Ar is an optionally substituted arylene group, as defined herein, and each a and b is an integer of about 0 to 100 and at least one of a or b is 1 or more), a polyethylene glycol subunit (e.g., including —OAk$^1$-, —(OAk$^1$)$_n$-, -Ak$^2$(OAk$^1$)$_n$-, —(OAk$^1$)$_n$Ak$^2$-, or -Ak$^2$(OAk$^1$)$_n$Ak$^3$-, wherein n is 1 to 500 and wherein each of Ak$^1$ and Ak$^2$ and Ak$^3$ is, independently, optionally substituted alkylene), or a combination thereof. In other embodiments, R$^C$ is, independently, H, optionally substituted alkyl, optionally substituted heteroalkyl, optionally substituted aryl, or optionally substituted alkaryl; and each of c1, c2, c3, and c4 is, independently, a number of from about 1 to about 500. In yet other embodiments, each of R$^{A2}$, R$^{A3}$, and R$^{A4}$ is, independently, H, optionally substituted alkyl, or a reactive moiety (e.g., halo, amino, hydroxyl, carboxyl, cyano, nitro, nitroso, aminoalkyl, amido, thio, optionally substituted alkyl, optionally substituted haloalkyl, perfluoroalkyl, optionally substituted alkoxy, optionally substituted alkoxyalkyl, carboxyaldehyde, optionally substituted C$_{2-7}$ alkanoyl, optionally substituted C$_{7-11}$ aryloyl, or optionally substituted C$_{6-18}$ aryl), in which at least one of R$^{A2}$ and R$^{A3}$ and R$^{A4}$ is a reactive moiety.

In some embodiments, each of R$^{E1}$ and R$^{E2}$ is, independently, a moiety including an epoxy group (e.g., an optionally substituted cyclic ether group having a three-atom ring, in which optional substituents include any provided herein, such as for alkyl), optionally substituted alkyl, optionally substituted alkoxyalkyl, optionally substituted aryloxyalkyl, haloalkyl, optionally substituted and, or optionally substituted aryloxy. In other embodiments, each of R$^{e1}$, R$^{e2}$, R$^{e3}$, R$^{e4}$, R$^{e5}$, and R$^{e6}$ is, independently, H, optionally substituted alkyl, optionally substituted heteroalkyl, optionally substituted aryl, or optionally substituted alkaryl. In some embodiments, e1 is, independently, a number of from about 1 to about 500. In yet other embodiments, R$^{EL}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit (e.g., —(X$^1$)$_a$—O—(X$^2$)$_b$—O— or —(X$^1$)$_a$—O—(X$^2$)$_b$—, wherein each X$^1$ and X$^2$ is, independently, any useful group, such as optionally substituted arylene or optionally substituted alkylene, and each a and b is an integer of about 0 to 100 and at least one of a or b is 1 or more), an arylether subunit (e.g., -(Ar)$_a$—O-(Ar)$_b$— or -(Ar)$_a$—O-(Ar)$_b$—O—, wherein Ar is an optionally substituted arylene group, as defined herein, and each a and b is an integer of about 0 to 100 and at least one of a or b is 1 or more), a polyethylene glycol subunit (e.g., including —OAk$^1$-, —(OAk$^1$)$_n$-, Ak$^2$(OAk$^1$)$_n$-, —(OAk$^1$)$_n$Ak$^2$-, or Ak$^2$(OAk$^1$)$_n$Ak$^3$-, wherein n is 1 to 500 and wherein each of Ak$^1$ and Ak$^2$ and Ak$^3$ is, independently, optionally substituted alkylene), or a combination thereof. In other embodiments, each R$^L$ is, independently, any linker described herein (e.g., optionally substituted alkylene, optionally substituted alkenylene, optionally substituted heteroalkylene, thio, oxy, optionally substituted alkyleneoxy, or optionally substituted thioalkylene).

Figure 1D:
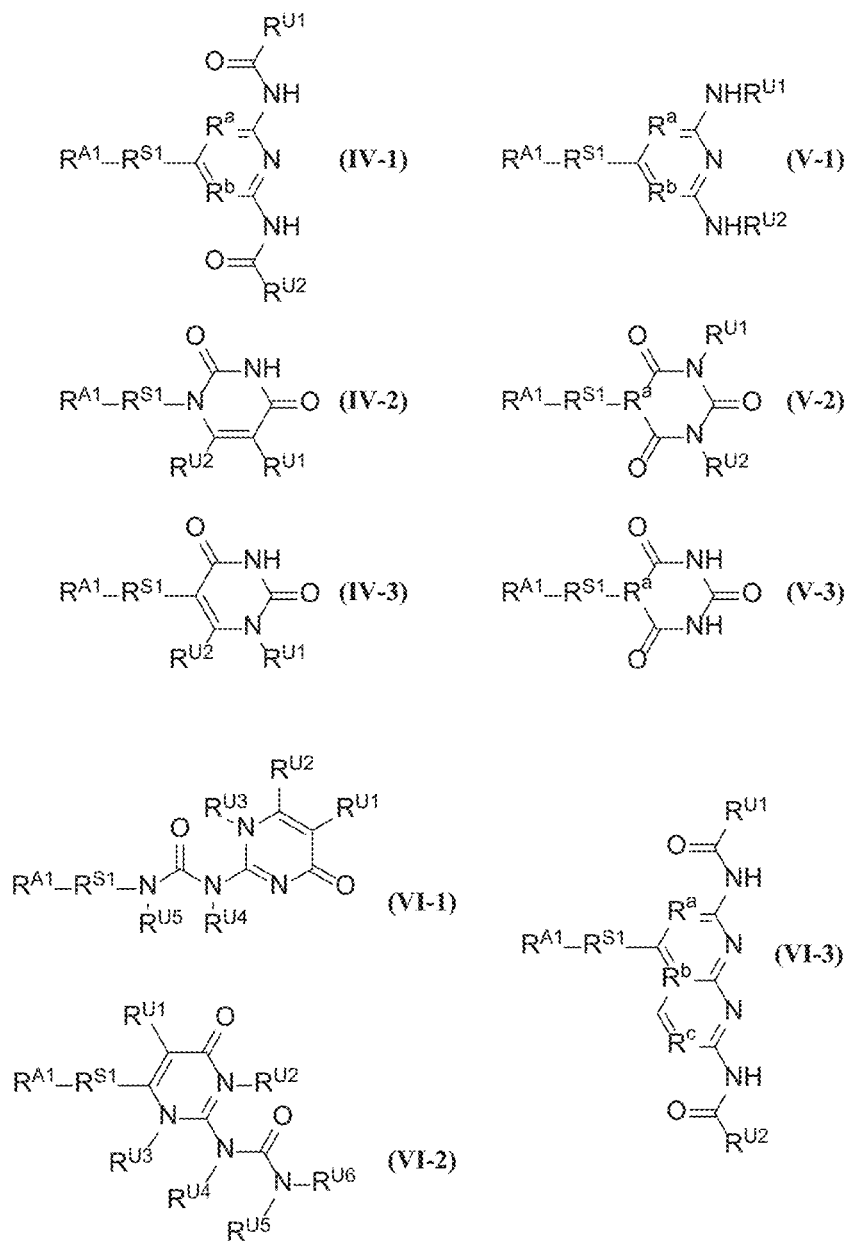

FIG. 1D provides a schematic of yet further exemplary compounds, including exemplary self-assembly monomers. In some embodiments, each of R$^{U1}$, R$^{U2}$, R$^{U3}$, R$^{U4}$, R$^{U5}$, and R$^{U6}$ is, independently, H, optionally substituted alkyl, optionally substituted heteroalkyl, optionally substituted aryl, or optionally substituted alkaryl. In other embodiments, R$^{S1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit (e.g., —(X$^1$)$_a$—O—(X$^2$)$_b$—O— or —(X$^1$)$_a$—O—(X$^2$)$_b$—, wherein each X$^1$ and X$^2$ is, independently, any useful group, such as optionally substituted arylene or optionally substituted alkylene, and each a and b is an integer of about 0 to 100 and at least one of a or b is 1 or more), an aryl ether subunit (e.g., -(Ar)$_a$—O-(Ar)$_b$— or -(Ar)$_a$—O-(Ar)$_b$—O—, wherein Ar is an optionally substituted arylene group, as defined herein, and each a and b is an integer of about 0 to 100 and at least one of a or b is 1 or more), a polyethylene glycol subunit (e.g., including —OAk$^1$-, —(OAk$^1$)$_n$-, -Ak$^2$ (OAk$^1$)$_n$-, —(OAk$^1$)$_n$Ak$^2$-, or -Ak$^2$(OAk$^1$)$_n$Ak$^3$-, wherein n is 1 to 500 and wherein each of Ak$^1$ and Ak$^2$ and Ak$^3$ is, independently, optionally substituted alkylene), or a combination thereof. In some embodiments, each of R$^a$, R$^b$, and R$^c$ is, independently, —CR$^d$— or —N—, wherein R$^d$ is H, optionally substituted alkyl, optionally substituted heteroalkyl, optionally substituted aryl, or optionally substituted alkaryl. In yet other embodiments, each of R$^{A1}$ is, independently, a reactive moiety (e.g., halo, amino, hydroxyl, carboxyl, cyano, nitro, nitroso, aminoalkyl, amido, thio, optionally substituted alkyl, optionally substituted haloalkyl, perfluoroalkyl, optionally substituted alkoxy, optionally substituted alkoxyalkyl, carboxyaldehyde, optionally substituted C$_{2-7}$ alkanoyl, optionally substituted C$_{7-11}$ aryloyl, or optionally substituted C$_{6-18}$ and).

The formulation can be provided in any useful parts. In one embodiment, the formulation is provided as a two-part formulation including a curative monomer and an epoxy monomer, in combination with a self-assembly monomer present at an amount of from about 1 mol. % to about 30 mol. %.

The amount of curative monomer and epoxy monomer can be provided in any useful manner. In some embodiments, the formulation may have a molar ratio of reactive functional groups of the curative monomer (e.g., amino functional groups) and epoxy moieties on the epoxy monomer of from about 0.1:1 to about 3:1. In other embodiments, the molar ratio is about 2:1. In yet other embodiments, the molar ratio is about 1:1.

In particular embodiments, the self-assembly monomer and the curative monomer are pre-mixed together in a molar ratio of from about 0.05:1 to about 4:1.

For any of the compounds described herein, the aryl groups (e.g., including arylene groups) herein can have any useful configuration, structure, and substitutions. Exemplary aryl groups include the following groups, which may be optionally substituted:

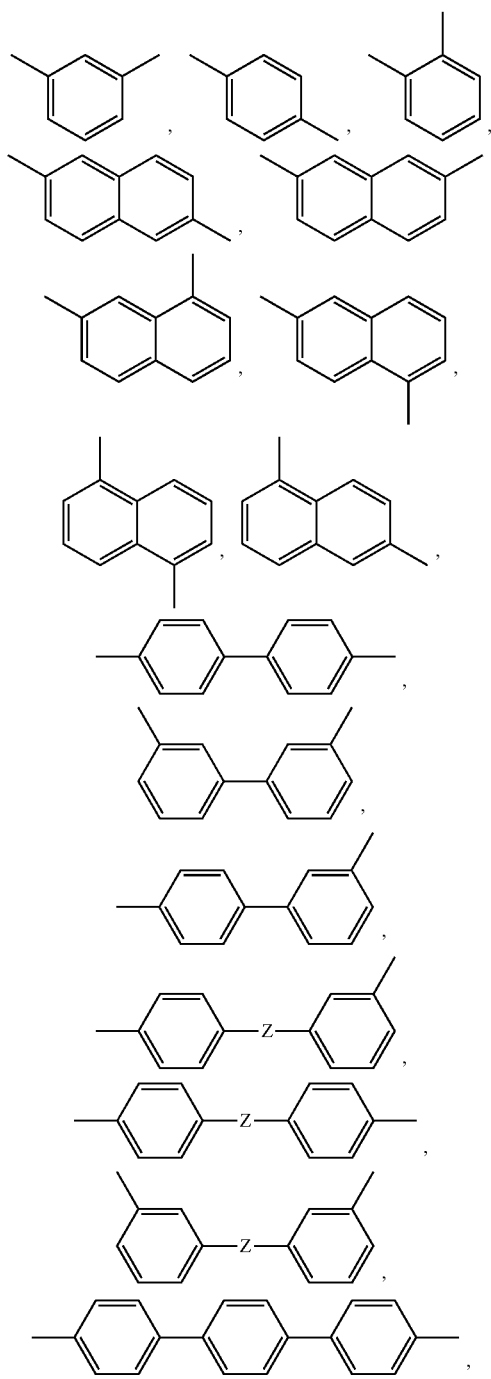

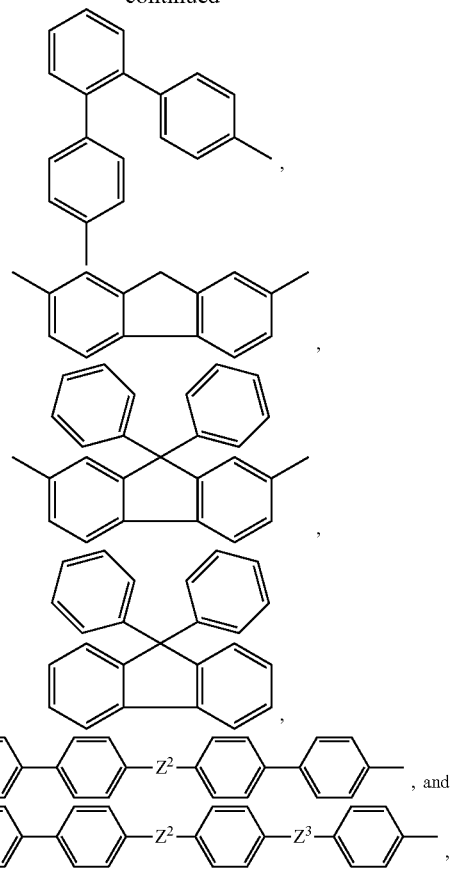

where each of Z, $Z^1$, $Z^2$, and $Z^3$ is, independently, —O—, —S—, —SO$_2$—, optionally substituted $C_{1-12}$ alkylene, optionally substituted $C_{1-12}$ alkenylene, optionally substituted $C_{1-12}$ alkyleneoxy, optionally substituted $C_{1-12}$ heteroalkylene, optionally substituted $C_{1-12}$ heteroalkyleneoxy, —CF$_2$—, —CH$_2$—, —OCF$_2$—, perfluoroalkylene, perfluoroalkyleneoxy, —Si(R$^i$)$_2$—, —P(O)(R$^i$)—, —PR$^i$—, —C(O)—, —C(CF$_3$)$_2$—, —C(CH$_3$)$_2$—, or —CCF$_3$Ph-, and where R$^i$ is H, optionally substituted alkyl, or optionally substituted aryl (e.g., methyl, ethyl, isopropyl, t-butyl, or phenyl).

Any of $R^{S1}$, $R^{S2}$, $R^{S3}$, $R^{C1}$, $R^{C2}$, $R^{C3}$, $R^{EL}$, and/or $R^L$ can be any useful linker (e.g., any described herein). Non-limiting linkers include a multivalent moiety, including but not limited to a bond, oxy, imino, carbonyl, sulfinyl, thio, sulfonyl, an optionally substituted $C_{1-18}$ alkylene, an optionally substituted $C_{1-18}$ heteroalkylene, or an optionally substituted $C_{4-18}$ arylene. For any bivalent linker described herein, another linking interaction can be present to provide a trivalent linker (e.g., as for a triepoxy compound) or a tetravalent linker (e.g., as for a tetraepoxy compound).

Exemplary heteroalkylene linkers include a poly(ether), such as —(OR$_{La}$)$_{L1}$— or —(OR$_{La}$)$_{L1}$O—, in which R$_{La}$ is an optionally substituted $C_{1-18}$ alkylene, as defined herein, and L1 is of from about 0.1 to about 20.

Exemplary linkers include any useful subunit or a repeated subunit. Exemplary linkers include those having a methylene glycol group, e.g., —OCH$_2$— or —OCH$_2$O—, including a poly(methylene glycol) group —(OCH$_2$)$_{L1}$— or —(OCH$_2$)$_{L1}$O—. Other exemplary linkers include those having an ethylene glycol group, e.g., —OCH$_2$CH$_2$— or —OCH₂CH₂O—, including a poly(ethylene glycol) (PEG) group —(OCH₂CH₂)$_{L1}$— or —(OCH₂CH₂)$_{L1}$O—, a four-arm PEG group (such as C(CH₂O(CH₂CH₂O)$_{L1}$-)₄ or C(CH₂O(CH₂CH₂O)$_{L1}$CH₂-)₄ or C(CH₂O(CH₂CH₂O)$_{L1}$CH₂CH₂-)₄ or C(CH₂O(CH₂CH₂O)$_n$CH₂CH₂NHC(O)CH₂CH₂-)₄C(CH₂O(CH₂CH₂O)$_{L1}$CH₂C(O)O—)₄), an eight-arm PEG group (such as —(OCH₂CH₂)$_{L1}$O[CH₂CHO((CH₂CH₂O)$_{L1}$—)CH₂O]₆(CH₂CH₂O)$_{L1}$— or —CH₂(OCH₂CH₂)$_{L1}$O[CH₂CHO((CH₂CH₂O)$_{L1}$CH₂—)CH₂O]₆(CH₂CH₂O)$_{L1}$CH₂— or —CH₂CH₂(OCH₂CH₂)$_{L1}$O[CH₂CHO((CH₂CH₂O)$_{L1}$CH₂CH₂—)CH₂O]₆(CH₂CH₂O)$_{L1}$CH₂CH₂— or R(O(CH₂CH₂O)$_{L1}$-)₈ or R(O(CH₂CH₂O)$_{L1}$CH₂-)₈ or R(O(CH₂CH₂O)$_{L1}$CH₂CH₂-)₈, in which R includes a tripentaerythritol core), or a derivatized PEG group (e.g., methyl ether PEG (mPEG), a propylene glycol group, etc.); including dendrimers thereof, copolymers thereof (e.g., having at least two monomers that are different), branched forms thereof, start forms thereof, comb forms thereof, etc. In any embodiment herein, L1 is of from about 0.1 to about 20.

Other exemplary linkers include those having a propylene glycol group, e.g., —OCH₂CH₂CH₂— or —OCH₂CH₂CH₂O— or —OCH₂(CH₃)CH₂— or —OCH₂(CH₃)CH₂O—, as well as polymeric forms there (e.g., —(OCH₂CH₂CH₂)$_{L1}$—, —(OCH₂CH₂CH₂)$_{L1}$O—, —(OCH(CH₃)CH₂)$_{L1}$—, or —(OCH(CH₃)CH₂)$_{L1}$O—). Yet other linkers include optionally substituted forms thereof, such as —OCH₂CH(OH)CH₂—, —OCH₂CH(OH)CH₂O—, —(OCH₂CH(OH)CH₂)$_{L1}$—, or —(OCH₂CH(OH)CH₂)$_{L1}$O—).

Other exemplary linkers include those having a tetramethylene glycol group, e.g., —OCH₂CH₂CH₂CH₂— or —OCH₂CH₂CH₂CH₂O—, as well as polymeric forms there (e.g., —(OCH₂CH₂CH₂CH₂)$_{L1}$— or —(OCH₂CH₂CH₂CH₂)$_{L1}$O—).

The linker may include a covalent linker or a non-covalent linker. In some embodiments: the linker may comprise a flexible arm. e.g., 2, 3, 4, 5, 6, 7, 8, 9, 10, 11, 12, 13, 14, or 15 carbon atoms. Exemplary linkers include BS3 ([bis(sulfosuccinimidyl)suberate]; BS3 is a homobifunctional N-hydroxysuccinimide ester that targets accessible primary amines), NHS/EDC (N-hydroxysuccinimide and N-ethyl-'(dimethylaminopropyl)carbodimide; NHS/EDC allows for the conjugation of primary amine groups with carboxyl groups), sulfo-EMCS ([N-e-Maleimidocaproic acid]hydrazide; sulfo-EMCS are heterobifunctional reactive groups (maleimide and NHS-ester) that are reactive toward sulfhydryl and amino groups), hydrazide (most proteins contain exposed carbohydrates and hydrazide is a useful reagent for linking carboxyl groups to primary amines), and SATA (N-succinimidyl-S-acetylthioacetate; SATA is reactive towards amines and adds protected sulfhydryls groups). Examples of other suitable linkers are succinic acid, Lys, Glu, Asp, a dipeptide such as Gly-Lys, an α-helical linker (e.g., A(EAAAK)$_n$A, where n is 1, 2, 3, 4, or 5), an alkyl chain (e.g., an optionally substituted C$_{1-12}$ alkylene or alkynyl chain), or a polyethylene glycol (e.g., (CH₂CH₂O)$_m$, where m is from 1 to 50).

Other exemplary linkers can include one or more aryl groups (e.g., an arylene group). The aryl groups herein can have any useful configuration, structure, and substitutions. Exemplary and groups (e.g., including arylene groups) include the following groups, which may be optionally substituted:

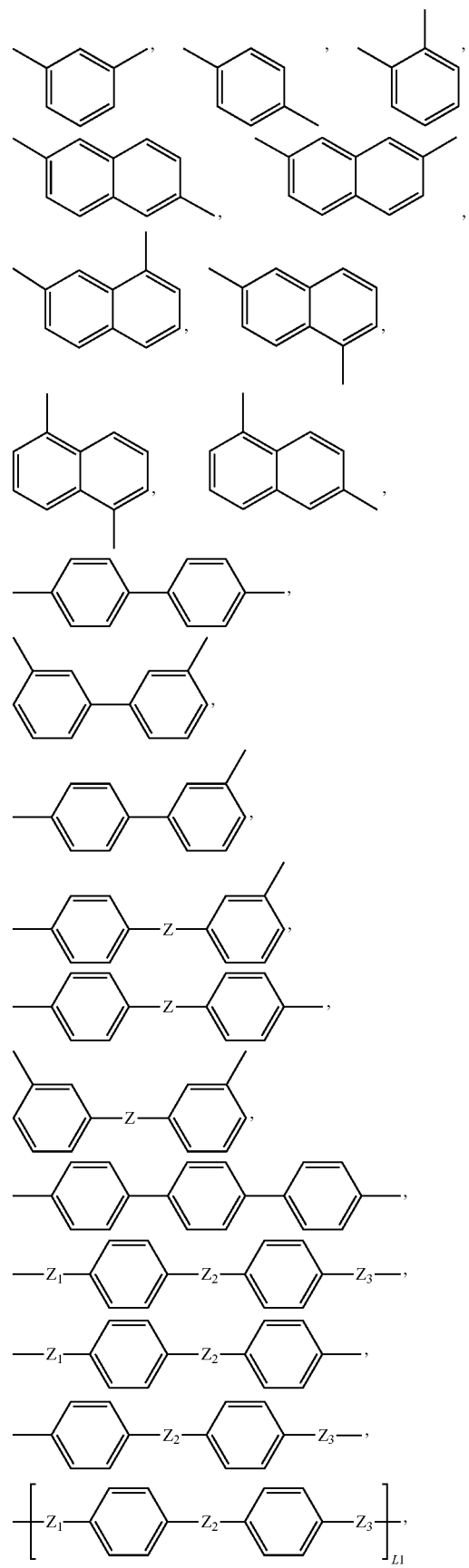

-continued

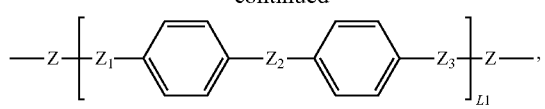

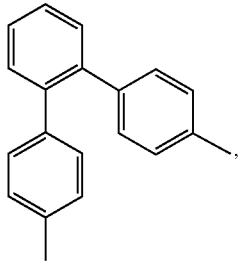

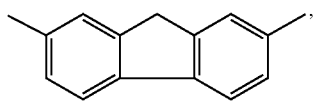

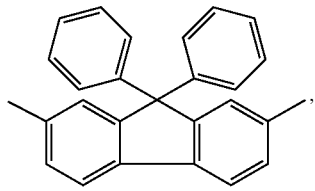

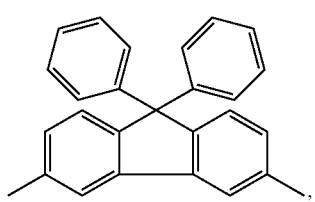

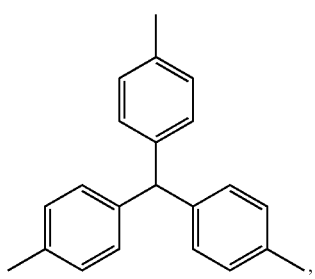

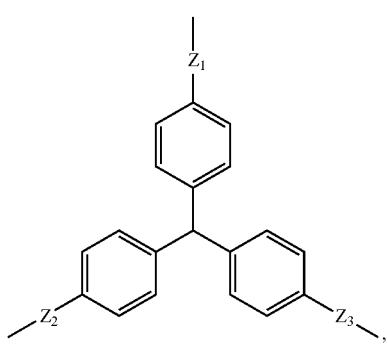

-continued

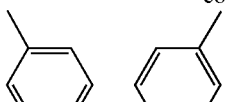

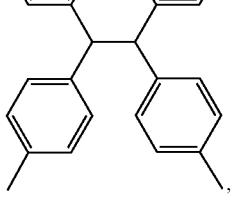

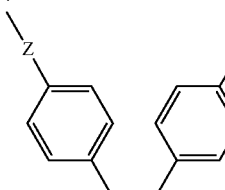

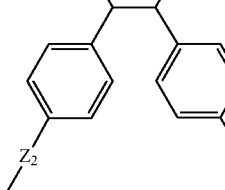

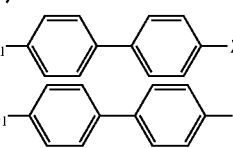, and

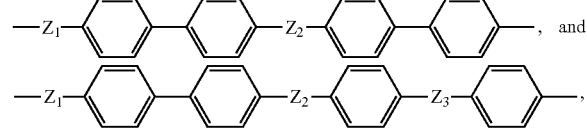

where each of Z, $Z_1$, $Z_2$, and $Z_3$ is, independently, a bond, —O—, —S—, —SO$_2$—, optionally substituted $C_{1-12}$ alkylene, optionally substituted $C_{1-12}$ alkyleneoxy, optionally substituted $C_{1-12}$ heteroalkylene (e.g., any described herein, such as those including a methylene glycol, ethylene glycol, propylene glycol, or tetramethylene glycol group), optionally substituted $C_{1-12}$ heteroalkyleneoxy, —CF$_2$—, —CH$_2$—, —OCF$_2$—, —OCH$_2$—, perfluoroalkylene, perfluoroalkyleneoxy, —Si(R$^i$)$_2$—, —P(O)(R$^i$)—, —PR$^i$—, —C(O)—, —C(CF$_3$)$_2$—, (C(CH$_3$)$_2$—, or —CCF$_3$Ph-, and where R$^i$ is H, optionally substituted alkyl, or optionally substituted aryl (e.g., methyl, ethyl, isopropyl, t-butyl, or phenyl).

Self-Assembly Monomers

The present invention, in part, relates to ink formulations includes a self-assembly monomer, which in turn has a chemical moiety that facilitates supramolecular assembly within the formulation. The self-assembly monomer generally includes two moieties: a first moiety having one or more functional groups that facilitate reversible bonding (e.g., H bonding) within a formulation; and a second moiety (e.g., R$^A$) that reacts with an epoxy monomer.

The first moiety can include any useful functional group that provides self-assembly within a formulation through supramolecular assembly. Exemplary, non-limiting functional groups include a first 2-ureido-4[1H]-pyrimidinone-containing (UPy-containing) group in use with a second UPy-containing group, which may be the same or different as the first UPy-containing group; a ditopic uracil-containing or thymine-containing (THY-containing) group in use with a diaminopyridine-containing (DAP-containing) group, which forms H-bonds through complementary recognition; a cyanuric acid-containing (CA-containing) group in use with a diaminotriazine-containing (DAT-containing) group; a CA-containing group in use with a $N^1,N^3$-bis(6-butyramidopyridin-2-yl)-5-hydroxyisophthalamide-containing (a Hamilton wedge-containing) group; a ureidoguanosine-containing (UG-containing) group in use with a 2,7-diamido-1,8-naphthyridine-containing (DAN-containing) group; and a UPy-containing group in use with a DAN-containing group. Further functional groups are described in Elacqua E et al., "Engineering orthogonality in supramolecular polymers: from simple scaffolds to complex materials," *Acc. Chem. Res.* 2014; 47:2405-16, which is incorporated herein by reference in its entirety.

The second moiety can include any useful functional group that reacts with an epoxy monomer. Exemplary, non-limiting functional groups include amino, hydroxyl, as well as any other reactive group described herein. In some embodiments, the second moiety can include, e.g., halo, amino, hydroxyl, carboxyl, cyano, nitro, nitroso, aminoalkyl, amido, thio, optionally substituted alkyl, optionally substituted haloalkyl, perfluoroalkyl, optionally substituted alkoxy, optionally substituted alkoxy alkyl, carboxyaldehyde, optionally substituted $C_{2-7}$ alkanoyl, optionally substituted $C_{7-11}$ aryloyl, or optionally substituted $C_{6-18}$ aryl In particular embodiments, the self-assembly monomer can include a curative monomer (e.g., any described herein) that has been functionalized to include one or more first moieties (e.g., any described herein, such as a UPy moiety) and/or second moieties (e.g., any described herein, such as an amino or hydroxyl).

Any useful functional group can be disposed between the first moiety and the second moiety of the self-assembly monomer. Exemplary functional groups include an ethylene glycol group, e.g., —OCH$_2$CH$_2$—, including a poly(ethylene glycol) (PEG) group —(OCH$_2$CH$_2$)$_n$—, a four-arm PEG group (such as C(CH$_2$O(CH$_2$CH$_2$O)$_n$—)$_4$ or C(CH$_2$O (CH$_2$CH$_2$O)$_n$CH$_2$-)$_4$ or C(CH$_2$O(CH$_2$CH$_2$O)$_n$CH$_2$CH$_2$-)$_4$ or C(CH$_2$O(CH$_2$CH$_2$O)$_n$CH$_2$CH$_2$NHC(O)CH$_2$CH$_2$-)$_4$C(CH$_2$O (CH$_2$CH$_2$O)$_n$CH$_2$C(O)O—)$_4$), an eight-arm PEG group (such as —(OCH$_2$CH$_2$)$_n$O[CH$_2$CHO((CH$_2$CH$_2$O)$_n$—) CH$_2$O]$_6$(CH$_2$CH$_2$O)— or —CH$_2$(OCH$_2$CH$_2$)$_n$O[CH$_2$CHO ((CH$_2$CH$_2$O)$_n$CH$_2$—)CH$_2$O]$_6$(CH$_2$CH$_2$O)$_n$CH$_2$— or —CH$_2$CH$_2$(OCH$_2$CH$_2$)$_n$O[CH$_2$CHO((CH$_2$CH$_2$O)$_n$CH$_2$ CH$_2$—)CH$_2$O]$_6$(CH$_2$CH$_2$O)$_n$CH$_2$CH$_2$— or R(O (CH$_2$CH$_2$O)$_n$)$_8$ or R(O(CH$_2$CH$_2$O)$_n$CH$_2$-)$_8$ or R(O (CH$_2$CH$_2$O)$_n$CH$_2$CH$_2$-)$_8$, in which R includes a tripentaerythritol core), or a derivatized PEG group (e.g., methyl ether PEG (mPEG), a propylene glycol group, etc.); including dendrimers thereof, copolymers thereof (e.g., having at least two monomers that are different), branched forms thereof, start forms thereof, comb forms thereof, etc., in which n is any useful number in any of these (e.g., any useful n to provide any useful number average molar mass $M_n$). Yet other functional groups can include, e.g., a sulfone subunit (e.g., a subunit including an —SO$_2$— group); an arylene sulfone subunit (e.g., -(Ar)$_a$—SO$_2$-(Ar)$_b$—, where Ar is an optionally substituted arylene group, as defined herein r any described herein, and each a and b is an integer of about 0 to 100 and at least one of a or b is 1 or more); an ether sulfone subunit (e.g., —(X$^1$)$_a$—SO$_2$—(X$^2$)$_b$—O— or —X$^1$—O—X$^2$—SO$_2$—, where each X$^1$ and X$^2$ is, independently, any useful group, such as optionally substituted arylene or optionally substituted alkylene, and each a and b is an integer of about 0 to 100 and at least one of a or b is 1 or more), an ether subunit (e.g., —(X$^1$)$_a$—O—(X$^2$)$_b$— O— or —(X$^1$)$_a$—O—(X$^2$)$_b$— or —X$^1$—O—X$^2$—O—, where each X$^1$ and X$^2$ is, independently, any useful group, such as optionally substituted arylene or optionally substituted alkylene, and each a and b is an integer of about 0 to 100 and at least one of a or b is 1 or more); an arylene ether subunit (e.g., -(Ar)$_a$—O-(Ar)$_b$— or -(Ar)$_a$—O-(Ar)$_b$—O—, where Ar is an optionally substituted arylene group, as defined herein or any described herein, and each a and b is an integer of about 0 to 100 and at least one of a or b is 1 or more); an arylene ketone subunit (e.g., -(Ar)$_a$—C(O)-(Ar)$_b$—, where Ar is an optionally substituted arylene group, as defined herein r any described herein, and each a and b is an integer of about 0 to 100 and at least one of a or b is 1 or more); a perfluoroalkyl subunit (e.g., —(CF$_2$)$_{f1}$—, where f1 is an integer of 1 to about 16); a perfluoroalkoxy subunit (e.g., —O(CF$_2$)$_{f1}$—, —(CF$_2$)$_{f1}$O—, —O(CF$_2$)$_{f1}$CF(CF$_3$)O (CF$_2$)$_{f2}$—, >CFO(CF$_2$)$_{f1}$CF(CF$_3$)O(CF$_2$)$_{f2}$—, where each f1 and f2 is, independently, an integer of 1 to about 16); or a polyethylene glycol subunit (e.g., including —OAk$^1$-, —(OAk$^1$)$_n$-, -Ak$^2$(OAk$^1$)$_n$-, —(OAk$^1$)$_n$Ak$^2$-, or -Ak$^2$ (OAk$^1$)$_n$Ak$^3$-, wherein n is 1 to 500 and wherein each of Ak$^1$ and Ak$^2$ and Ak$^3$ is, independently, optionally substituted alkylene).

Curative Monomers

Any useful curative monomer can be employed within the formulation. The curative monomer generally includes at least two reactive moieties disposed between a linking group. Exemplary reactive moieties include any described herein, e.g., such as for the self-assembly moiety. The linking group can be any described herein, such as those described for a functional group disposed between the first moiety and the second moiety of the self-assembly monomer (e.g., a sulfone subunit; an ether sulfone subunit; an ether subunit; an arylene ether subunit; an arylene ketone subunit, a perfluoroalkyl subunit; a perfluoroalkoxy subunit; or a polyethylene glycol subunit, such as those described herein).

Exemplary, non-limiting curative monomers include amine curing agents, such as ethylene diamine, diethylene diamine, diethylene triamine, triethylene tetramine, propylene diamine, tetraethylene pentamine, hexaethylene heptamine, hexamethylene diamine, 2-methyl-1,5-pentamethylene-diamine, 1,8-diaminooetane, 4,7,10-trioxatridecan-1,13-diamine, aminoethylpiperazine and the like. In some embodiments, the amine curing agent is a polyether amine having one or more amine moieties, including those polyether amines that can be derived from polypropylene oxide or polyethylene oxide. Commercially available polyether amines include the Jeffamine™ series of polyether polyamines (available from Huntsman Corporation in Woodlands, Tex., such as Jeffamine© D-400, a polyether (polyoxypropylene glycol) amine having an average molecular weight (MW) of 430 g mol$^{-1}$ and an average amine hydrogen equivalent weight (AHEW) of 115 g eq$^{-1}$; Jeffamine® ED-600, a polyethylene glycol amine having an average MW of 600 g mol$^{-1}$ and an average AHEW of 132 g eq$^{-1}$; Jeffamine® EDR-148, a polyethylene glycol amine having an average MW of 148 g mol$^{-1}$ and an average AHEW of 37 g eq$^{-1}$; or Jeffamine© D-230, a polyether diamine having an average MW of 230 g mol$^{-1}$ and an average AHEW of 60 g eq$^{-1}$), Dytek® A (2-methylpentane-1,5-diamine, available from INVISTA S.ár.l. in Wilmington, Del.), and 4,7,10-trioxatridecane-1,13-diamine (TTD) (available from TCI America in Portland, Oreg.).

Epoxy Monomers

Any useful epoxy monomer can be employed within the formulation. The epoxy monomer generally includes one or more an epoxy group (e.g., an optionally substituted cyclic ether group having a three-atom ring, in which optional substituents include any provided herein, such as for alkyl).

In some embodiments, the epoxy monomer generally includes at least two epoxy groups disposed between a linking group. The linking group can be any described herein, such as those described for a functional group disposed between the first moiety and the second moiety of the self-assembly monomer (e.g., a sulfone subunit; an ether sulfone subunit; an ether subunit; an arylene ether subunit; an arylene ketone subunit; a perfluoroalkyl subunit; a perfluoroalkoxy subunit; or a polyethylene glycol subunit, such as those described herein).

Any useful monomer containing an epoxy group can be employed within the formulation. Non-limiting, exemplary epoxy monomers include diglycidyl ether of bisphenol A (DGEBA, DGEBPA, or BADGE); N,N,N',N'-tetraglycidyl-4,4'-methylene dianiline (TGMDA); 3,4-epoxy cyclohexyl methyl 3',4'-epoxy cyclohexane carboxylate; p-glycidyl oxystyrene (GOS); glycidyl methacrylate (GMA); diglycidyl ether of bisphenol F (DGEBF or DGEBPF); bisphenol A (BPA) derivatives; bisphenol F (BPF) derivatives; epoxy phenolic novolac resins; epoxy BPA novolac resins; epoxy BPF novolac resins; epoxy cresol novolac resins; epoxy acrylate resins; a brominated bisphenol A epoxy resin (DGETBBPA); tetraglycidyl ether of tetraphenylol ethane (TGETPE); Epon™ Resin 828 from Flexion Inc., a bisphenol A/epichlorohydrin derived liquid epoxy resin (phenol, 4,4O-(1-methylethylidene) bis-polymer with (chloromethyl) oxirane) with a weight per epoxide (WPE) of from about 185 to 192 g eq$^{-1}$, Epon™ Resin 825 from Hexion Inc., a bisphenol A epichlorohydrin epoxy resin; Epon™ Resin 862 from Hexion Inc., diglycidyl ether of bisphenol F with a WPE of from about 175 to 180 g eq$^{-1}$; Epon™ Resin 826 from Hexion Inc., a BPA-based epoxy resin with a WPE of from about 178 to 186 g eq$^{-1}$; Epon™ Resin 830 from Hexion Inc., a BPA-based epoxy resin with a WPE of from about 190 to 198 g eq$^{-1}$; Epon™ Resin 834 from Hexion Inc., a BPA-based epoxy resin with a WPE of from about 235 to 263 g eq$^{-1}$; and Eponex™ Resin 1510 from Hexion Inc., a low viscosity, cycloaliphatic (e.g., cyclohexyl) glycidyl ether epoxy-based resin with a WPE of from about 210 to 220 g eq$^{-1}$, derivatives thereof and/or modified forms thereof, as well as resins including any of these.

Various other epoxy monomers, resins, curing agents, modifiers, and other additives are provided under the trade name Epikote™, Eponex™, Epikure™, Eponol™, and Epon™ from Hexion Inc., Columbus, Ohio.

Further exemplary epoxy monomers include, e.g., glycidyl ethers of bisphenol A and F, aliphatic diols, or cycloaliphatic diols (e.g., having a molecular weight in the range of from about 200 g mol$^{-1}$ to about 3,000 g mol$^{-1}$). Yet other epoxy monomers include, e.g., linear polymeric epoxides having terminal epoxy groups (e.g., a diglycidyl ether of polyoxyalkylene glycol) and aromatic glycidyl ethers (e.g., those prepared by reacting a dihydric phenol with an excess of epichlorohydrin). Examples of useful dihydric phenols include resorcinol, catechol, hydroquinone, and the polynuclear phenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2',2,3',2,4', 3,3',3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane. Suitable commercially available aromatic and aliphatic epoxides include diglycidylether of bisphenol A (e.g., available under the tradename Epon® 828 (diglycidyl ether of bis-phenol A having an approximate epoxy equivalent weight of 187.5), Epon® 872 (a fatty-acid modified diglycidyl ether of bisphenol A having an approximate epoxy equivalent weight of 625-725), Epon® 1001F (low molecular weight solid epoxy resin derived from a liquid epoxy resin and bisphenol-A, with an epoxide equivalent weight of 525-550), Epon® 1310, and Eponex® 1510 (diglycidyl ether of hydrogenated bis-phenol A having an approximate epoxy equivalent weight of 210) from Hexion Specialty Chemicals GmbH in Rosbach, Germany), DER-331, DER-332, and DER-334 (available from Dow Chemical Co. in Midland, Mich.); diglycidyl ether of bisphenol F (e.g., Eplicon® 830 available from Dainippon Ink and Chemicals, Inc.); PEG1000DGE (available from Polysciences, Inc. in Warrington, Pa.); silicone resins containing diglycidyl epoxy functionality; flame retardant epoxy resins (e.g., DER 580, a brominated bisphenol type epoxy resin available from Dow Chemical Co. in Midland, Mich.); 1,4-dimethanol cyclohexyl diglycidyl ether, and 1,4-butanediol diglycidyl ether. Other epoxy resins based on bisphenols are commercially available under the tradenames D.E.N., EPALLOY, and EPILOX.

Additional exemplary epoxy compounds include diglycidyl ether of bisphenol A (DGEBPA) and modified versions thereof, commercially available as Epon™ 826 or Epon™828 from Hexion Inc., Columbus, Ohio, and Araldite® MY 790 or Araldite® CY 225 or Araldite® GY 6010 or Tactix® 123 from Huntsman Advanced Materials GmbH, Basel, Switzerland; bisphenol A epichlorohydrin polymer, commercially available as Epon™ 1009 from Hexion or Araldite® 527 from Huntsman; diglycidyl ether of bisphenol F (DGEBPF), commercially available as Epon™ 862 from Hexion or Araldite® PY 306 from Huntsman; phenol novolac epoxy resins, commercially available as Tactix® 556 from Huntsman; triglycidyl m-aminophenol epoxy compounds, including triglycidylether of meta-amino phenol (TGMAP), commercially available as Araldite© MY 0600 or Araldite® MY 0610 from Huntsman, and triglycidylether of para-amino phenol (TGPAP), commercially available as Araldite® MY 0500 or Araldite® MY 0510 from Huntsman; as well as mixtures thereof.

Exemplary monoepoxy compounds include alkoxy monoepoxy compounds, such as butyl glycidyl ether, allyl glycidyl ether, and tert-butyl glycidyl ether; cycloalkyl monoepoxy compounds, such as cyclohexene oxide and cyclopentene oxide; aryloxy monoepoxy compounds, such as 4-chlorophenyl glycidyl ether.

Exemplary diepoxy compounds include bisphenol-based diepoxy compounds, such as bis[4-(glycidyloxy)phenyl] methane, diglycidyl ether of bisphenol A, and diglycidyl ether of bisphenol F; 1,3-butadiene diepoxide; aryl diepoxy compounds, such as 1,6-naphthalene diepoxy, commercially available as Araldite® MY 0816 from Huntsman, and fluoren diepoxy, commercially available as LME 10169 from Huntsman; diol diepoxy compounds, such as 1,4-butanediol diglycidyl ether, resorcinol diglycidyl ether, and neopentyl glycol diglycidyl ether; carboxylate diepoxy compounds, such as diglycidyl 1,2-cyclohexanedicarboxylate and 3,4-epoxycyclohexylmethyl 3,4-epoxycyclohexanecarboxylate; alkylene diepoxy compounds, such as dicyclopentadiene dioxide, 1,2,5,6-diepoxycyclooctane, and 1,2,7,8-diepoxy octane, as well as mixtures thereof.

Exemplary triepoxy compounds include aryl triepoxy compounds, such as tris(4-hydroxyphenyl)methane triglycidyl ether, commercially available as Tactix® 742 from Huntsman; isocyanurate epoxy compounds, such as tris(2,3-epoxypropyl) isocyanurate; and amino phenol triepoxy compounds, such as triglycidyl m-aminophenol (TGMAP) and triglycidyl p-aminophenol (TGPAP), as well as mixtures thereof.

Exemplary tetraepoxy compounds include aryl tetraepoxy compounds, such as tetra(4-hydroxyphenyl)ethane tetraglycidyl ether, commercially available as XB 4399-3 from Huntsman. Exemplary tetraepoxy compounds include bisaniline-based tetraepoxy compounds, such as 4,4'-methylenebis(N,N-diglycidylaniline).

Yet other exemplary epoxy compounds include polyhydric phenol polyether alcohols; glycidyl ethers of novolae resins, such as epoxylated phenol-formaldehyde novolac resin, glycidyl ethers of mononuclear di- and trihydric phenols; glycidyl ethers of bisphenols, such as diglycidyl ether of tetrabromobisphenol A, glycidyl ethers of polynuclear phenols; epoxy resin from diphenolic acid; glycidyl ethers of aliphatic polyols, such as chlorine-containing aliphatic diepoxy and polyepichlorohydrin; glycidyl esters such as aliphatic diacid glycidyl esters and epoxidized phenolphthalein, glycidyl epoxies containing nitrogen, such as glycidyl amides and amide-containing epoxies; glycidyl derivatives of cyanuric acid; glycidyl resins from melamines; glycidyl amines, such as triglycidyl ether amine of p-aminophenol and bis(2,3-epoxypropyl) methylpropylammonium p-toluenesulfonate; glycidyl triazines; thioglycidyl resins, such as epoxidized bisulfide; silicon-glycidyl resins such as 1,4-bis(2,3-ep oxypropoxy)dimethylsilyl; fluorine glycidyl resins; epoxy resins which are synthesized from monoepoxies other than epihalohydrins including epoxy resins from unsaturated monoepoxies, such as polyallyl glycidyl ether and glycidyl sorbate dimer, epoxy resins from monoepoxy alcohols; epoxy resins from monoepoxies by ester interchange, epoxy resins from glycidaldehyde; polyglycidyl compounds containing unsaturation, such as allyl-substituted diglycidyl ether of bisphenol A; epoxy resins synthesized from olefins and chloroacetyls, such as butadiene dioxide, vinylcyclohexene dioxide, epoxidized polybutadiene, and bis(2,3-epoxycyclopentyl)ether, as well epoxy-resin adducts thereof and mixtures thereof.

Additives

The formulations herein can include one or more other useful additives. Exemplary-additives include one or more hardeners, e.g., triethylenetetramine (TETA); secondary curatives (e.g., imidazoles, imidazole-salts, imidazolines or aromatic tertiary amines); fillers (e.g., nanoparticles, nanosheets, etc.), reactive liquid modifiers (e.g., acetoacetoxy-functionalized compounds containing at least one acetoacetoxy group); oil-displacing agents (e.g., mineral oils, fats, dry lubes, deep drawing oils, corrosion protection agents, lubricating agents and waxes), metal salts (e.g., a metal salt catalyst, such as those including group I metals (e.g., lithium), group II metals (e.g., calcium and magnesium) or lanthanoid salts (e.g., lanthanum), wherein the anion is selected from nitrates, iodides, thiocyanates, triflates, alkoxides, perchlorates, and sulfonates); surfactants (e.g., ionic surfactants, anionic surfactants, nonionic surfactants and zwitterionic surfactants, including triproylene glycol monomethyl ether and polyethylene sorbitol); reactive diluents (e.g., diglycidyl ether of resorcinol, diglycidyl ether of cyclohexane dimethanol, diglycidyl ether of neopentyl glycol, triglycidyl ether of trimethylolpropane, Reactive Diluent 107 (available from Hexion Specialty Chemical in Houston, Tex.), and Epodil®757 (available from Air Products and Chemical Inc, in Allentown, Pa.)), pigments (e.g., inorganic or organic pigments including ferric oxide, brick dust, carbon black, titanium oxide and the like), etc.

Yet other additives can include, e.g., aliphatic and aromatic hydrocarbons, alkyl esters, alkyl ethers, and esters, aryl ethers, alkyl alcohols, glycols and glycol ethers. Exemplary oil-displacing agents include 3,3-dimethyl-1,2-epoxybutane, 1,2-epoxy octane, 1,2-epoxyhexane, 1,2-epoxybutane, 1,2-epoxydodecane, α-pinene, 2-octanol, 3,3,5-trimethylcyclohexyl methacrylate, limonene, (3-pinene, 1,2-epoxydecane, 1,8-cineole, limonene oxide, α-pinene oxide, CMO glycidyl ethers (e.g., methyl glycidyl ether, ethyl glycidyl ether, isopropyl glycidyl ether, n-butyl glycidyl ether, isobutyl glycidyl ether, t-butyl glycidyl ether, and Epodil® 746 and Epodil® 747 available from Air Products and Chemicals Inc, in Allentown, Pa., USA), glycidyl ester derivative of versatic acid (Cardura™ N-10 available from Hexion Chemical in Europe), hydroxyl acrylate monomer of glycidyl ester (ACE™ Hydroxyl Acrylate Monomer available from Hexion Chemical in Europe), Dynamar™ Polyetherdiamine HC 1101 (available from 3M Corporation in St. Paul, Minn., USA), carboxyl-terminated butadiene acrylonitrile (available from Emerald Chemical in Alfred, Me., USA), K-FLEX® XM-B301 and K-FLEX® 7301 (both available from King Industries in Norwalk, Conn., USA), MaAcAc 1000 MW Oligomer, MaAcAc 2000 MW Oligomer, Urethane diAcAc #1, and Urethane diAcAc #2, lanthanum nitrate, lanthanum triflate, lithium iodide, lithium nitrate, calcium nitrate, and others.

In some embodiments, the formulation includes one or more fillers. Fillers may include silica-gels, Ca-silicates, phosphates, molybdates, fumed silica, clays such as bentonite, organo-clays, aluminium-trihydrates, hollow-glass-microspheres; hollow-polymeric microspheres and calcium carbonate. Exemplary commercial fillers include SHIELDEX® AC5 (a synthetic amorphous silica, calcium hydroxide mixture available from W.R. Grace in Columbia, Md., USA); CAB-O-SIL® TS 720 (a hydrophobic fumed silica-treated with polydimethyl-siloxane-polymer available from Cabot GmbH in Hanau, Germany), AEROSIL® VP-R-2935 (a hydrophobically fumed silica available from Degussa in Düsseldorf, Germany); glass-beads class IV (250-300 microns): Micro-billes de verre 180/300 (available from CVP S.A. in France); glass bubbles K37: amorphous silica (available from 3M Deutschland GmbH in Neuss, Germany); MINSIL SF 20 (available from Mineo Inc., 510 Midway, Tenn., USA); amorphous, fused silica; and APYRAL 24 ES2 (epoxysilane-functionalized (2 wt %) aluminium trihydrate available from Nabaltec GmbH in Schwandorf, Germany).

Further exemplary fillers include silica (e.g., fumed silica, such as commercially available Cab-o-sil® TS-530 from Cabot Corp., Billerica, Mass.); clay, including nanoclays (e.g., montmorilionite (MMX), kaolinite, bentonite, or saponite), silicate, including quartz, phyllosilicates, and organophilie phyllosilicates, such as commercially available Garamite® 7305, Cloisite® 30B, Cloisite® 93A, and Cloisite®-Na+ from BYK-Chemie GmbH. Wesel, Germany; glass, including glass microspheres; talc, fibers, including microfibers and nanofibers; metal powders, including metal oxide fillers; oxide particles, including titanium dioxide, silicon dioxide, or aluminum oxide, ceramics; as well as polymeric and/or colloidal and/or powder forms thereof. In other embodiments, the filler includes barium sulfate, calcium carbonate, barium titanate, silicon oxide, silica, talc, clay, hydrotalcite, and/or mica powder.

Yet other fillers include inorganic mineral fibers (e.g., fibrous inorganic substances, such as fiberglass (glasswool and glass filament), mineral wool (rockwool and slagwool), wollastonite, and refractory ceramic fibers), organic fibers (e.g., high-density polyethylene fibers or high density aramid fibers), fibers having aspherical and/or platelet structures (e.g., sepiolite, bentonite, diatomaceous earth, montmorillonite, halloysite, nanoclays, and nanocalcites, including surface modified version thereof, such as those modified with an amine, a silane, or an ammonium, such as trimethyl stearyl ammonium (e.g., 25-30 wt. %), dimethyl dialkyl ($C_{14-18}$) amine (e.g., 35-45 wt. %), aminopropyltriethoxysilane (e.g., 0.5-5 wt. %), octadecylamine (e.g., 15-35 wt. %), or methyl dihydroxyethyl hydrogenated tallow ammonium (e.g., 25-30 wt. %)), which can include treated fillers (e.g., with one or more hydrophobic coatings, such as with an alkylsilane).

The formulation may include any useful amount of one or more additives (e.g., of from about 0.001% to about 50% by weight, such as one or more fillers). In one embodiment, the formulation includes of from about 2% to about 30% by weight of one or more fillers (e.g., from about 2% to about 10% by weight).

The composition can include one or more other components, such as one or more diluents (e.g., a reactive diluent, such as an alkyl acrylate, such as N-butyryl acrylate; a cycloalkyl acrylate, such as isobornyl acrylate; an aliphatic monofunctional diluting acrylate, including Ebecryl® 113 from Allnex; a cyclic aliphatic diacrylate, including Ebecryl® 130 from Allnex; or a polyol acrylate, such as diethylene glycol dimethacrylate or Sartomer® SR231 from Arkema, as well as phenyl glycidyl ether, butyl glycidyl ether, or octylene oxide), curing agents (e.g., 2,4,6-tris (dimethylaminomethyl)phenol); accelerators (e.g., a tertiary amine, such as benzyldimethylamine); reinforcers (e.g., graphene, glass fiber, or carbon fiber); hardeners (e.g., an aliphatic anhydride, such as hexahydro-4-methylphthalic anhydride or methyl tetrahydrophthalic anhydride; a dicyandiamide, such as commercially available Aradur® 1571 from Huntsman; an imidazole, such as commercially available Aradur® 313 from Huntsman; an aromatic amine, such as 4,4'-methylenebis(2,6-diethylaniline); or a polyetheramine, such as commercially available Jeffamine® D230 from Huntsman); pigments or dyes (e.g., titanium dioxide, carbon black, etc.); absorbers (e.g., light absorbers, such as benzophenone, benzotriazole, hydroxybenzophenone, hydroxyphenylbenzotriazole, hydroxyphenyltriazine, oxanilide, and/or thioxanthone); plasticizers; dispersants, including an organosiloxane, a functionalised organosiloxane, an alkyl-substituted pyrrolidone, a polyoxyalkylene ether, or a ethyleneoxide propyleneoxide block copolymer; as well as combinations thereof.

Methods

Figure 2:
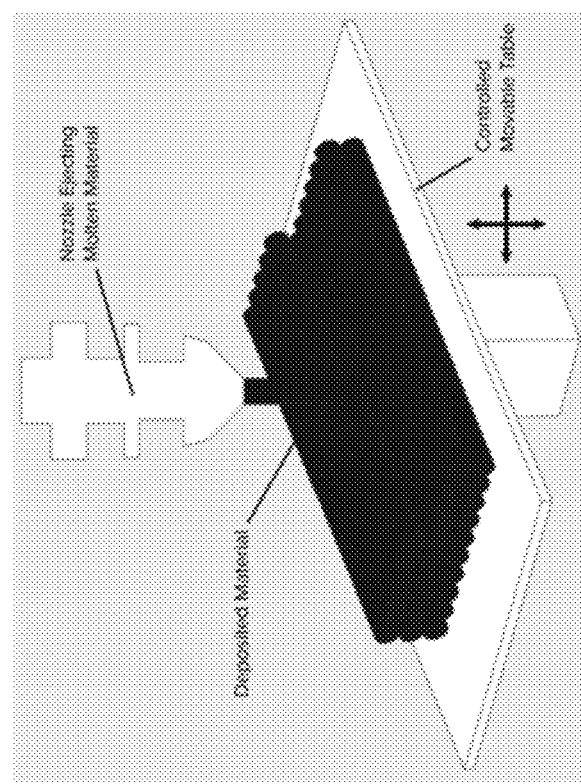
FIG. 2 provides an exemplary method of printing a formulation at room temperature. The printed structure can maintain shape at room temperature. Furthermore, the shape can be retained at a first temperature (e.g., from about 20° C. to about 80° C.). The printed resin can then be cured (e.g., partially cured at room temperature and then optionally cured at an elevated temperature).
Figure 2:
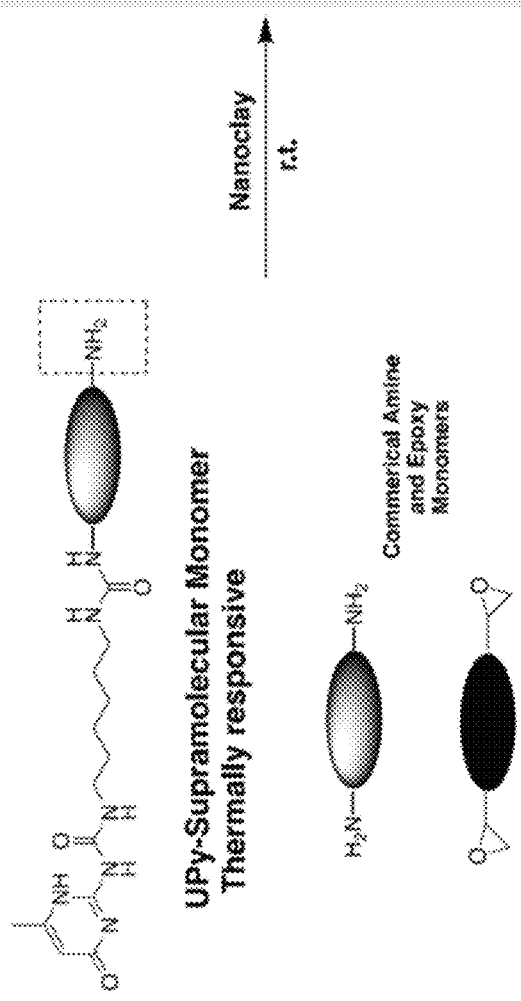
Figure 3:
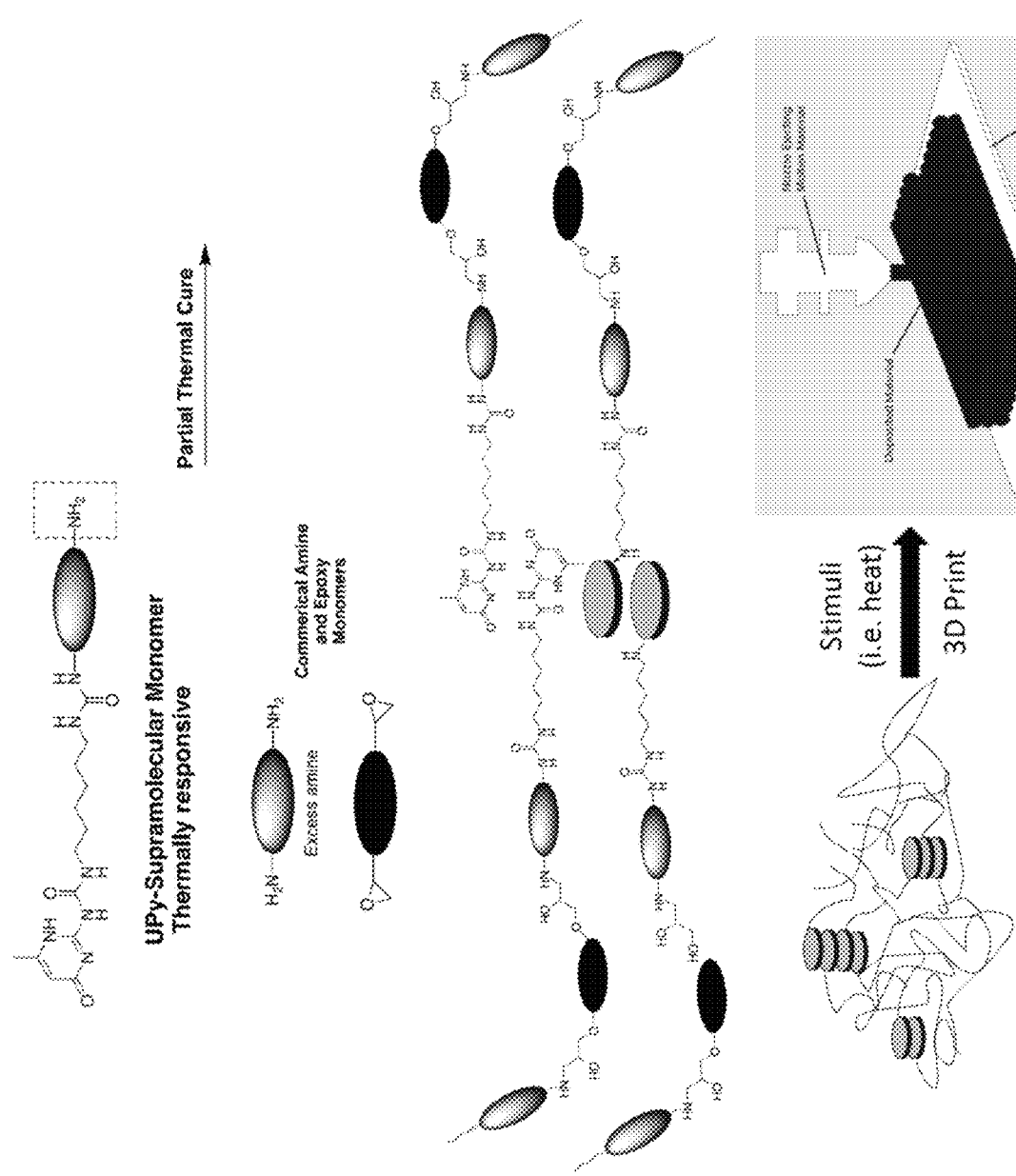
FIG. 3 provides an exemplary method of printing a cured supramolecular thermoset, followed by further optional curing.
Figure 4:
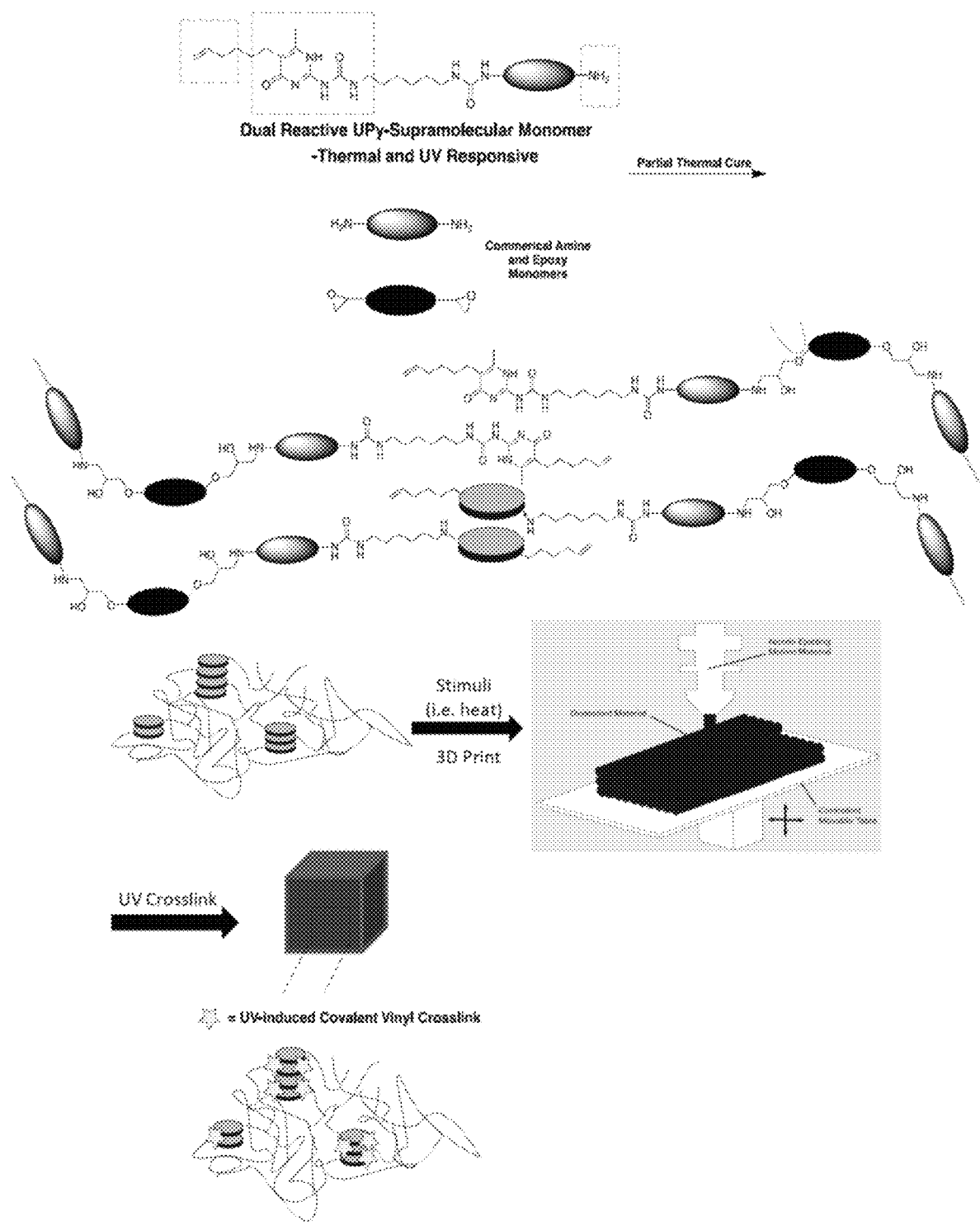
FIG. 4 provides an exemplary method of dual-curing H-bonding monomer.
Figure 5:
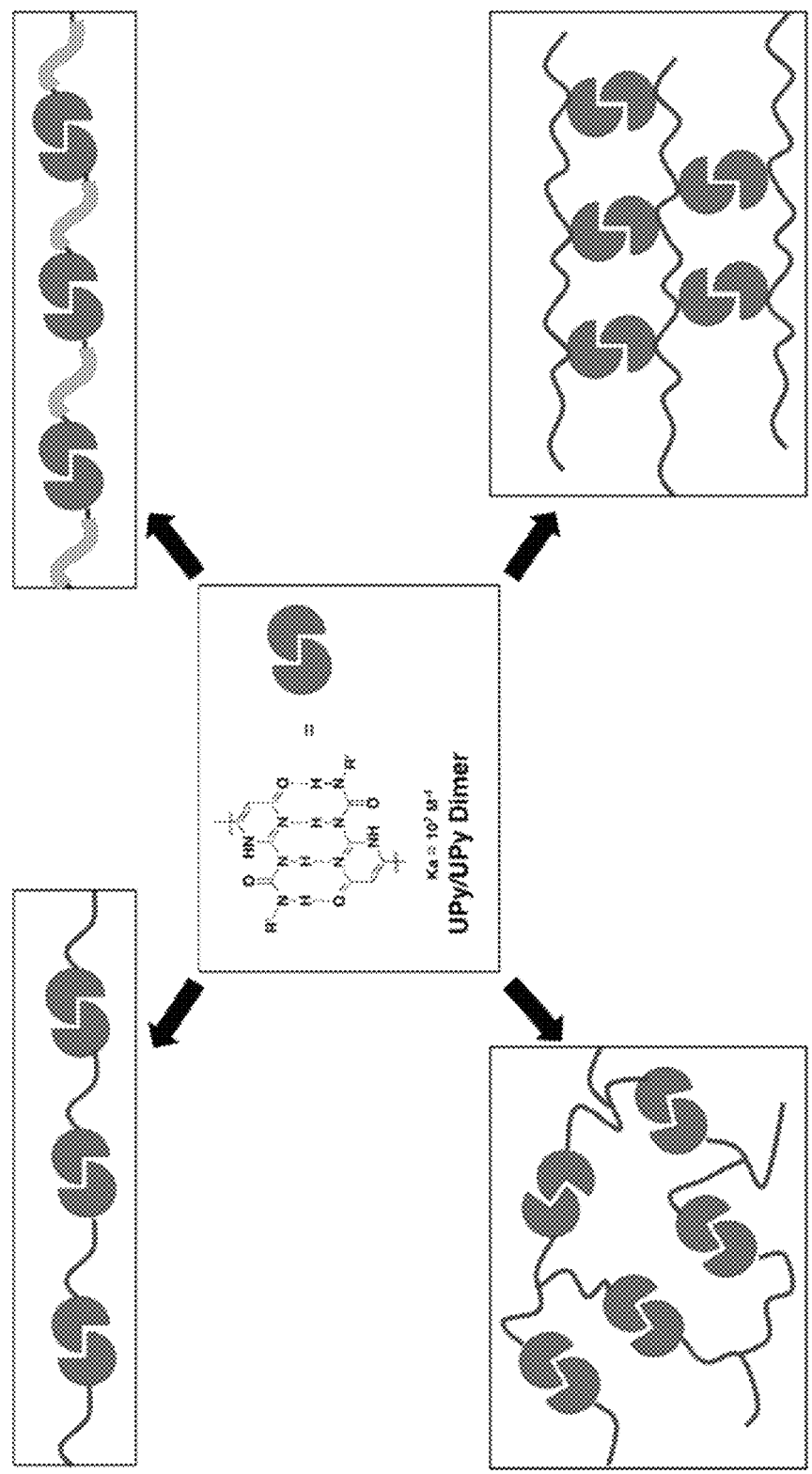
FIG. 5 provides various architectures possible for supramolecular polymers. Top left: linear supramolecular polymer. Top right: linear supramolecular block copolymer, in which light gray regions can include any useful block polymer. Bottom left: supramolecular network via branching. Bottom right: supramolecular network by side-chain grafting. The ureidopyrimidinone dimer is shown as an example supramolecular self-assembling pair.
Figure 6:
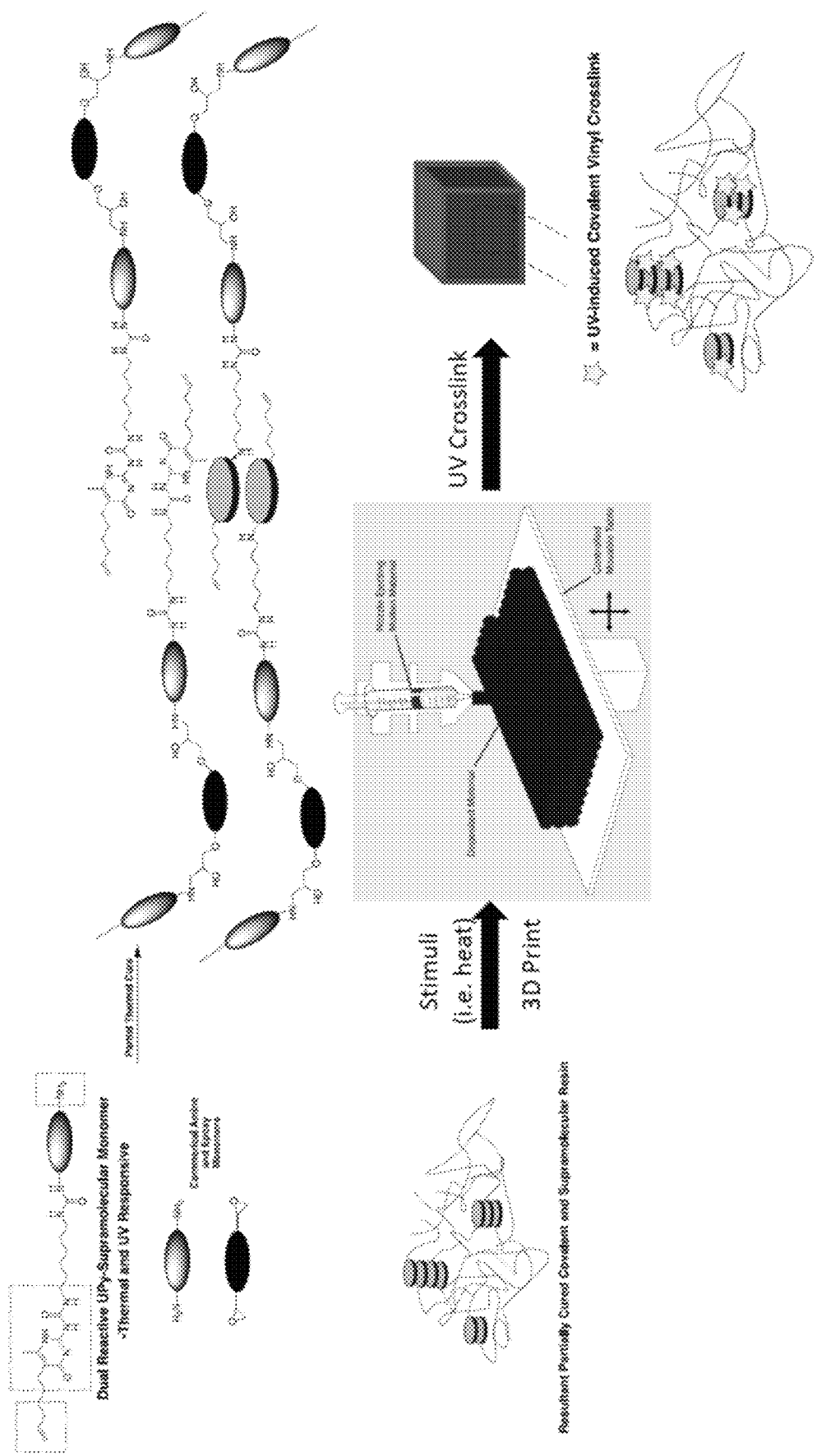
FIG. 6 provides an exemplary, non-limiting example of a proposed supramolecular/covalently crosslinked hybrid epoxy-based thermoset. The prepolymer resin mixture can be composed of commercial epoxy reactive thermosetting monomers, supramolecular monomers, and supramolecular monomers containing covalently crosslinking functional handles. The resin can be partially cured to form a viscous, 3D network either by partial covalent crosslinks or by supramolecular crosslinks. An external stimulus, such as heat, will be used to momentarily disrupt the 3D network, breaking supramolecular interactions, yielding a low viscosity and processible material. The material will be printed and upon cooling to room temperature, reform its supramolecular bonds, yielding a tough, shape-holding material. A secondary cure could consist of thermal curing at temperatures lower (i.e. will not disrupt H-bonds) or an orthogonal chemistry such as UV crosslinking.

Also provided herein are exemplary methods of using a formulation (see, e.g., FIGS. 2-4). In particular methods herein, printing is achieved at room temperature and then can be optionally cured (FIG. 2). Further exposure to elevated temperatures (e.g., of from about 30° C. to 150° C.) (FIG. 3) and/or to ultraviolet light (FIG. 4) can result in further curing. FIG. 6 provides an exemplary, non-limiting example of a proposed supramolecular/covalently cross-linked hybrid epoxy-based thermoset. The resulting thermoset (e.g., cured thermoset) can have any useful architecture. In non-limiting instances, the formulation includes a self-assembly monomer that provides linear polymers, block copolymers, branched polymer networks, or grafted polymer networks (FIG. 5).

EXAMPLES

Example 1: Self-Assembly Assisted Additive Manufacturing (AMI) of Thermoset Materials Additive manufacturing (AM) of thermosetting polymers, which are largely unprintable, can be enabled through the creation of novel chemistries with tunable material rheology and cure dynamics via self-assembly. This approach addresses the fundamental gap in the development of AM thermosetting polymers. The impact of this work will be a new class of thermosetting polymers with superior properties.

Described herein are 3D printable thermoset materials. Thermosets are widely used as adhesives, encapsulants, and supports in various applications. In general, a thermoset, or thermosetting, polymer is a synthetic material that is irreversibly cured from a liquid or soft solid resin to an infusible, insoluble polymer network, virtually unprocessable post cure. In contrast, the other major class of polymers, thermoplastics become pliable or moldable above a given temperature and can be formed into a final shape by melting, pressing, or injection molding. Unlike thermosets, the intrinsic properties (i.e. intermolecular forces) of thermoplastics tend to make them more suitable in applications such as 3D printing, but at the cost of material integrity and strength over time. Due to their reliance on strong, covalent cross-linking chemistries, existing and potential utilities of thermoset materials are unmatched by thermoplastics. AM of thermoset polymers could allow for rapid prototyping of geometrically complex, high-performance parts, unavailable by molding, as well as possibly reduce production costs.

There are very limited examples of additively manufactured thermosets. Without wishing to be limited by mechanism, the 3D printability of a thermoset material relies, in part, on the interplay of two main phenomena: either the pre-cured (or partially cured) resin is viscous enough to hold and maintain shape prior to and during the cure and/or the resin mixture possesses cure chemistries that allow for "cure-on-demand" or "rapid-cure" capabilities.

Discovery of suitable chemistries for printing thermosets will rely heavily on tuning both of these parameters. We propose that the incorporation of self-assembling monomers, oligomers, and polymers into resin systems could address both aspects of these printing parameters, as well as afford printable materials with superior performance and processability.

Self-assembly is loosely defined as the spontaneous and reversible organization of molecular units into ordered structures via non-covalent interactions.[1] Self-assembly in the proposed systems can be driven by strong, directional, but reversible non-covalent interactions such as hydrogen bonding arrays, metal coordination, host-guest interactions, and aromatic stacking. Alone these interactions are weak, but together produce macroscopic changes to materials through the formation of supramolecular networks, polymer gels, and liquid crystalline polymers.[1-3] In many cases, the addition of supplementary secondary non-covalent interactions into a traditionally covalently linked polymer system affords materials with enhanced elasticity, altered stress relaxation, increased $T_g$ from relatively lower molecular weight starting materials, and low melt viscosity with sometimes enhanced mechanical properties.[4-5]

Properties arising from self-assembling and disassembling events, such as changes in viscosity, molecular alignment, and templation effects can be exploited to assist in the printing of thermosets using various AM techniques. Directional interactions may impart molecular alignment on the macroscale, with applications in optoelectronics, increased polymer network rigidity, and accelerated cure rates due to self-assembly directed reactive group proximity.[6]

The approach described herein can (1) establish a new self-assembly assisted approach for the additive manufacturing of largely unprintable thermoset materials, while (2) in the process of finding suitable chemistries for AM of thermosets, the exploratory design, synthesis, and incorporation of novel self-assembling motifs and macromolecules into heavily used thermoset resins will yield new materials with a wide breath of applications and may even yield printed multifunctional, and stimuli responsive 3D objects.

Recently, increasing research interest has been attracted by the prospects of 3D printing due to its various advantages. Compared to traditional manufacturing techniques, it has the capability to be faster, more flexible, and less expensive, especially when producing a small quantity of parts. It can also fabricate objects with shapes not available through traditional molding processes. Although there have been significant advancements in AM of polymer materials, a great deal of chemical pathways remain unexplored and the overall material properties that are commercially available are still limited.[7] Desirable properties that are currently lacking in printed materials include, e.g., high strength and high elasticity polymers, with long material lifetime. Furthermore, 3D printed materials tend to have lower strength as compared to non-printed materials, resulting in many cases from inadequate interlayer adhesion arising from the layer-by-layer fabrication method characteristic of AM. Controlling the interlayer microstructure of 3D printed materials is also an area of research that has been poorly explored.

The reversibility of supramolecular interactions can facilitate the manufacturing of an array of 3D printed objects due to the beneficial rheological performance. The authority to disrupt supramolecular bonds during processing offers improved flow properties relative to high molecular weight polymers of a similar composition. Rem oval of the disrupting external stimuli (e.g., heat, competitive solvent, UV light) can yield reformatting interactions, post-processing in the final structure, and assures the final construct maintain desired thermomechanical properties.[8] The enhanced processing capabilities of supramolecular polymers make them ideal candidates for AM.

There are only limited examples of 3D printed thermoset materials, due to the fact that they tend be based on chemistries with usually slow reaction kinetics and result in highly unprocessable materials after cure.[9-11] As previously mentioned, thermoplastics are more well-suited for 3D printing applications, due to their reprocessability, but yield low strength materials in comparison to thermosets. Unlike thermoplastics that form through noncovalent interchain interactions, the covalently crosslinked structure of thermosets are formed irreversibly, yielding a typically hard, insoluble material. During cure, the average molecular weight of the polymer resin generally increases in conjunction with increasing viscosity, with the mixture eventually forming a gel. At the gel point, the substrate behaves as a single, infinite network with rubbery and viscoelastic properties, showing resistance to deformation.

Covalent bond formation can also lead to a volumetric shrinkage of the thermoset, increasing residual stress, which collectively can lead to the formation of cracks and defects. Endowing thermoset prepolymer resins with chemistries that allow for reprocessability will aid not only in equipping them for 3D printing applications, but also may alleviate residual stress within the material and surrounding substrates.

Reprocessability is often perceived to be difficult or impossible to achieve in thermosetting polymers. Oppositional to traditional thermosets, self-assembling/supramolecular polymers are highly reprocessable. Supramolecular polymers can include non-covalently bound monomers or larger constructs, such as polymer blocks conjoined via main-chain or side-chain supramolecular units. As proposed by Brunsveld et al., in one non-limiting instance, "supramolecular polymers are defined as polymeric arrays of monomeric units that are brought together by reversible and highly directional secondary interactions, resulting in polymeric properties in dilute and concentrated solutions, as well as in the bulk."[3] Imparting self-assembly properties, through the incorporation of supramolecular motifs, has been increasingly explored within polymer science resulting in materials with altered elasticity, $T_g$, mechanical strength, and responsivity.[12-17] Furthermore, by incorporating supramolecular motifs into a polymer system, opportunity arises for control over sequence and architecture, which affect material properties (FIG. 5).

Supramolecular moieties that assemble by multiple hydrogen bonds have been most heavily explored. Self-assembling, e.g., by way of H-bonding moieties, such as quadruple hydrogen bonding ureidopyrimidinone (UPy), have been incorporated onto the mainchain and side-chains of numerous polymer types, including polysiloxanes, polyethers, polyesters, polyethylene, polycarbonates, polystyrenes, polyurethanes, and epoxies.[16,18-19] With an association constant $(K_a) \approx 10^7$ $M^{-1}$, the binding strength of UPy/UPy polymers have been shown to be sufficiently high enough to promote supramolecular polymer formation, overcoming competing forces, such as microphase separation between dissimilar chemical backbones, but weak enough to dissociate upon exposure to external stimuli.[20-21] Self-assembly of these materials by directional H-bonds, forms supramolecular polymer networks, capable of reversible assembly under external stimuli. In many cases, the material properties have been shown to improve dramatically upon supramolecular functionalization, stemming in materials that combine the mechanical properties of conventional polymers with low melt viscosity of low molecular weight organic compounds.

Although supramolecular polymers have been increasingly reported in the literature to yield highly functional and in some cases commercially[22] useful materials, harnessing their properties in 3D printing applications have only been recently realized and mainly for the printing of biomaterial hydrogels.[7-8,23-24] The broad range of advantages and utility of incorporating directional, strong, yet reversible interactions in reported polymer mixtures are undeniable,[25] yet there are no reports of using these same interactions to aid in the printing of useful thermosets which are largely unprintable materials. 3D printing of synthetic supramolecular thermosets is seriously underexplored, with a multitude of possible material properties and applications to gain. Akin to the thermoplastics, incorporating reversible, directional, and strong non-covalent (and in some cases reversible covalent) interacting moietiess have resulted in thermosets with increased processablity when exposed to external stimuli such as solvent, pH, temperature, mechanical stress, and UV light.[19,26-30] We propose that the combination of properties inherent to thermoset materials, along with the reversible nature of self-assembly will assist not only in the additive manufacturing process, but also alleviate material properties associated with thermosets (reprocessability, residual stress, slow kinetics). Using self-assembly/supramolecular interactions may also be useful for controlling interfacial interactions, promoting efficient interlayer adhesion.[23]

In particular, we will synthesize supramolecular thermoset monomers by direct modification of commercially available epoxy, polyurethane, and polyacrylate thermosetting prepolymer resin starting materials with synthesized supramolecular moieties. The proposed supramolecular moieties can be programmed to self-assemble by reversible interactions such as directional H-bonding forces, metal-coordination, host-guest inclusion complexation, and/or aromatic pi-pi stacking interactions. Monomers of specific reactivity can be combined with varying percentages of supramolecularly-modified thermosetting monomers to create hybrid resins, capable of post-cure reprocessibility.

In one non-limiting embodiments, a general printing strategy can include the following steps: (1) Prepolymer resins can be partially cured to the point at winch the viscosity of thermoset X is sufficiently high, producing a resin with maintained shape. (2) Supramolecular interacting motifs can be disrupted via an external stimulus to endow reprocessabilty corresponding to a momentary decrease in relative viscosity. It would be advantageous if the required external stimuli was orthogonal to the cure chemistries so that the processability could be controlled independently to covalent cure chemistries. (3) By exploiting the momentary decrease in viscosity, the material can be printed in any useful manner, e.g., by a microextrusion printing technique. A stereolithographic approach can also be pursued, e.g., to minimize challenges arising from rheological instabilities of synthesized products and provide a method of obtaining feature resolution not easily attainable using extrusion printing techniques when photo definable materials are used. (4) The 3D printed substrate can be fully cured by the appropriate method (e.g. heat, UV light, etc.).

FIG. 6 shows a non-limiting method for making a 3D printable epoxy. For example, we propose making a UPy-thermoset monomer that is functionalized with UV-curable vinyl groups.[14,31] The polymer can be made through supramolecular UPy/UPy interactions and/or a combination of covalent amine-epoxide reactions. UPy/UPy interactions can provide processability via thermally reversible H-bonds and may assist UV curable crosslinking reactions due to molecular-alignment-induced increases in local concentrations of crosslinkable vinyl groups.

Example 2: Self-Assembly Assisted Additive Manufacturing; Direct Ink Write 3D Printing of Epoxy-Amine Thermosets The use of self-assembling, pre-polymer materials in 3D printing is rare, due to difficulties of facilitating printing with low molecular weight species and preserving their reactivity and/or functions on the macroscale. Akin to 3D printing of small molecules, examples of extrusion-based printing of pre-polymer thermosets are uncommon, arising from their limited rheological tuneability and slow reactions kinetics. The direct ink write (DIW) 3 D printing of a two-part resin, an epoxy compound (Epon™ 828) and an amino compound (e.g., Jeffamine® D230), using a self-assembly approach is discussed herein, the addition of self-assembling, ureidopyrimidinone-modified Jeffamine® D230 and nanoclay filler, suitable viscoelastic properties are obtained, enabling 3D printing of the epoxy-amine pre-polymer resin. A significant increase in viscosity is observed, with an infinite shear rate viscosity of approximately two orders of magnitude higher than control resins, in addition to, an increase in yield strength and thixotropic behavior. Printing of simple geometries is demonstrated with parts showing excellent interlayer adhesion, unachievable using control resins. Additional details follow.

Increasing research interest has been attracted by the prospects of 3D printing due to its various advantages. Compared to traditional manufacturing techniques, it has the potential to be faster, more flexible, and less expensive, especially when producing a small quantity of parts in easily changeable dimensions. It can also fabricate objects with shapes not available through traditional molding processes. Material extrusion is the most widely used 3D printing technique due to its cost-effectiveness and wide-ranging material capabilities. Fused filament fabrication (FFF) or fused deposition modeling (FDM) is a filament-based extrusion 3D printing that is typically used to print thermoplastic filaments extruded through heated nozzles using filaments of ≈0.3-1 mm in diameter. Upon deposition, the filament cools down and the viscosity quickly increases, allowing the printed object to maintain its shape. Although this method is very useful for printing thermoplastics, it cannot be applied to low viscosity crosslinkable thermosets, where increasing temperature and crosslink density are typically required to obtain the necessary viscosity increase to maintain printed shape.

Direct ink writing (DIW) is an alternative extrusion-based 3D printing technology that has demonstrated its utility as a favorable printing method due to is amenability to print a multitude of material types, including silicones, thermoplastics, and various fiber-filled polymers of sufficiently high viscosity.[1] DIW has also shown much value in printing UV curable and dual UV/thermal curing resins.[2-4] However, there are very few examples of DIW 3D printed pre-polymer resins comprised of high-performance thermosetting monomers, especially epoxy-based thermosets which are desirable for use in aerospace and defense applications. The reason for this gap is that, in general, these pre-polymer resins do not possess the rheological properties required of DIW inks. DIW inks should exhibit significant shear-thinning (or classic pseudoplasticity) to allow extrusion through micronozzles (e.g., having a diameter of ≈100 µm-2 mm) under mild conditions. The ink may also be thixotropic, displaying time-dependent shear-thinning behavior. Upon exiting the printing nozzles, inks should have suitably high storage modulus (O') and yield strength to maintain the printed shape. Lastly, it is desirable that the interfacial strength between layers is strong to prevent delamination and reduced mechanical properties.

There are limited examples of DIW 3D printed epoxy-based thermoset materials, which can be due to the fact that they tend be based on chemistries with slow reaction kinetics, display restrictive rheological profiles, and result in highly unprocessable materials post-cure.[2,5,6] Lewis and coworkers 3D printed light-weight epoxy composites by altering the rheological profile of initially low viscosity Epon™ 826 using nanoclay fillers, silicon carbide whiskers, carbon fibers, and dimethyl methyl phosphonate.[6] They also used an imidazole-based ionic liquid as latent curing agent, to increase the pot-life at ambient conditions. Lewicki et al. employed carbon fiber and silica filled inks along with a Lewis acid generator, a latent thermal curing catalyst, to 3D print a mixture of oligomerized bisphenol-F diglycidyl ether (BPF), diethyltoluenediamine (DETDA), and Novoset® 280 Cyanate ester resin.[7-8] In this work, they successfully printed Novoset® 280 via the addition of rheology modifying Cabosil® TS530 silica and a dual curing agent/catalyst, metal salt copper (II) acetylacetonate (Cu(acac)$_2$). Chen et al. used a two-stage curing approach with ink containing UV curable resin and epoxy oligomer with fumed silica nanoparticles to yield shear thinning behavior.[9] The UV curable resin formed a network by photopolymerization in the first stage of curing, while the second stage involved thermal curing of epoxy oligomers, which forms an interpenetrating polymer network (IPX).[9]

Two main strategies are highlighted in these examples: (1) fiber or other fillers (e.g., carbon fibers, silicon carbide whiskers, silica, etc.) are used to modify the rheological profile of the ink, and (2) latent cure catalysts are used to imbed "cure on demand" capabilities, such as UV or thermally activated catalysts. The addition of fibers to a composite may not be desired for certain applications. In some cases, the mechanical properties of the final part rely heavily on the control of fiber loading, fiber length, orientation, distribution, and fiber/polymer matrix interactions. Latent cure catalyst strategies, although desired, are very resin specific; and this method may not be modular, especially for two-part resins.

Although there have been significant advancements in DIW of thermosets, a great deal of chemical pathways and strategies remain unexplored and the overall material properties available are still limited. Generally, rheology is modified using fillers, and the majority of examples in the literature report simple filled homopolymerized epoxy systems.[6-10-11] In one instance, it may be advantageous to target DIW of two-component, amine-cured aromatic epoxide systems (e.g., that are typically high $T_g$, mechanically robust materials) used for numerous applications in coatings, electronics, civil engineering, structural composites, tooling, adhesives, and are used widely in aerospace and defense. Although these systems have desired physical properties, they require long cure times of hours to days and have limited rheological profiles, unsuitable for DIW printing.

We propose a strategy for modifying the ink properties of epoxy-based thermosetting systems towards DIW through the introduction of self-assembling motifs. Without wishing to be limited by mechanism, self-assembly in the proposed systems can be driven by strong, directional, but reversible hydrogen-bonding (e.g., as present between ureidopyrimidinone-functionalized, di-functional amine curatives).

Self-assembling moieties, such as quadruple hydrogen-bonding ureidopyrimidinone (UPy) have been incorporated onto the main-chain and side-chain of numerous polymer types, including polysiloxanes, polyethers, polyesters, polyethylene, polycarbonates, polystyrenes, polyacrylates, polyurethanes, and epoxies.[12-14] The association constant of UPy/UPy assemblies are sufficiently high ($K_a \approx 10^7$ M$^{-1}$) as to promote supramolecular polymer formation, overcoming competing forces, such as microphase separation between dissimilar chemical backbones, but weak enough to dissociate upon exposure to external stimuli.[15-16] In many cases, the material properties improve dramatically upon supramolecular functionalization, stemming from materials that combine the mechanical properties of conventional polymers with low melt viscosity of low molecular weight organic compounds. In the proposed work, we hypothesized that incorporation of UPy into a low viscosity, Newtownian resin would endow viscoelastic behavior as well as influence the apparent yield stress of the resin/ink through UPy/UPy interactions as well as short chain entanglements.

Although supramolecular polymers have been increasingly reported in the literature to yield highly functional and in some cases commercially useful materials,[17-18] harnessing their properties in 3D printing applications have only been recently realized, mainly towards the printing of biomaterial hydrogels.[19-22] Very recently, Li et al. reported using a supramolecular template including Pluronic® F127 triblock copolymer to facilitate the formation of a viscoelastic and DIW printable hydrogel upon assembly with tetraethyl orthosilicate (TEOS) monomers.[23] The idea of using supramolecular interactions as a means to lend viscoelastic inks was expanded upon when F127 was assembled with benzene-1,3,5-tricarboxamide (BTA) hydrogen-bonding, donor-acceptor core containing crosslinkable vinyl moieties.[23] The broad range of advantages and utility of incorporating directional, strong, yet reversible interactions in reported polymer mixtures are undeniable, yet there are no reports of using these same interactions to aid in the printing of useful thermosets which are largely unprintable materials.

Three-dimensional printing of synthetic supramolecular thermosets is seriously underexplored, with a multitude of possible material properties and applications to gain. Akin to the thermoplastics, incorporating reversible, directional, and strong non-covalent moieties have resulted in thermosets with increased processablity when exposed to external stimuli such as solvent, pH, temperature, mechanical stress, and UV light.[14,25-28] We propose that the combination of properties inherent to thermoset materials, along with the reversible nature of self-assembly will assist not only in the additive manufacturing process, but may also alter material characteristics associated with thermosets (e.g., reprocessability, residual stress, slow kinetics, etc.). Using self-assembly/supramolecular interactions may also be useful for controlling interfacial interactions in 3D printed parts, promoting efficient interlayer adhesion.[20]

To this end, a commercially available amine curative, Jeffamine® D230, was chemically modified to contain a ureidopyrimidinone, self-assembling motif. To the best of our knowledge, this is the first examples of exploiting hydrogen-bonding UPy as a rheology modifier for DIW printing. This new curative (UPyD230) possesses the ability to form physical crosslinks via UPy/UPy interactions, as well as the capacity to covalently crosslink by epoxy-amine addition reactions.

Figure 7:
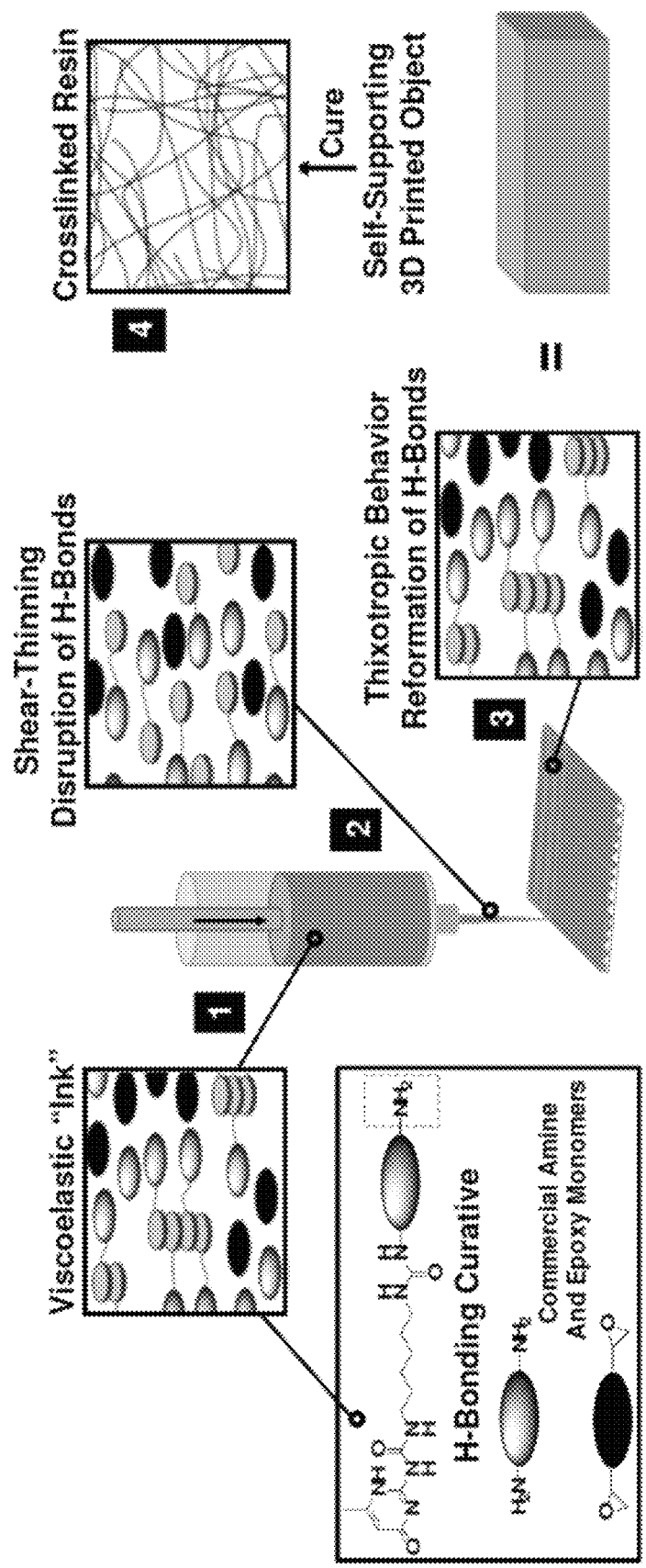
FIG. 7 shows an exemplary overview of the proposed printing process of a two-part epoxy-amine resin through the incorporation of a self-assembling ureidopyrimidinone (UPy) curative. In particular, (1) incorporation of the UPy group can increase the viscoelastic character of the ink, (2) high shear rates can cause disruption of the hydrogen-bonded network, (3) reformation of hydrogen bonds can assist in thixotropic recovery of the ink, leading to a self-supporting 3D printed structure, and (4) the resin can be crosslinked with a specific cure profile via covalent epoxy-amine addition reactions.

FIG. 7 displays how the supramolecular properties of UPyD230 could benefit the overall printing process of a commercial epoxy-amine resin. Introduction of supramolecular crosslinks could benefit the viscoelastic character of the ink. Shear forces could disrupt hydrogen bonds during printing, causing a momentary drop in viscosity, whereupon thixotropic properties will be promoted by the reformation of UPy/UPy interactions to yield a self-supporting structure. A thermal post-cure can form the final cured part.

To understand how supramolecular interactions affected the resin properties, various percentages of UPyD230 were added to resins of Epon™ 828 and Jeffamine® D230, and the resins were studied by a number of techniques pre- and post-cure. IR spectroscopy was used to determine reactivity of UPyD230 with resin components, cure kinetics, and temperature effects on the hydrogen bonding network. The rheological properties of the pre-cured resins were probed to determine how the addition of UPyD230 affects viscosity, shear-thinning, apparent yield stress, and thixotropic behavior towards DIW printing. Properties of the new resins, post-cure were also analyzed by thermal-gravimetric analysis (TGA), dynamic mechanical analysis (DMA), differential-scanning calorimetry (DSC), optical microscopy, and scanning electron microscopy (SEM). Additional details are provided in the following Examples.

Scheme I: Exemplary scheme for synthesis of compound 2, UPyD230

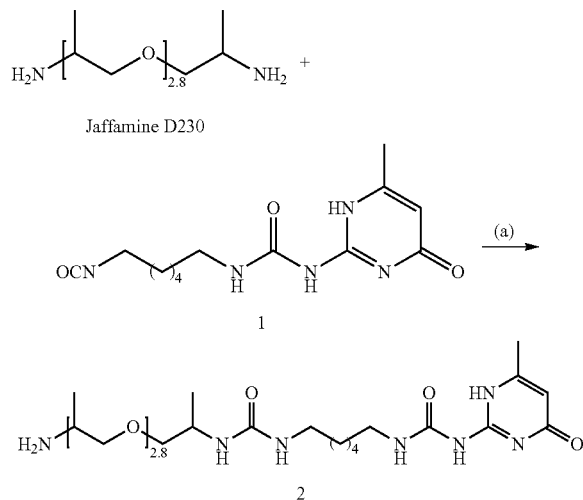

For synthesis of compound 2 (mono-ureidopyrimidinone-functionalized Jeffamine® D230, UPyD230, Scheme I), in a 1000 mL round bottom flask, Jeffamine® D230 (MW=240 g mol$^{-1}$, 9.722 g, 40.507 mmol) was added to 200 mL of dimethylacetamide (DMAc) and heated to 80° C. under nitrogen flow. Compound 1 (5.941 g, 20.253 mmol) was added to 200 mL of DMAc. and the suspension was pipetted dropwise into the flask containing Jeffamine® D230. The reaction formed a homogeneous solution upon each drop of compound 1 in DMAc. The reaction was stirred at 80° C. for 12 h. Upon cooling to room temperature, the mixture was concentrated in vacuo to afford a highly viscous, tacky material. The resulting material was obtained in quantitative yields and used without further purification. It is notable that upon washing with pentane, the material became semisolid, highly viscous, and sticky.

Formation of compound 2 was confirmed by $^1$H and $^{13}$C NMR spectroscopy, mid-IR spectroscopy, and High-Resolution Mass Spectroscopy (HRMS)—HRMS (ESI) m/z: [M+H]+ calcd for $C_{22}H_{42}N_7O_5$ (n=2) and $C_{25}H_{48}N_7O_6$ (n=3), 484.32 and 542.36, respectively; found, 484.42 and 542.43, respectively; m/z: [M+−H] calcd for $C_{22}H_{40}N_7O_5$ (n=2) and $C_{25}H_{46}N_7O_6$ (n=3), 482.32 and 540.36, respectively; found, 482.40 and 540.42, respectively, UPyD230 possessed very limited solubility in chloroform and could only be analyzed in deuterated DMSO in order to obtain a $^{13}$C NMR spectrum. This limited the analysis of the ureidopyridimidone in dimerized, hydrogen-bound state due to disruption of hydrogen bonds by solvation. We were able to obtain a $^1$H NMR spectrum in deuterated chloroform at dilute concentrations and with the addition of a small amount of N,N-dimethylacetamide.

Resin preparation: Resins were prepared by incorporating UPyD230 into various Epon™ 828/Jeffamine® D230 amounts at 0, 5, 10, 15, 20, and 25 mole percentages (mol. %), such that the epoxy and amine reactive functional groups were present in equimolar amounts, based on the theoretical molecular weight of each constituent. This condition corresponds to mass compositions (i.e., grams of curing agent/g of 828) of 0.32 for D230 in a 1:1 equimolar mixture.

A minimal amount of nanoclay was added to homogenize the resin mixtures. In particular, Nanoclay (Nanomer®) was added to the resin formulations at 20 wt % with respect to the amount of Epon™ 828, which was a constant amount in all of the mixtures. Epon™ 828 and nanoclay were mixed for 2 min at 2000 rpm at atmospheric pressure using a Planetary Centrifugal Vacuum Mixer "THINKY MIXER" (THINKY USA). Without the addition of nanoclay, the UPyD230 would separate from the mixture during using a planetary mixer. Without wishing to be limited by mechanism, we believe that the nanoclay increases viscous heating, which may momentary disrupt UPy association during mixing, which may momentarily disrupt UPy association during mixing. The resins were formulated so that there was a 1:1 ratio of epoxide and amine proton functional groups to promote full crosslinking.

In a separate container, D230 and UPyD230 were mixed and heated to 80° C. Upon melting of the curative mixture, the Epon™ 828/nanoclay mixture was added to the warm curative mixture (now removed from heat) and vigorously stirred by hand using a spatula. The resins were cured at 60° C. for 15 h under vacuum and post-cured at 120° C. for 2 h.

Fourier transform infrared spectroscopy (FT-IR): Characterization of Epon™ 828/UPyD230 isothermal cure behavior was accomplished with Near-IR (NIR) transmission spectroscopy using a custom temperature-controlled vial holder transmission accessory (Pike Technologies) with a Bruker Vertex 70 Fourier transform infrared spectrometer. After thorough mixing, the epoxy/amine resin blend was dispensed into glass vials (2.2 mm inner diameter) which were then stored at −20° C. to minimize any precuring. For cure kinetics monitoring, vials were removed from the freezer and immediately placed in the transmission accessory at a preset temperature.

NIR spectra were acquired sequentially by averaging eight scans (13.7 s total acquisition time) between 8000 cm$^{-1}$ and 4000 cm$^{-1}$ at 4 cm$^{-1}$ resolution. Spectra were normalized to the peak height at 4623 cm$^{-1}$ (aromatic C—H stretch overtone) to correct for scattering and changes in optical density. Cure conversion was quantified by taking the baseline-corrected area of the 4530 cm$^{-1}$ epoxy band (combination of epoxide ring stretch/bend) normalized between an initial spectrum (no cure) and a spectrum of fully cured material when conditioned at 150° C.

Near-IR transmission of the nanoclay-filled materials was not possible due to scattering of the NIR beam by clay particles, therefore spectra were acquired with mid-IR (MIR) spectroscopy in attenuated total reflectance (ATR) mode using a Pike GladiATR accessory with a Nicolet 6700 spectrometer (Thermo-Fisher Scientific).[29] For cure monitoring experiments, a droplet of the resin mix was deposited on the diamond reflective element at a preset temperature. MIR spectra were acquired by averaging sixteen scans between 4000 cm$^{-1}$ and 500 cm$^{-1}$ at 4 cm$^{-1}$ resolution. Spectra were normalized to the peak height at 1506 cm$^{-1}$ (para-substituted aromatic C—H), and cure conversion was quantified by taking the baseline-corrected area of the 915 cm$^{-1}$ epoxy band (epoxide ring bend) in a similar manner as before with reference to the uncured and fully cured material.

MIR-transmission measurements were also performed to examine the IR changes associated with the dynamic nature of the UPy hydrogen bonding. A liquid transmission cell with a 0.1 mm Teflon spacer was used to obtain concentration- and temperature-dependent spectra of some UPyD230 dissolved in chloroform at room temperature. Solvent peaks were subtracted with a background of pure chloroform.

Thermogravimetric analysis (TGA): The thermal degradation behavior of the fully cured resins was analyzed using a NETZSCH TG 209 F3 Taurus from 25° C. to 500° C. at a heating rate of 10° C. min$^{-1}$ under nitrogen atmosphere. The samples were prepared by using approximately 10 mg from the material cured in thin wall aluminum cups.

Differential scanning calorimetry (DSC): DSC was performed using a PerkinElmer Pyris 6 DSC. The analyzed samples were comprised of approximately 10-15 mg of fully cured material and loaded into an aluminum pan. Analysis was performed under 10 mL min$^{-1}$ nitrogen flow. The samples were subjected to two heating and two cooling cycles from 0° C. to 160° C. with a ramp rate of 10° C. min$^{-1}$. The second heating cycle was plotted and analyzed to determine the apparent 72.

Dynamic mechanical analysis (DMA): DMA was performed using a TA Instruments Q800 DMA in a three-point bend mode. Fully cured rectangular bars of approximately 10 mm length×1.5 mm width×1 mm thick, were prepared using silicone molds. The temperature dependence on the dynamic storage (E') and loss (E") moduli were measured in a three-point bending fixture with a 5 mm support, span in a multifrequency strain test with a 25 μm amplitude, 0.1 N preload force, 1 Hz frequency, and 2° C. min$^{-1}$ ramp rate from 25° C. to 125° C. The storage modulus was used to calculate the experimental crosslink density (XLD) according to XLD=E'/3RT, where R and T denote the gas constant and temperature, respectively. E' denotes the plateau modulus or the minimum point in the E'-T curve. The experimental molecular mass between crosslinks ($M_c$) was calculated as $M_c=\rho/XLD$ with respect to Flory's relations for non-conforming polymer networks.[30] The glass transition temperature $T_g$ was taken as the maximum of the tan δ curve.

Rheological analysis of resin ink: Rheology tests were performed on uncured epoxy-mixes on a TA Instruments ARES G2 with 40 mm aluminum parallel plates. The resins were prepared prior to each test to ensure minimal curing at room temperature. A series of three tests were run on each sample in the following order: stress ramp, oscillation, and flow sweep.

Between each test samples were allowed 10 min to recover. Stress ramp tests were run to illustrate any yield stress behavior of the materials at 25° C. over a period of 200 s, in which stress was ramped from 0.1 to 1000 Pa. Oscillation tests were run to generate stress versus strain curves, as well as to see the shear modulus (G'/G") as a function frequency. Tests were conducted at 25° C. with a 1 s$^{-1}$ strain rate. A logarithmic sweep from 0.1 to 100 Hz (0.628319 rad s$^{-1}$ to 628.319 rad s$^{-1}$) with 10 points per decade was run with a 300-s soak time. Flow sweep tests were performed to compare viscosity versus strain rate to determine if any shear thinning behavior was exhibited. Tests were performed at 25° C. with a shear rate of 0.01 s$^{-1}$ to 100 s$^{-1}$ while collecting data at 5 points per decade. Select samples were run with a second step ramping the shear rate from 100 s$^{-1}$ to 0.01 s$^{-1}$ to determine any hysteresis effects. Curing behavior was observed using a TA Instruments ARES G2 with 8 mm aluminum parallel plates. The storage (G') and loss (G") are observed over time to determine the gel point of the epoxy at 25° C. to determine the working time with the uncured material. Samples were tested at 1% oscillation strain at 1 Hz (6.28 rad s$^{-1}$).

Direct Ink write of 25 mol. % UPyD230 resin: Resin G was printed using a custom engineered DIW robotic deposition platform. The resin was mixed prior to printing. UPyD230 and D230 were mixed and melted at 80° C. Epon™ 828 and nanoclay (20 wt. % with respect to Epon™ 828) were homogenized vacuum-assisted planetary mixing for 2 min at 2000 rpm. The UPyD230/D230 mix was vigorously hand stirred with the Epon™ 828/nanoclay mixture followed by vacuum-assisted planetary mixing for 2 min at 2000 rpm. The material was then transferred to a 10-mL syringe and centrifuged to remove entrained air bubbles resulting from handling. Using a constant volumetric deposition technique, resin G was extruded from the 10-mL syringe and through a 1.19 mm diameter orifice at a rate of 0.02663 mL s$^{-1}$ at room temperature. The printed resins were allowed to cure overnight at room temperature followed by curing at 60° C. for 15 h and at 120° C. for 2 h.

Scanning electron microscopy (SEM): Prior to analysis by SEM, the resins were fully cured in aluminum pans at 60° C. for 15 h and 120° C. for 2 h. The samples were removed from the pan and adhered to SEM specimen stubs coated with double-sided carbon tape. The samples were sputter-coated with gold-palladium using an Electron Microscopy Sciences EMS575X sputter coaler. The SEM analysis and images were taken using a Zeiss Gemini SEM 500. The analysis was performed using 5 kV acceleration voltage.

Mechanical testing of printed resins: Printed samples containing 25 mol. % UPyD230 were cut using an Allied Techcut 5 wet diamond blade saw to be approximately 0.25 in. wide. The width and thickness of each sample was recorded prior to testing. Samples were tested on an Instron 5982 load frame with a 5 kN load cell. A three-point bend set up was used with a 1.0-in. support span and were tested at a rate of 0.1 in. min$^{-1}$ until the sample broke.

Analysis of self-healing behavior using optical microscopy: Fully cured resin B and G, containing 0 and 25 mol. % UPyD230, respectively, were placed onto glass slides. Using an X-Acto knife, a small and shallow, cut was made into the material and analyzed at 15× using an Olympus BX51 optical microscope. The materials were then placed into an 80° C. oven and analyzed at room temperature (after heat exposure) after 15 and 45 min, sequentially, at a magnification of 15×.

Example 3: Experimental Methods

Materials: Epon™ 828, a diglycidyl ether of bisphenol A, with a number average molecular weight of 377 g mol$^{-1}$ and epoxy-equivalent weight (EEW) of 188.5, was obtained from Momentive Performance Materials (Waterford, N.Y.). Jeffamine® D230, a polyether diamine of number-average molecular weight 240 g mol$^{-1}$ and amine proton equivalent weight of 60, was obtained from Huntsman Corporation (The Woodlands, Tex.). Nanomer® nanoclay was purchased from Sigma-Aldrich (Saint Louis, Mo.). All other reagents were obtained from Sigma-Aldrich (Saint Louis, Mo.). The epoxy resin and curing agents were used without further purification. Nuclear magnetic resonance (NMR) spectroscopy of resin components was performed using a Bruker Ultrashield 500 Plus, 500 mHz NMR in deuterated solvents purchased from Cambridge Isotope Laboratories, Inc. (Tewksbury, Mass.). High-resolution mass spectrometry data were obtained using a Waters Xevo G2 QTOF mass spectrometer in both positive and negative mode. The sample was dissolved in a mixture of acetonitrile/methanol (70/30) with a small amount of water.

Synthesis of Compounds 1 and 2: Compound 1 (1-(6-isocyanatohexyl)-3-(6-methyl-4-oxo-1,4-dihydropyrimidin-2-yl)urea) was synthesized according to literature procedure.[15]

Example 4: Synthesis of UPyD230 and Resin Formulations

A novel, di-functional ureidopyrimidone-functionalized Jeffamine® D230 was synthesized over two steps on a multigram scale (Scheme I). Compound 1 (1-(6-isocyanatohexyl)-3-(6-methyl-4-oxo-1,4-dihydropyrimidin-2-yl) urea) was synthesized according to literature procedure.[15] Compound 2 (UpyD230, Scheme I) was obtained by a nucleophilic substitution reaction in the presence of a molar excess of Jeffamine® D230 by reaction of the terminal amine and the isocyanate moiety of compound 1. Formation of compound 2 was confirmed by $^1$H and $^{13}$C NMR spectroscopy, mid-IR spectroscopy, and High-Resolution Mass Spectroscopy (HRMS).

The reaction afforded a highly viscous and tacky material, likely due to the formation of supramolecular crosslinks via UPy/UPy interactions and short, chain entanglements. Formation the 4[1H]-pyrimidinone dimer in UPyD230 was confirmed by mid-IR spectroscopy with stretches observed at 1700 cm$^{-1}$ and 1668 cm$^{-1}$, which shifts to 1661 cm$^{-1}$ upon melting (FIG. 8).[13] The $^1$H NMR spectrum of UPyD230 in deuterated chloroform also supported formation of the 4[1H]-pyrimidinone dimer with peaks observed at 13.1, 11.8, and 10.0 ppm.[31] The major oligomeric products were confirmed by HRMS with repeat units (related to the Jeffamine® D230 portion of the molecule) of n=2 and n=3. The average repeat unit value of commercial Jeffamine® D230 is n=2.8. The product was used without further separation of oligomers, and the molecular weight was taken as the average of the molecular weight corresponding to n=2 and n=3, which equates to MW=512 g mol$^{-1}$.

UPyD230 was incorporated into various Epon™ 828/Jeffamine D230 resins at 0, 5, 10, 15, 20, and 25 mol. %. Nanoclay (20 wt. %) was added to homogenize the resin mixtures and was kept constant in all of the mixtures to discern material properties resulting from the incorporation of UPyD230. The resins were formulated so that there was a 1:1 ratio of epoxide and amine proton reactivities to promote full crosslinking.

Example 5: Temperature Effects on UPy Associations Analyzed, by IR Spectroscopies IR-ATR spectroscopy was used to probe the effect of temperature UPy/UPy and alternative hydrogen bonding associations within the resins. The material properties of many UPy-containing systems are reported to result front a hierarchical assembly process resulting from dimerization of UPy synthons, lateral stacking of UPy dimers by hydrogen bonds formed between urethane or urea groups, and bundling of the stacks into nanofibrils.[13]

Figure 8:
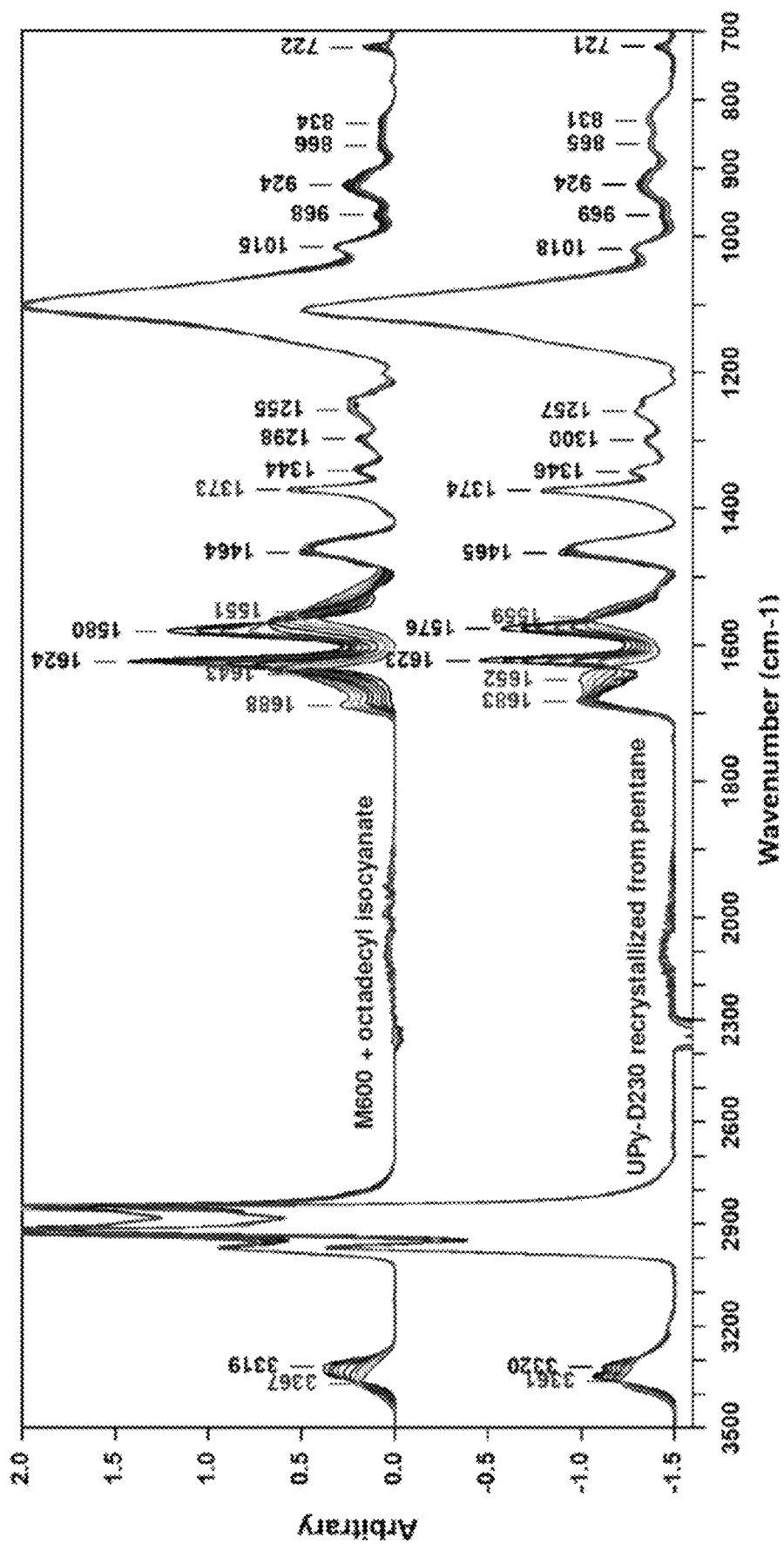
FIG. 8 shows temperature ramped IR-ATR spectra of the model compound and pentane-treated UPyD230. IR-ATR spectra of UPyD230 and the model compound were acquired during a 5° C./min thermal ramp from 25° C. to 45° C. and 25° C. to 120° C., respectfully. The spectra change from black to red with increasing temperature.
Figure 9:
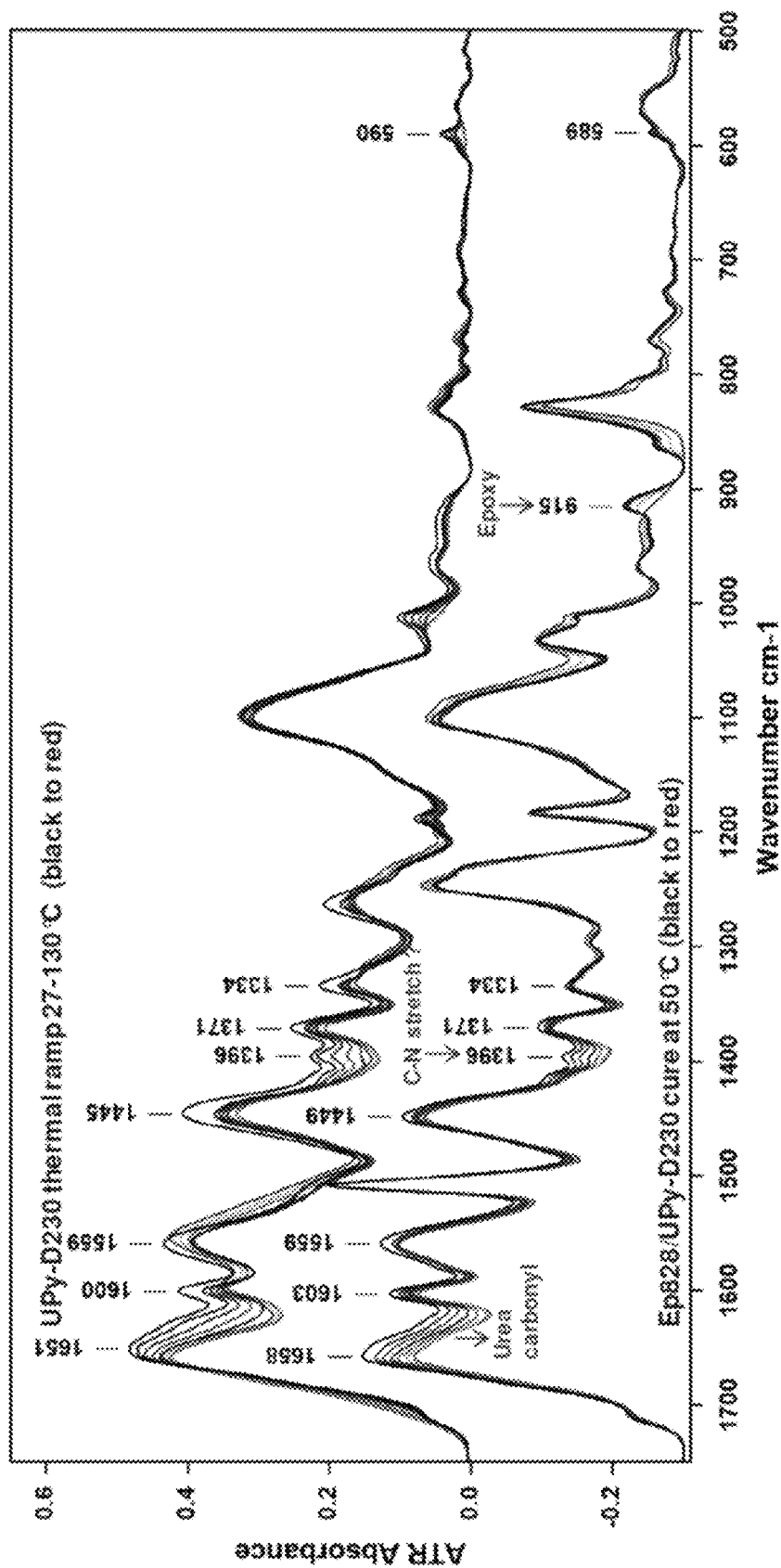
FIG. 9 shows IR-ATR spectral overlay of UPyD230 thermal ramp 25° C. to 130° C. and isothermal temperature IR-ATR of an Epon™ 828/UPyD230 mixture (1:1) curing at 50° C.

UPyD230 was analyzed at room temperature and by variable temperature IR-ATR spectroscopy from 25° C. to 130° C. (FIGS. 8, 9). Deconvolution and band assignment of UPyD230 was difficult due to the possibility for multiple H-bonding pathways. Although literature precedence suggests that the typical conformations are dimers, stacks, and nanofibers; the underlying H-bonded and entangled network may be much more complex. One cannot rule out the possibility of kinetically trapped urethane-UPy associations, back-folding of oligomeric chains, or disordered, microphase separated UPy aggregates. The material also displayed different physical properties and IR spectra when recrystallized in different solvents. The material existed primarily as a highly viscous and tacky semisolid but formed solids when recrystallized in certain solvents (pentane and chloroform). Over time, the materials would again return to a highly viscous state comparable to melted taffy.

The addition of nanoclay adds another layer of complexity to elucidation of the underlying network morphology, including the efficiency of hydrogen bonding. There is a wealth of literature where high-aspect ratio fillers like nanoclays are mixed with polymers, producing phase-separated microcomposites and intercalated or exfoliated nanocomposites.[32-35] UPy-functionalized supramolecular polymers have been incorporated into nanocomposites.[36-37] In our current system, the nanoclay was first dispersed in the epoxy resin by planetary centrifugal mixing to promote even dispersion of the solid clay into the liquid resin. UPyD230 was vigorously hand-mixed with the nanoclay-epoxy mixture, followed by additional planetary centrifugal mixing. Without the nanoclay, centrifugal mixing of epoxy and UPyD230 resulted in separated/aggregated clumps of UPyD230 material. Although not confirmed, the nanoclay may have promoted mixing of UPyD230 by the formation UPy/nanoclay interactions and/or disruption of kinetically trapped hydrogen bonded aggregates due to shear forces induced from increased surface area of the clay during mixing.

Although the UPy motif can exist in several tautomeric forms, characteristic vibrations of the 4[1H]-1-pyrimidinone tautomer are observed at approximately 1702 and 1668 cm$^{-1}$.[15] According to Painter et al., three different signals correlating to urethane C=O stretches are typically observed by IR spectroscopy: (1) a signal relating to the non-hydrogen-bonded C=O at 1721 cm$^{-1}$, (2) a disorderly bound O=O at 1699 cm$^{-1}$, and (3) an orderly bound C=O at 1684 cm$^{-1}$.[13,15,38]

Figure 10:
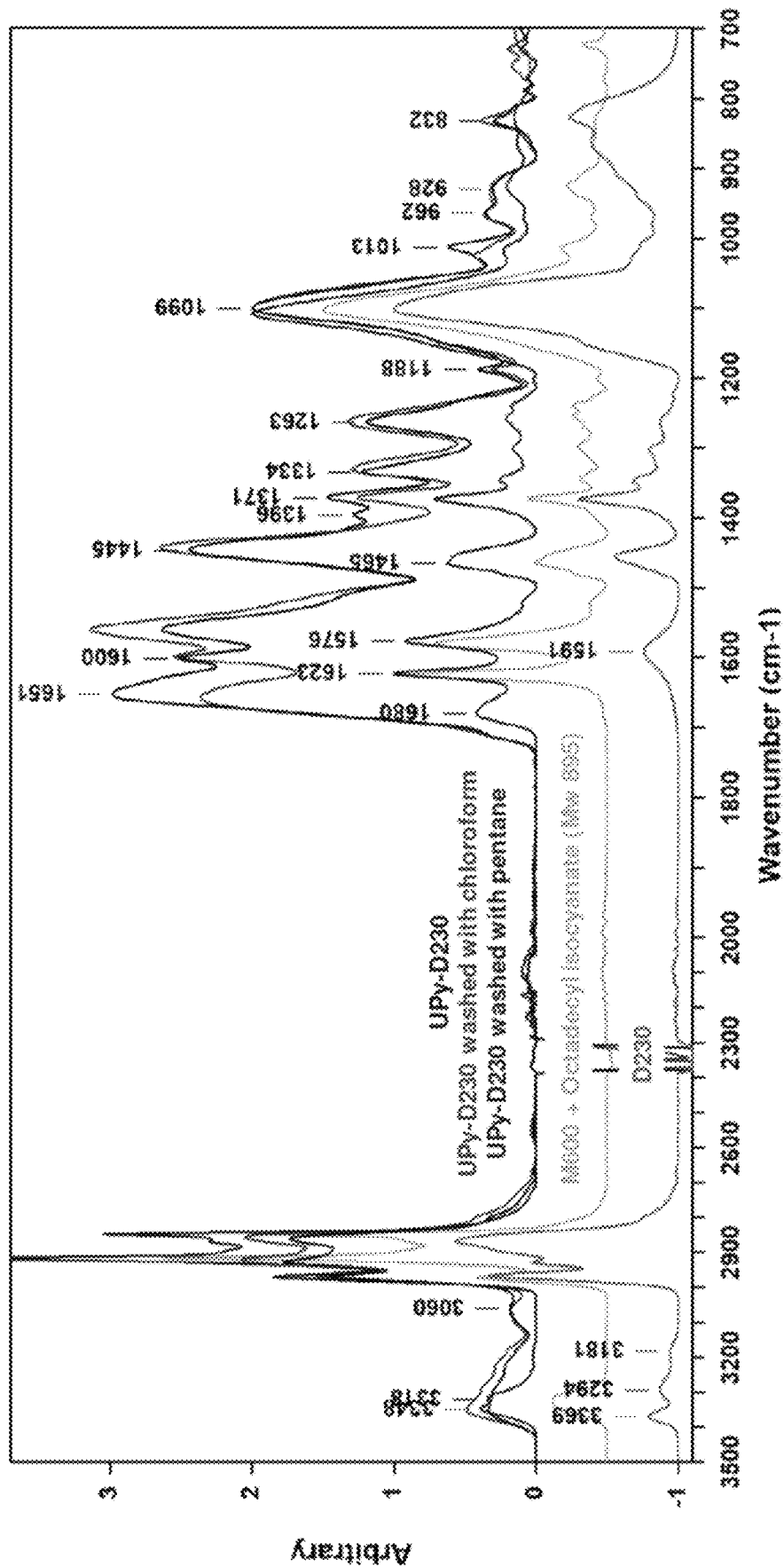
FIG. 10 shows IR-ATR spectral overlay of D230 (labeled "D230"), a model compound for isocyanate grafted polyetheramine (labeled "M600+Octadecyl isocyanate (Mw 895)"), UPyD230 (labeled "U-Py-D230"), pentane-treated UPyD230 (labeled "U-Py-D230 washed with pentane"), and chloroform-treated UPyD230 (labeled "U-Py D230 washed with chloroform"). Samples were recrystallized and dried under vacuum to remove trace solvent prior to analysis.

By IR-ATR spectroscopy, UPyD230 with no solvent treatment showed a broad shoulder at 1700 cm$^{-1}$ and band at 1651 cm$^{-1}$ corresponding to loosely hydrogen bond associated UPy C=O (FIG. 10). The shoulder at 1700 cm$^{-1}$ is attributed to UPy/UPy dimer-association or a disorderly hydrogen-bonded urea carbonyl. Urea N—H stretches are also broadly observed between 3400-3100 cm$^{-1}$ indicative of some degree of urea H-bonding.

Using IR-ATR spectroscopy, the chloroform-treated sample shows similar spectral features to the untreated UPyD230 (FIG. 10). There is a slight shift of UPy C=O band to greater wavenumbers (≈1663 cm$^{-1}$), which may indicate more dimer or H-bonding interactions. Furthermore, the urea bands (C=O and C=N) are more highly resolved at 1600 and 1550 cm$^{-1}$, respectively.

Figure 11:
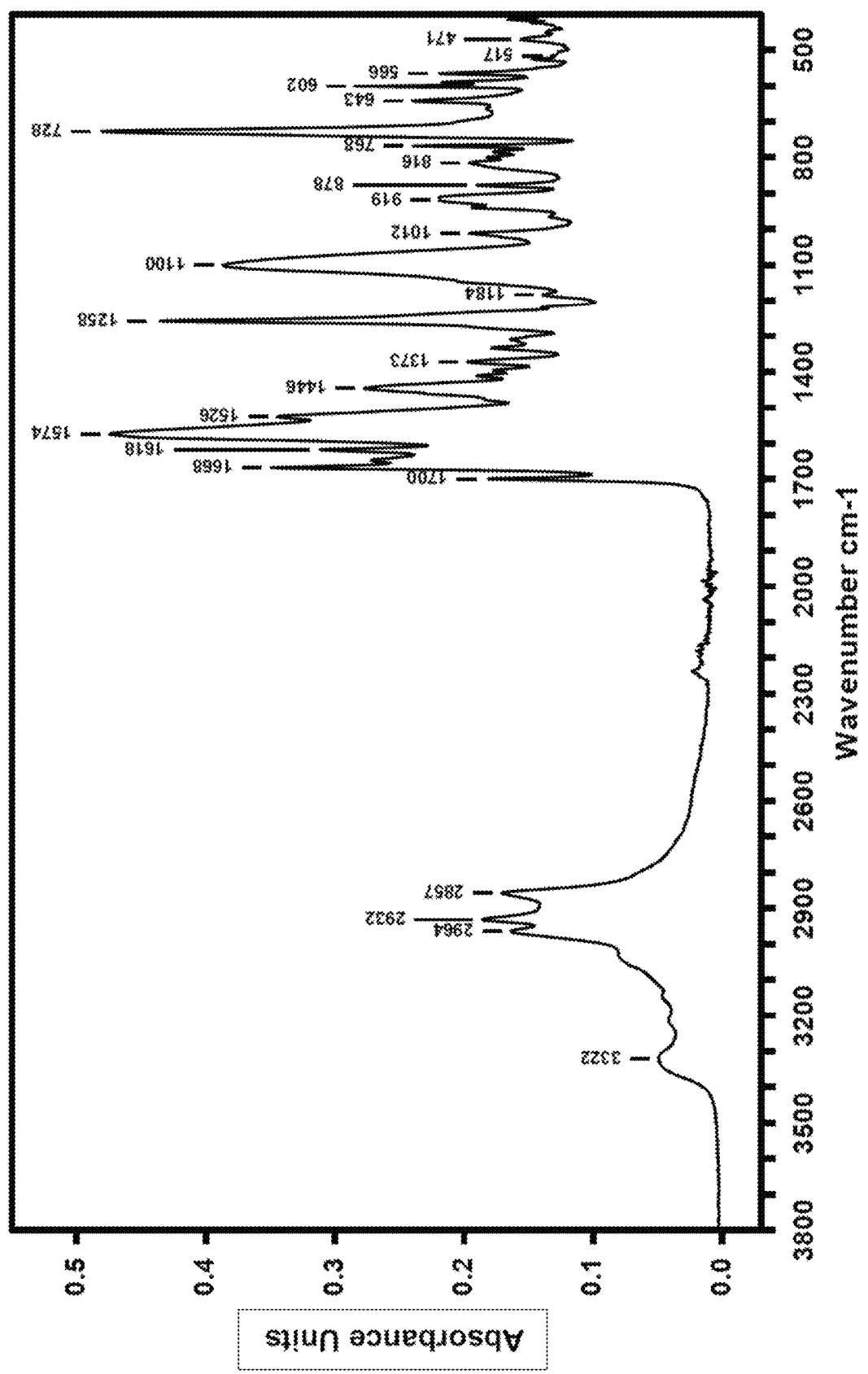
FIG. 11 shows the mid-IR spectrum of UPyD230 washed several times with pentane and then dried under vacuum.

Analysis of pentane-treated UPyD230 (UPyD230 was washed with several volumes of pentane and dried under vacuum) by mid-IR spectroscopy at room temperature displays a peak at 1700 cm$^{-1}$ and stretch at 1668 cm$^{-1}$ indicative of the formation of the UPy/UPy dimer (FIG. 11). When using ATR-IR spectroscopy, the pentane-treated sample does not display a shoulder at 1700 cm$^{-1}$; and a band is observed at 1680 cm$^{-1}$, which may be associated to an orderly bound urea C=O (FIG. 10). An N—H stretch at 3319 cm$^{-1}$ is also visible in the pentane-treated sample in the both mid-IR and IR-ATR spectra, which can be attributed to the formation of lateral urethane-urethane hydrogen bonds (FIGS. 8,10, 11).[38,39] The IR-ATR spectrum of pentane-treated UPyD230 also reveals highly resolved urea I (C=O) at 1623 cm$^{-1}$ and urea II (C—N) at 1576 cm$^{-1}$ bands. According to Lortie et al., these stretches can be attributed to a strongly hydrogen-bonded urea.[40] Urea N—H stretches were also observed from 3400-3250 cm$^{-1}$, with a peak at 3319 cm$^{-1}$ suggestive of lateral urea stacking.

The pentane-treated samples were also analyzed by variable temperature IR-ATR and compared to a model compound (FIG. 8). In order to better elucidate IR-ATR bands related to UPyD230, we synthesized a model compound derived from the reaction of Jeffamine® M-600 Polyetheramine and octadecyl isocyanate, M-600 polyetheramine is a 600 molecular weight polypropylene glycol monoamine, with methoxyethyl termination at the other end. Reaction of M-600 with octadecyl isocyanate produced an internal urea. Upon increasing temperature, the shoulder observed at 1700 cm$^{-1}$ and the stretch at 1668 cm$^{-1}$ associated to the urea carbonyl and dimer formation, decrease and shift to lower wavenumbers, indicative of disruption of the UPy/UPy dimer. Both urea I ((C=O)) and urea II (C—N) bands at 1623 and 1576 cm$^{-1}$, respectively, decrease in intensity as a function of temperature. The amide I band shifts to greater wavenumbers, while the amide II shifts to lower wavenumbers. Additionally, the N—H stretches between 3400-3250 cm$^{-1}$ shift to greater wavenumbers, indicative of breaking of N—H hydrogen bonds (FIG. 8). There is also a decrease in the intensity of a stretch at 1396 cm$^{-1}$, which we associated to a C—N stretch. From these studies, it is clear that there exists possibility for multiple hydrogen bonding interactions to exist with UPyD230 and that solvent and temperature treatment can affect changes in the physical network.

Example 6: Confirmation of UPyD230 Reactivity and Cure Kinetics

A combination of variable temperature near- and mid-IR spectroscopies were used to monitor the reactivity of UPyD230 in the resin mixtures and to investigate the effects of crosslinking and temperature on the UPy/UPy association. In the case of near-IR spectroscopy, only samples devoid of nanoclay filler were able to be analyzed due to scattering effects. As an initial reactivity screening, Epon™ 828 and UPyD230 were mixed at 1:1 molar ratios at 30, 60, and 90° C., and the disappearance of the epoxy band at 4530 cm$^{-1}$ was monitored with respect to time.

Figure 12B:
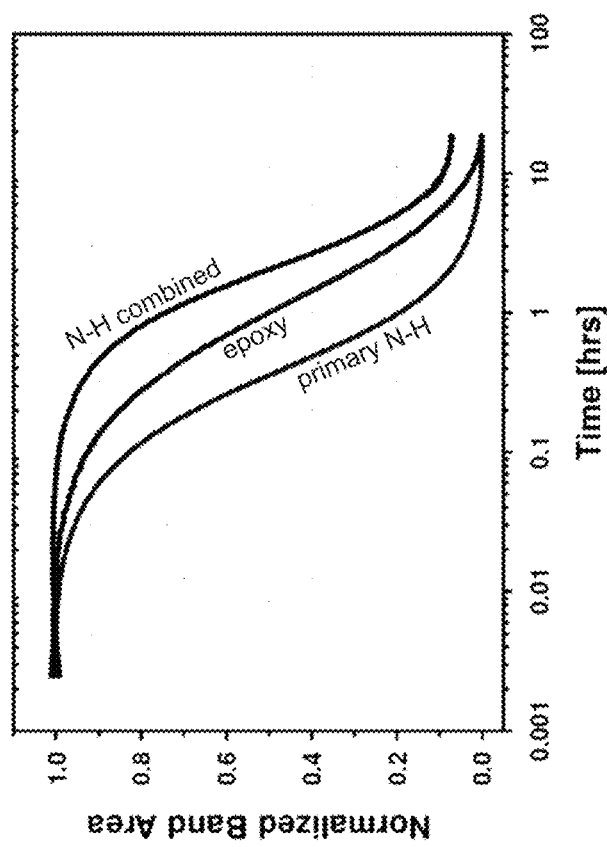
FIG. 12A-12B shows near-IR monitoring of a cure reaction between Epon™828 and UPyD230, which were mixed at a 1:1 molar ratio. Provided are (A) a normalized plot of the decreasing epoxy band versus time at 30° C., 60° C., and 90° C. cure temperatures; and (B) a plot showing the normalized band area of the epoxy (labeled "epoxy"), primary amine (labeled "primary N—H"), and combined primary and secondary amine (labeled "N—H combined") versus time at a cure temperature of 60° C.
Figure 12A:
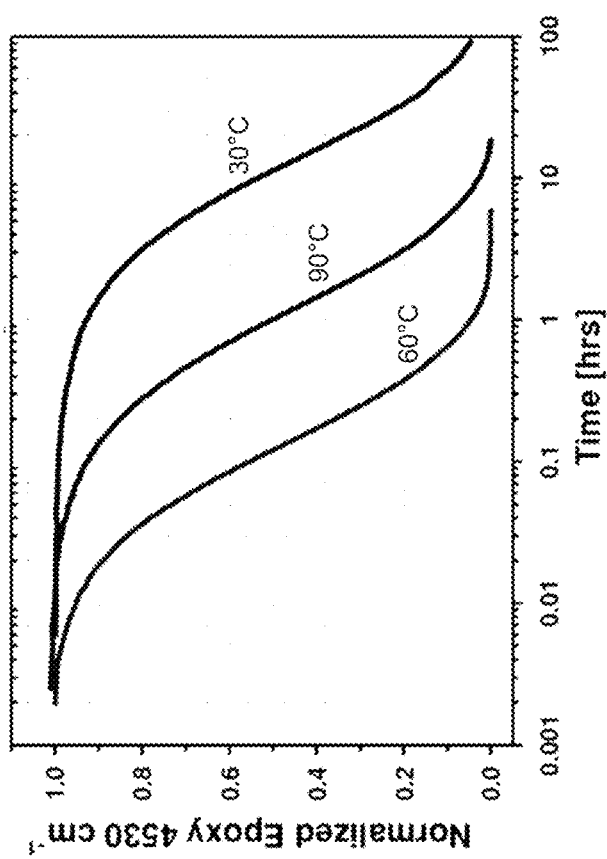
Figure 13:
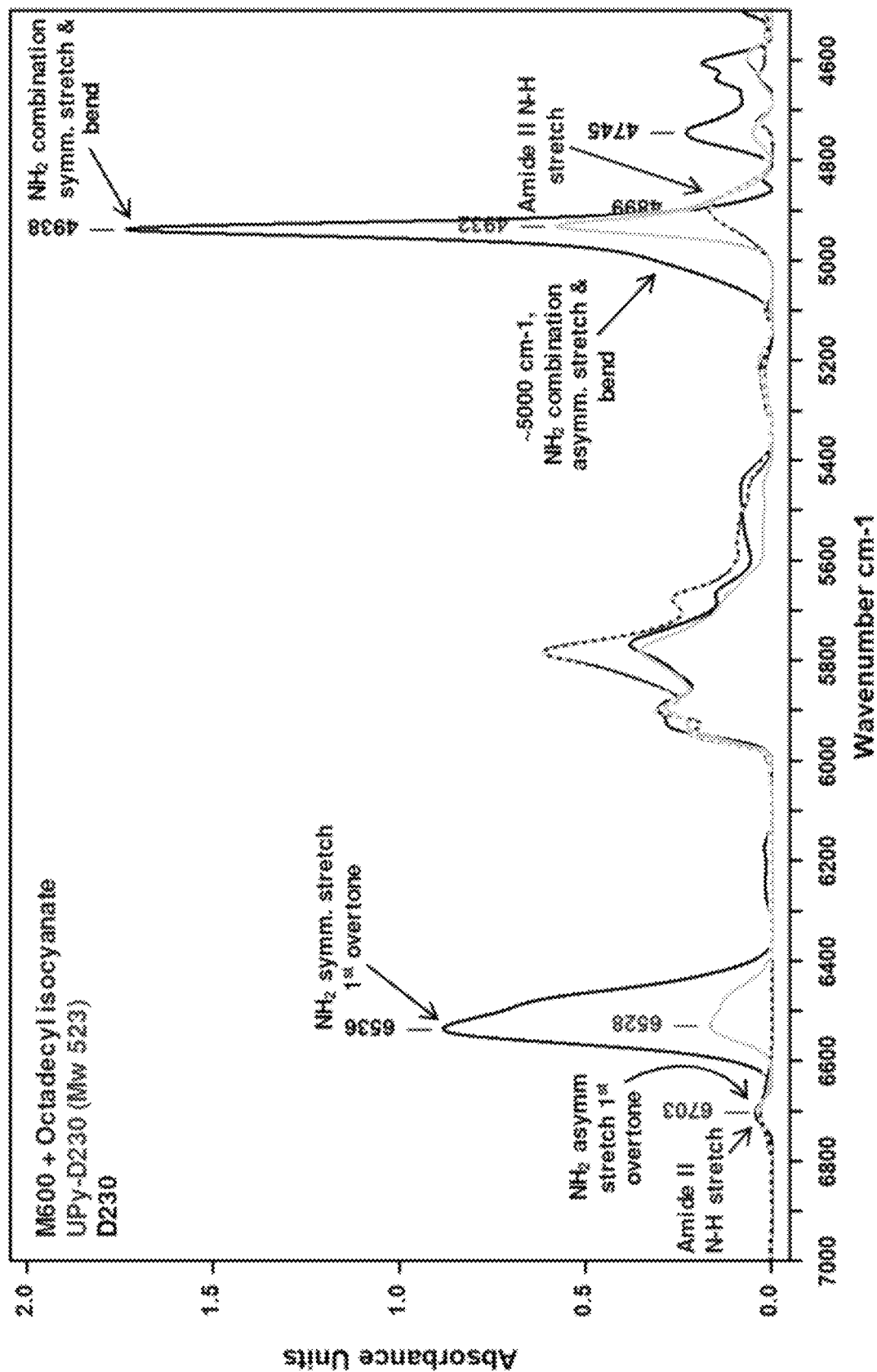
FIG. 13 shows near-IR spectral overlay of the model compound (labeled "M600+Octadecyl isocyanate," dashed line), UPyD230 (labeled "UPy-D230," gray line), and D230 (labeled "D230," black line).
Figure 14:
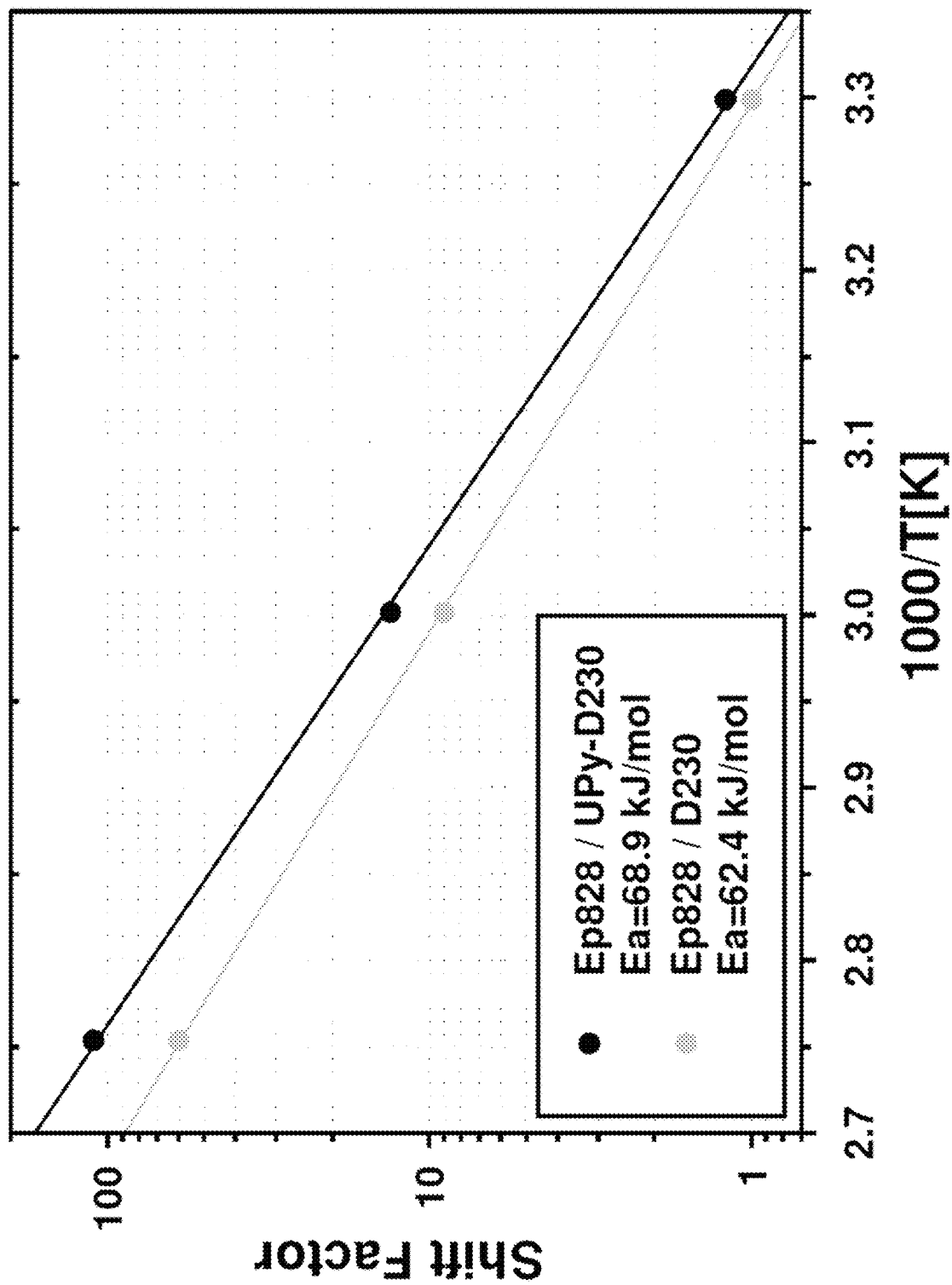
FIG. 14 shows near-IR derived time-temperature superposition of the epoxy band from 1:1 mixtures of Epon™ 828/D230 (gray) and Epon™ 828/UPyD230 (black) at 30° C.

FIG. 12A shows full consumption of the epoxy band at all temperature regimes over time, indicative of UPyD230 reactivity via the epoxy-amine addition reaction. No evidence of epoxide homopolymerization, such as etherification was observed, which further supports epoxy-amine addition is the dominate pathway towards crosslinking. Stretches corresponding to secondary and primary amine consumption upon epoxide addition were also monitored over time at 60° C. (FIG. 12B). Virtually full consumption the of the reactive amine protons was observed over time, further supporting reactivity of UPyD230 with Epon™ 828. For reference, provided are near-IR spectral overlays of the model compound, UPyD230, and D230 compounds (FIG. 13). Also provided is the time-temperature supposition of the epoxy band (FIG. 14).

Figure 15:
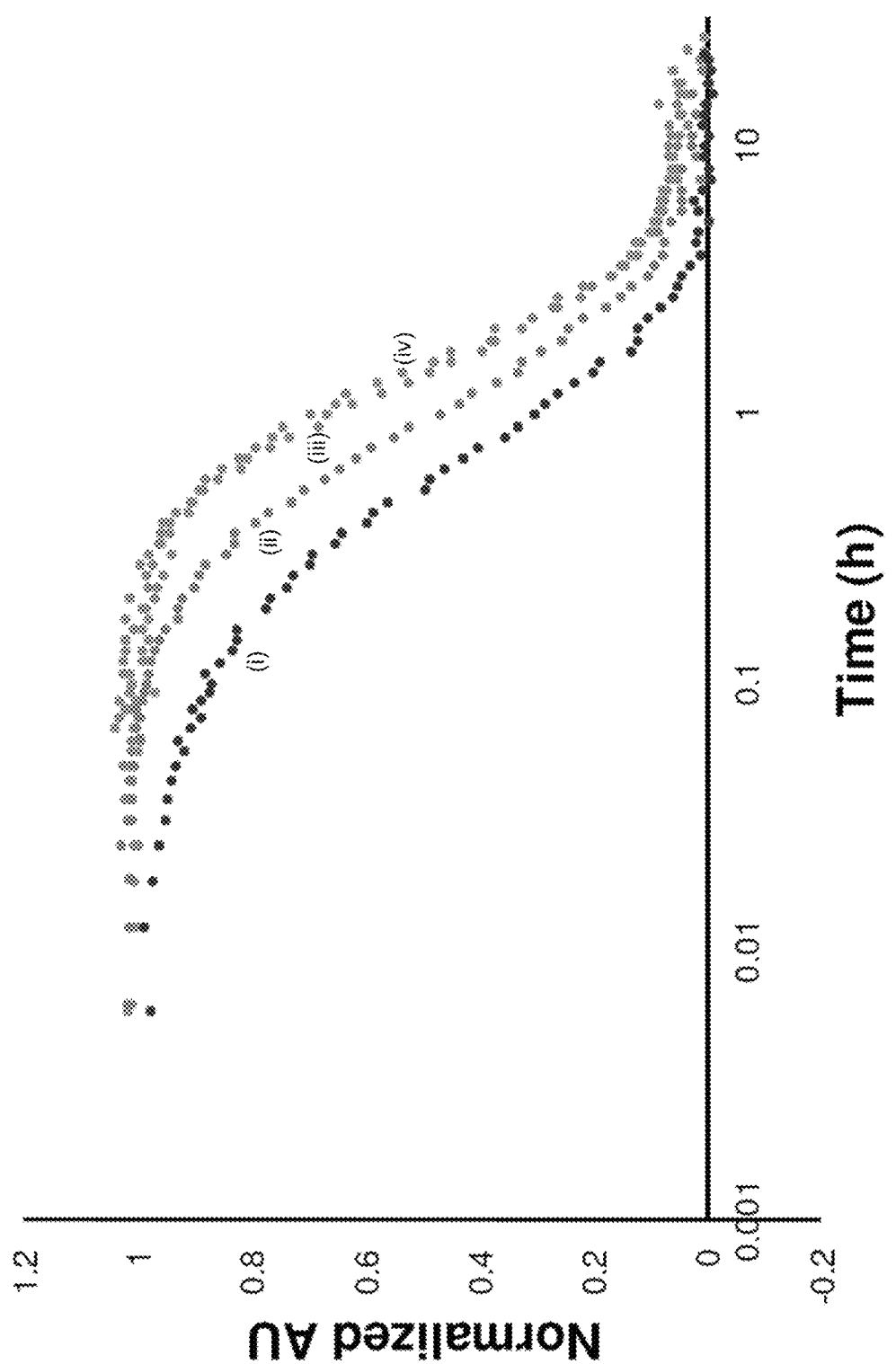
FIG. 15 shows cure profile of resin mixtures A (Epon™ 828/19230 with no nanoclay, labeled "(iv)"), B (Epon™ 828/D230 with nanoclay and 0% UPy, labeled "(iii)"), C (Epon™ 828/D230 with nanoclay and 5 mol. % UPy, labeled "(ii)"), and G (Epon™ 828/D230 with nanoclay and 25 mol. % UPy, labeled "(i)") obtained using mid-IR spectroscopy. The epoxide consumption was monitored by measuring the decrease in the epoxy band at 915 cm$^{-1}$ over time at a cure temperature of 60° C. The epoxy band signal was normalized and plotted against time.

Mid-IR spectroscopy was also used to monitor the disappearance of the epoxy band in 0, 5, and 25 mol. % UPyD230 formulations containing nanoclay filler at 60° C. (FIG. 15). Full consumption of the epoxy band at 915 cm$^{-1}$ was observed in all resins. From combined near- and mid-IR cure studies, it was apparent that UPyD230 is reactive towards Epon™ 828 and that the epoxy-amine addition reaction is not hindered by the introduction of supramolecular, physical crosslinks.

The absorption bands indicative of H-bonding of UPyD230 were also monitored during a 50° C. cure in a 1:1 mixture of Epon828 and UPyD230 during a thermal ramp (25° C. to 130° C.) (FIG. 9). As the cure proceeds, urea carbonyl stretches at 1700 cm$^{-1}$ and 1668-1651 cm$^{-1}$ decrease. This suggests that the UPy/UPy associations are disrupted to some degree as the network becomes more highly crosslinked. There is, however, some retainment of the stretch at 1700 cm$^{-1}$, indicating not all of the UPy/UPy associations are disrupted. The epoxy band at 915 cm$^{-1}$ also decreases upon reaction with the primary and resulting secondary UPyD230 derived amines, again, indicating reactivity of UPyD230 with the commercial epoxy resin (FIG. 9).

Example 7: Rheological Properties of Pre-Polymer Resins

The rheological properties of the resins were analyzed to determine the effects of the UPyD230 on viscosity, shear-moduli, shear-thinning, and thixotropic behavior, which are pertinent properties of DIW 3D printing inks. The enhancement of both zero shear viscosity and shear thinning behavior by incorporation of supramolecular interactions were probed with steady shear rheology experiments. These tests were conducted at room temperature to retain hydrogen-bonded physical crosslinks, while preventing thermally accelerated epoxy-amine crosslinking during the test. Resins were prepared immediately prior to analysis in order to minimize covalent crosslinking prior to and during the experimental.

Figure 16:
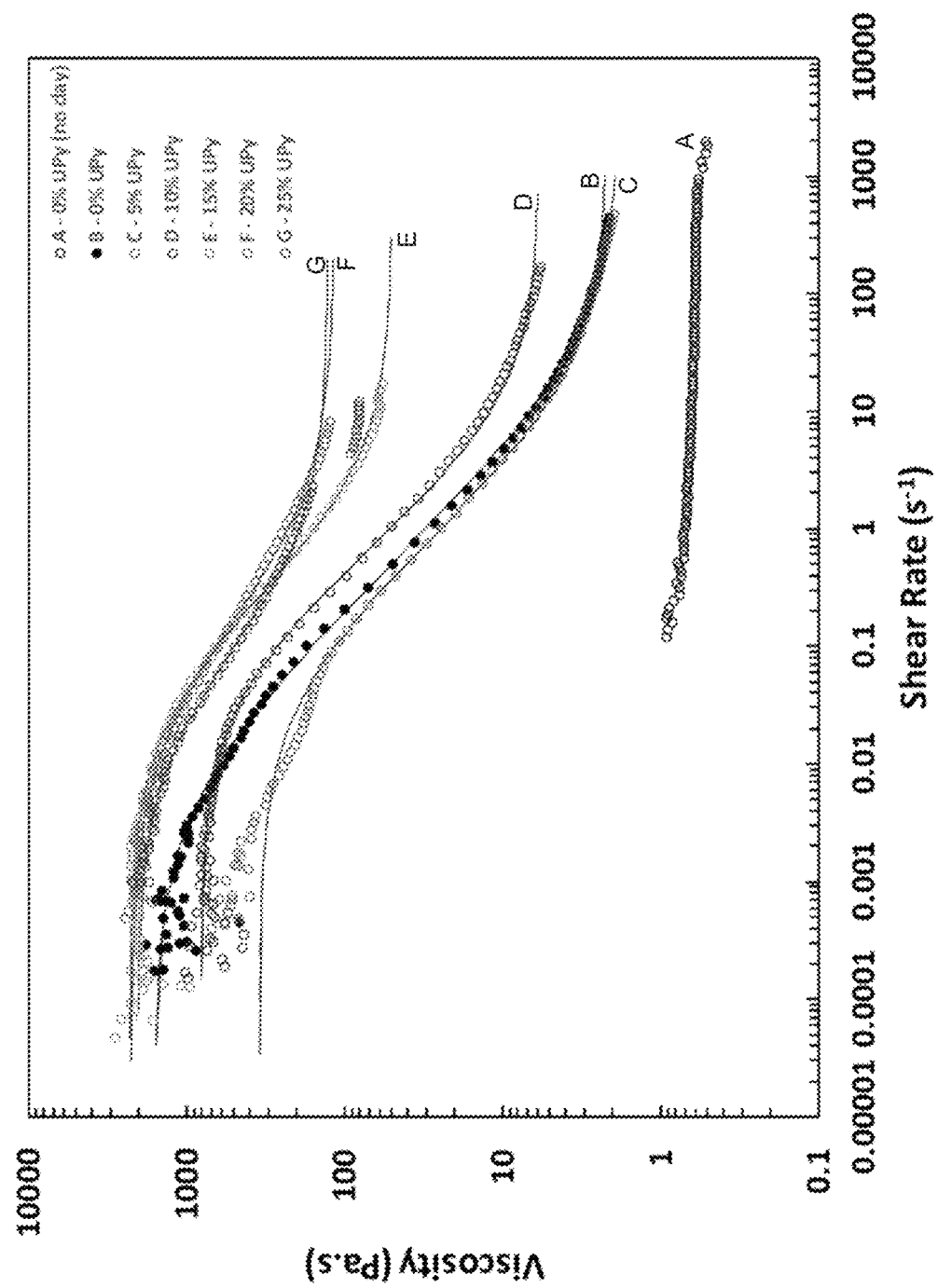
FIG. 16 shows viscosity versus shear rate data for the resin systems described herein. Lines show Cross model fits to the viscosity data (see, e.g., Cross M M, "Rheology of non-Newtonian fluids: a new 'flow' equation for pseudoplastic systems," *J. Colloid Sci.* 1965; 20:417-37).

First, as a baseline for comparison, the viscosity as a function of applied shear rate was measured for the formulation excluding (resin A) and including nanoclay filler (resin B). Then a series of resins containing varying amounts of UPyD230 and consistent nanoclay content were analyzed. Resin A (Epon™ 828/D230) shows a relatively low viscosity (Newtonian viscosity of approximately 0.7-0.8 Pa·s) and displays very weak shear thinning behavior over the range of shear rates examined. This relatively low viscosity allows the base resin to readily flow through fine printing nozzles, however, the printed material rapidly wets the substrate and lacks the ability to support itself after printing. Upon addition of nanoclay filler (resin B, Epon™828/D230/nanoclay), the rheological behavior becomes markedly different (FIG. 16). The addition of the nanoclay results in a resin system having a zero shear viscosity (Newtonian viscosity at very low shear rates) that is approximately three orders of magnitude greater than the unfilled resin and has considerable shear thinning character. However, even with the significant increase in viscosity, the base resin with nanoclay added did not have sufficient dimensional stability to preserve a printed structure.

The addition of the UPyD230 to the resin caused an initial decrease in zero shear viscosity followed by an increase with increasing UPyD230 content. Without wishing to be limited by mechanism, it is hypothesized that the initial decrease in zero shear viscosity at 5% UPyD230 may be attributed to the formation of UPy/nanoclay H-bonding interactions, which may hinder the aggregation of clay. As the concentration of UPy is increased, there may be a critical concentration of UPyD230 where UPy/UPy interactions dominate, leading to a global increase in the pre-polymer network structure and greater viscosity. Further, the addition of the UPyD230 increases the infinite shear rate viscosity monotonically with the 25% UPyD230 containing sample (resin G) having an infinite shear rate viscosity that is approximately two orders of magnitude higher than the base resin containing nanoclay (resin B). The increase in viscosity with increasing UPyD230 content is attributed to the supramolecular interactions (i.e., hydrogen bonding) between these modified materials. The increase in both zero shear and infinite shear rate viscosity is beneficial for 3D printing applications.

The differences in viscosity and shear thinning behavior resulting from the addition of nanoclay and subsequently the supramolecular interactions provided by the UPyD230 were quantified by fitting the viscosity versus shear rate curves in FIG. 16 with a Cross model[41]:

$$\eta = \frac{\eta_0 - \eta_\infty}{1 + (K\dot{\gamma})^m} + \eta_\infty, \quad (1)$$

where $\eta_0$ is the zero shear rate viscosity, $\eta_\infty$ is the infinite shear rate viscosity, K is the characteristic time of the mixture, $\dot{\gamma}$ is the applied shear rate, and m is the rate index (Equation (1)). The Cross model describes each of the UPy and nanoclay containing mixtures quite well (lines in FIG. 16), and the fit parameters for each of the solutions are listed in Table 1. The increase in both zero shear rate and infinite shear rate viscosity with increasing UPyD230 content are evident in the fit parameters for the Cross model,

TABLE 1

Cross model and power law parameters for resins A-G

| Resin | $\eta_0$ [Pa s] | $\eta_\infty$ [Pa s] | K [s] | m | n |
|---|---|---|---|---|---|
| A | — | — | — | — | −0.03 |
| B | 1600 | 1.8 | 180 | 0.77 | −0.76 |
| C | 340 | 2.2 | 24 | 0.84 | −0.69 |
| D | 810 | 5.9 | 23 | 0.9 | −0.71 |
| E | 2300 | 50 | 34 | 0.86 | −0.6 |
| F | 2200 | 120 | 43 | 0.77 | −0.41 |
| G | 2100 | 130 | 59 | 0.81 | −0.43 |

Next, the shear thinning behavior of each material was quantified by fitting the shear thinning regions of each curve with a simple power law model of the form:

$$\eta = A(\dot{\gamma})^n \quad (2),$$

where the power law index, n, shows the degree of shear thinning (Equation (2)). The power law index decreases by adding more UPyD230 indicating a decrease in the magnitude of shear thinning behavior. This is also supported by the decrease in the magnitude of the relative difference between the zero shear rate and infinite shear rate viscosities as more UPyD230 is added. For example, the relative difference between $\eta_0$ and $\eta_\infty$ is approximately two orders of magnitude for Resin C while the difference is only approximately one order of magnitude for Resin G. The decrease in shear-thinning behavior is again attributed to hydrogen bonding and other molecular interactions provided by the addition of the UPyD230. Although, the addition of UPy to other polymer systems has resulted in materials with shear-thinning character,[42-45] the present system aided the printing process mainly through viscosity enhancement. In future studies, we will investigate how multifunctional or branched UPy-functional hardeners affect shear-thinning. The authors would also like to modify the structure of UPy-hardeners, so that it can be homogenized in the resin, hopefully without the aid of nanoclay.

Figure 17:
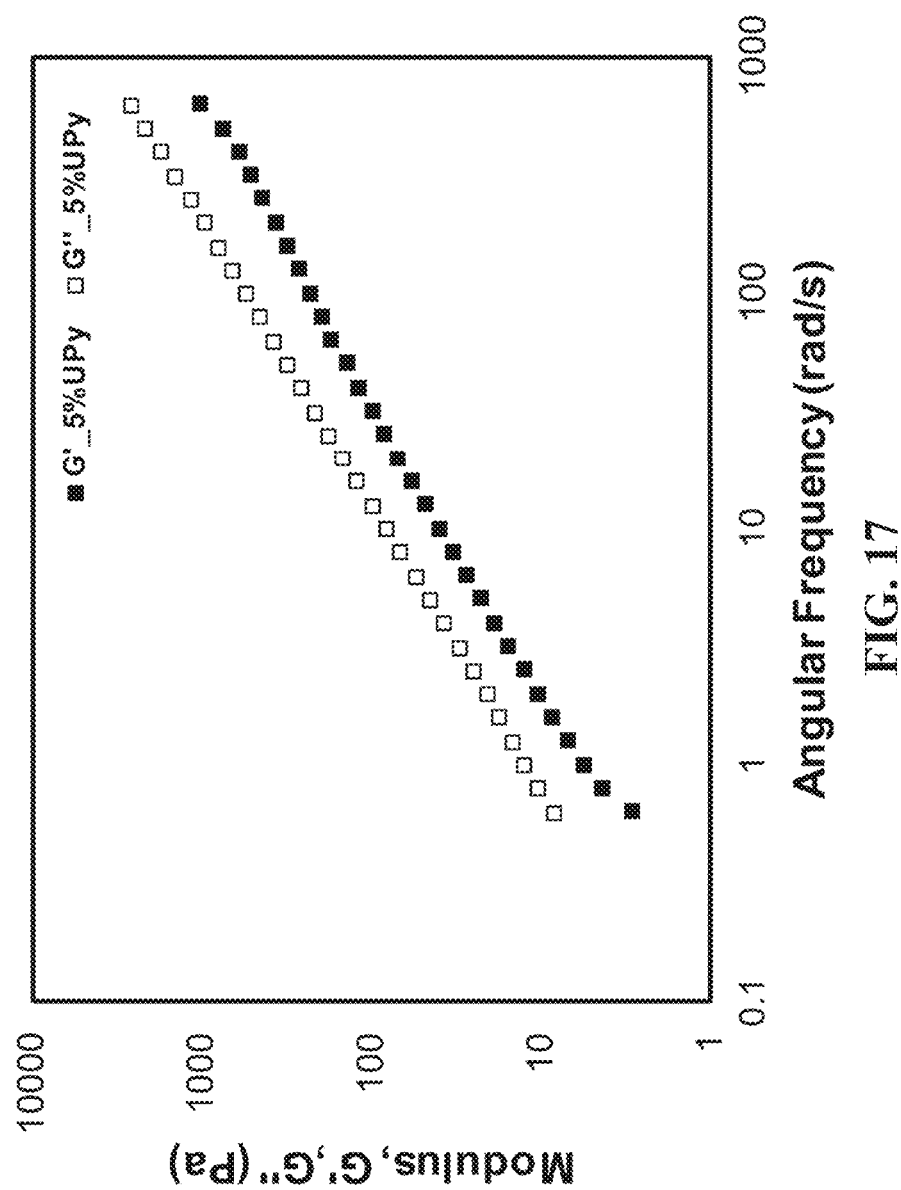
FIG. 17 shows shear moduli as a function of angular frequency for Resin C showing behavior typical of all resins tested here. Filled symbols are the storage modulus and open symbols are the loss modulus.

The structure and viscoelastic character of the resins were probed using small angle oscillatory shear testing. As an advantage, this diagnostic allows the probing of a material without disturbing the sometime fragile structure due to interactions like hydrogen bonding. The loss modulus (G") is indicative of how much of the applied energy is dissipated, while the storage modulus (G') indicates how much of the applied energy is stored within a material. For the entire range of angular frequencies probed here, the loss modulus was greater in magnitude than the storage modulus for each of the resins tested. A typical plot of the moduli versus angular frequency is shown in FIG. 17.

Figure 18:
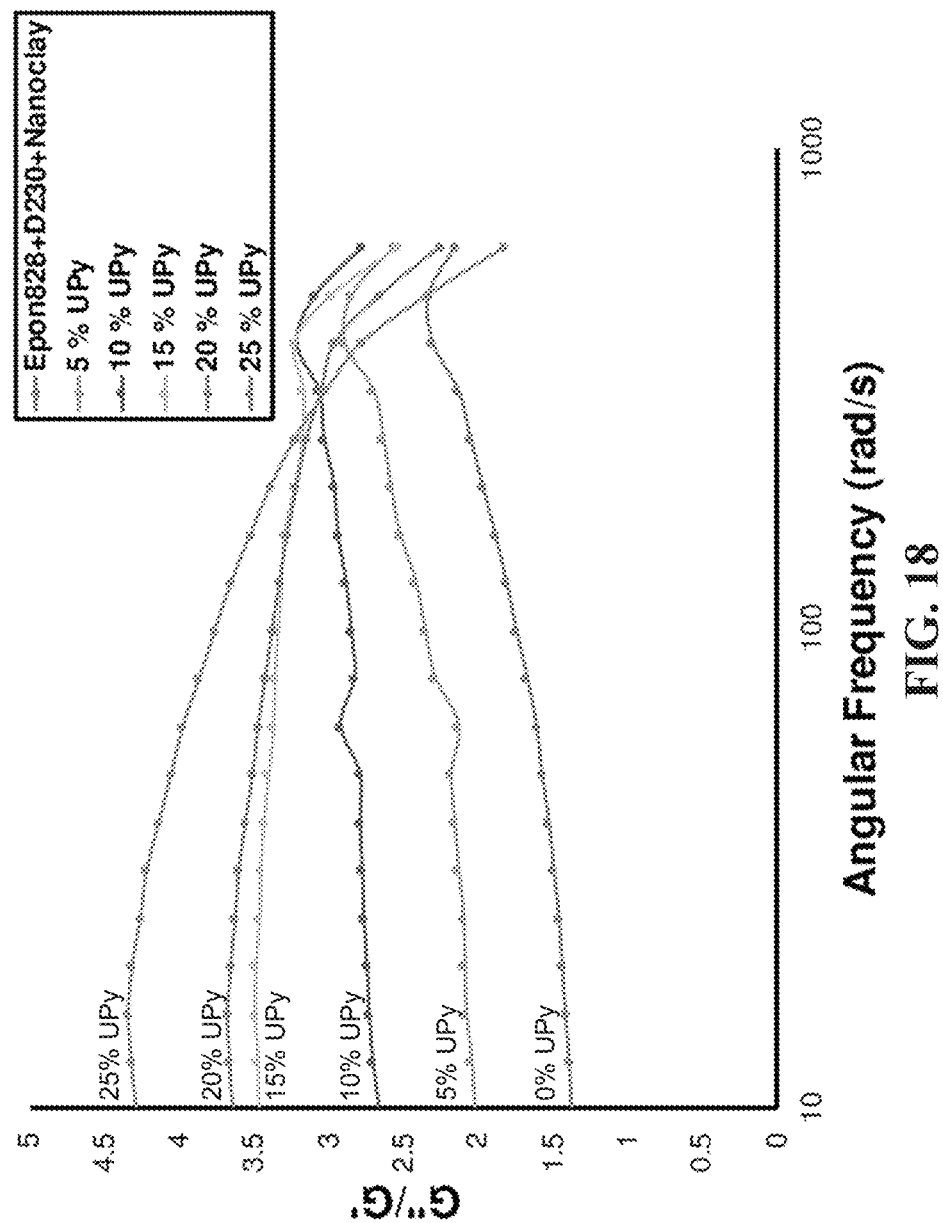
FIG. 18 shows land as a function of angular frequency for resins B-G.

The fact that the loss modulus dominates for each of these resins indicates that the material behavior of the uncured resins is dominated by viscous dissipation. Each material has considerable elastic character (G' has magnitude), but the behavior is largely dissipative in nature, which can result in viscous flow. Examining the ratio of the loss modulus to the storage modulus (G"/G'=tan δ) offers another interpretation for the behavior of these materials (FIG. 18). As more UPyD230 is added, the magnitude of tan δ also increases at low frequencies. This indicates that more energy dissipation occurs in resins with higher UPyD230 content. Further, while the low UPyD230 content resins show an increase in tan δ with increasing frequency, resins with 15% or greater UPyD230 show the opposite behavior (i.e., tan δ decreases with increasing frequency). For relatively high frequencies (≈300 rad s$^{-1}$), the tan δ of all of the UPyD230 containing resins converges to approximately the same value indicating that at these frequencies, each of the resins displays similar viscoelastic behavior.

It is hypothesized that at low frequencies, the network structure may be poorly defined containing multiple H-bonding and aggregation pathways (UPy dimers, UPy/urea, urea/urea, UPy/nanoclay, intramolecular back-biting) and kinetically trapped, non-perfect assemblies. At greater frequencies, shear forces may result in a breakage of these ill-defined networks and H-bonding interactions, allowing for the growth of nuclei, which initiate further aggregation.[46-47] Stretching or breaking of linear polymers by shear forces may also result in a breakage of UPy/urethane interactions.[18,46] This would allow for the formation of desired nucleus-containing UPy/UPy stacks with possibility for further stabilization through secondary urethane/urethane hydrogen bonds.[46,47] Nucleation events therefore are expected to induce the growth of larger structures with more solid-like character.

Figure 19:
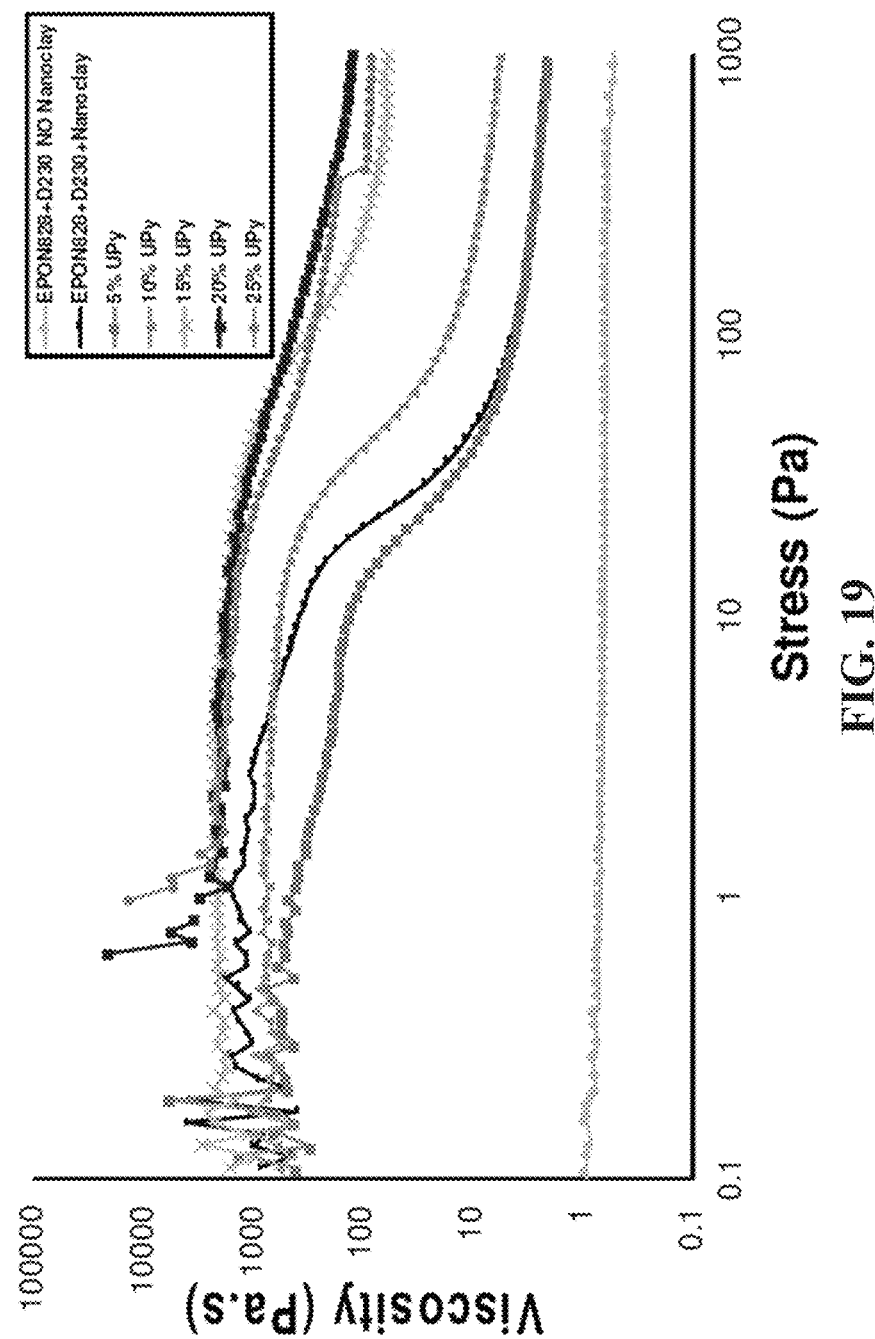
FIG. 19 shows viscosity versus shear rate data determined by stress ramp measurements to determine the apparent yield stress. The apparent yield stress is approximated as the tangent of the curve.

Another important property to consider for effective 3D printable materials is yield stress. In the case of fluids, yield stress is the stress that must be applied to a material before it will flow. Having a relatively high yield stress allows a 3D printed material to better maintain a printed shape. Yield stress was measured for each of the resins presented here by subjecting each to a stress ramp where the applied shear stress was increased logarithmically with time while measuring the viscosity (FIG. 19). The apparent yield stress is taken as the stress at which the onset of a significant drop in viscosity occurs. The apparent yield stress of the material increases with increasing UPyD230 content due to the formation of a physically crosslinked entangled network front the combination of UPy/UPy or alternative H-bonding crosslinks and D230 chain entanglements. This increase in yield stress is important to produce self-supporting structures by DIW print. The relatively smaller magnitude of viscosity decrease shown in FIG. 19 with increasing stress is consistent with the viscosity versus shear rate behavior for these same resins shown in FIG. 16. Further, the increased viscosity at high applied shear stress is consistent with the entangled, physically crosslinked network structure we hypothesized here.

Figure 20:
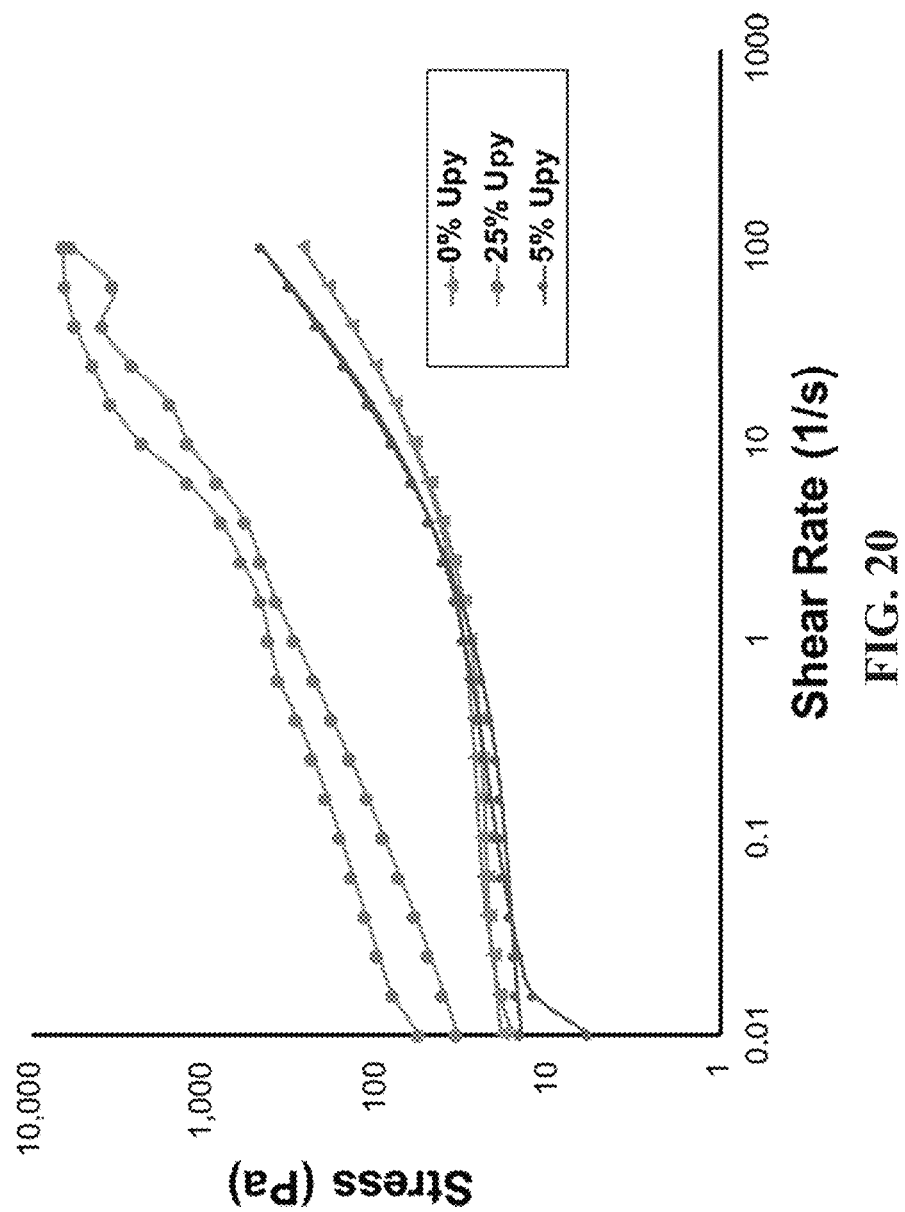
FIG. 20 shows flow sweep curves with increase and decrease shear rates, displaying hysteresis effects with increased UPyD230 content.

In many cases, the addition of hydrogen bonds result in materials that are thixotropic, displaying time-dependent changes in viscosity. This is a desirable property of DIW 3D printing inks. The material ideally must show shear-thinning character through the disruption of an internal network, but upon exiting the printing nozzle, the network must reform quickly in order to maintain filament shape. When a material is thixotropic, a hysteresis loop is observable upon increasing and decreasing the shear stress over time. When comparing the time-dependent viscosity of resins containing 0, 5, and 25% UPyD230, a hysteresis loop is observed in the sample containing 25% UPyD230, indicative of thixotropic behavior resulting from the addition of greater concentrations of UPyD230 (FIG. 20). At low shear rates (≈0.1-0.01 $s^{-1}$), the material is able to quickly recover to about 55-60% of its original viscosity.

Figure 21:
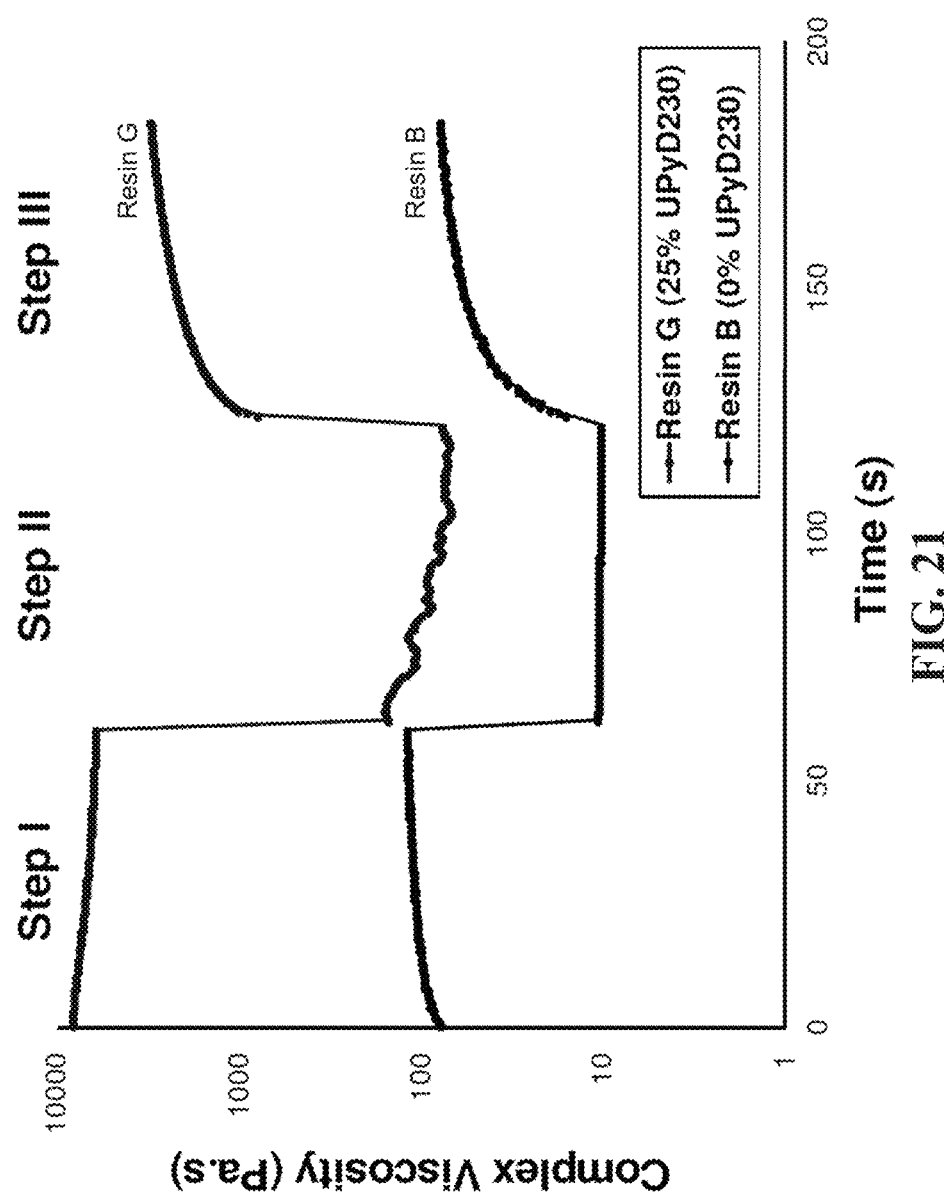
FIG. 21 shows viscosity versus time during a stepped shear experiment for resins B and G. Provided are shear thinning and recovery behavior of these resins, in which steps I, II, and II were performed at a constant shear rate of 0.1, 500, and 0.1 s$^{-1}$, respectively.
Figure 22:
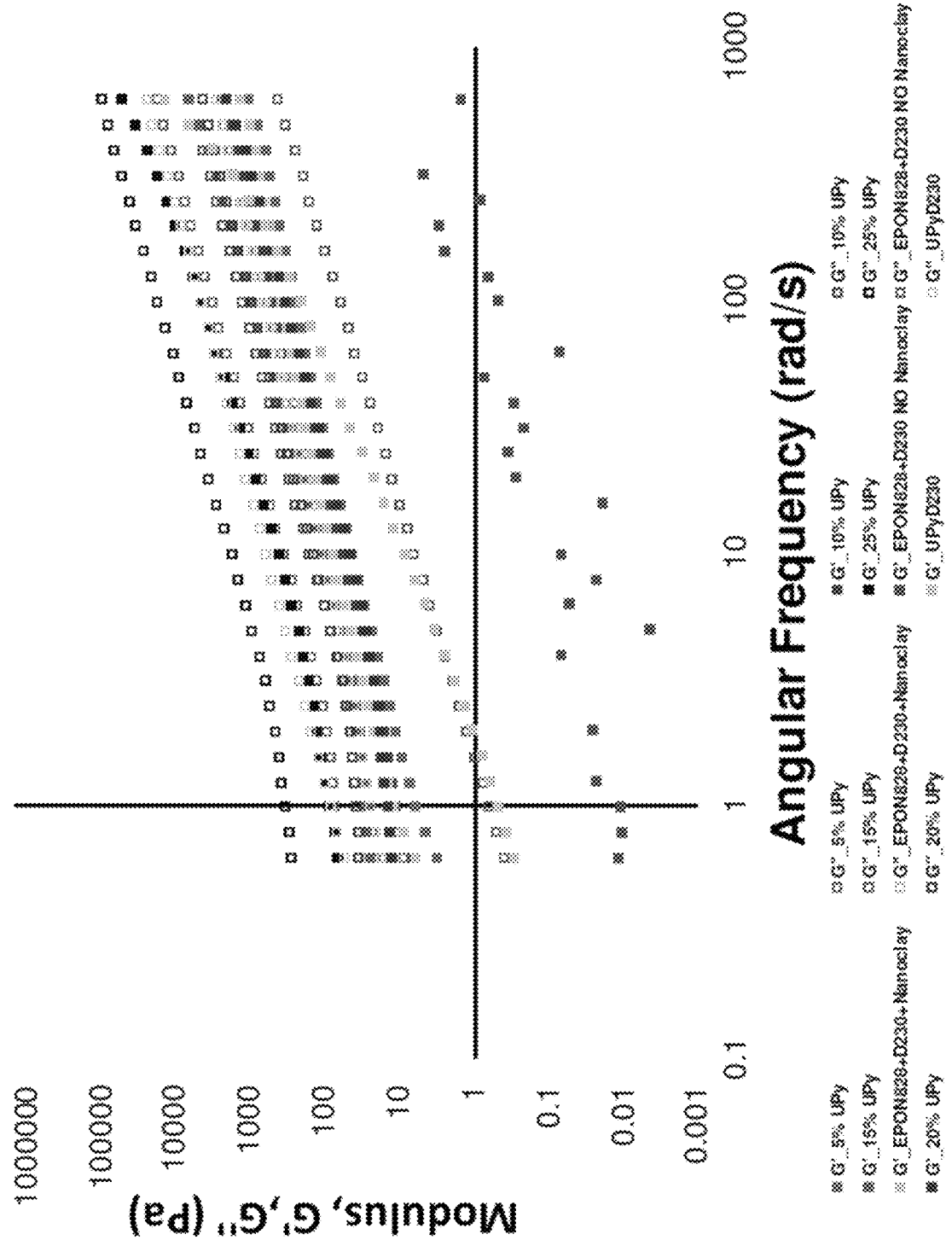
FIG. 22 shows overlay of shear modulus (G'/G") as a function frequency of resins A-G obtained by oscillatory rheology experiments.
Figure 23:
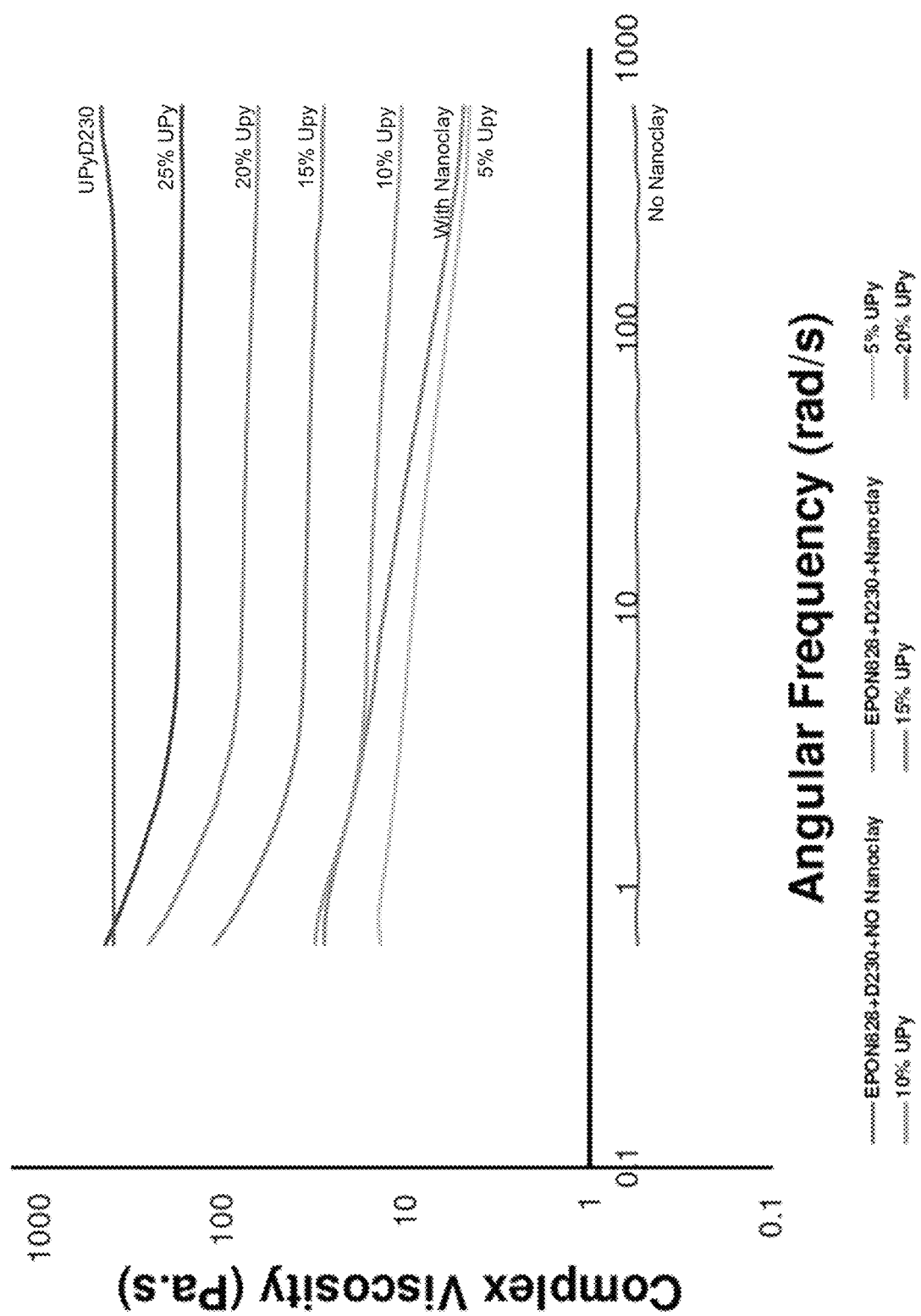
FIG. 23 shows overlay of shear complex viscosity as a function angular frequency of resins A-G obtained by oscillatory rheology experiments.
Figure 24:
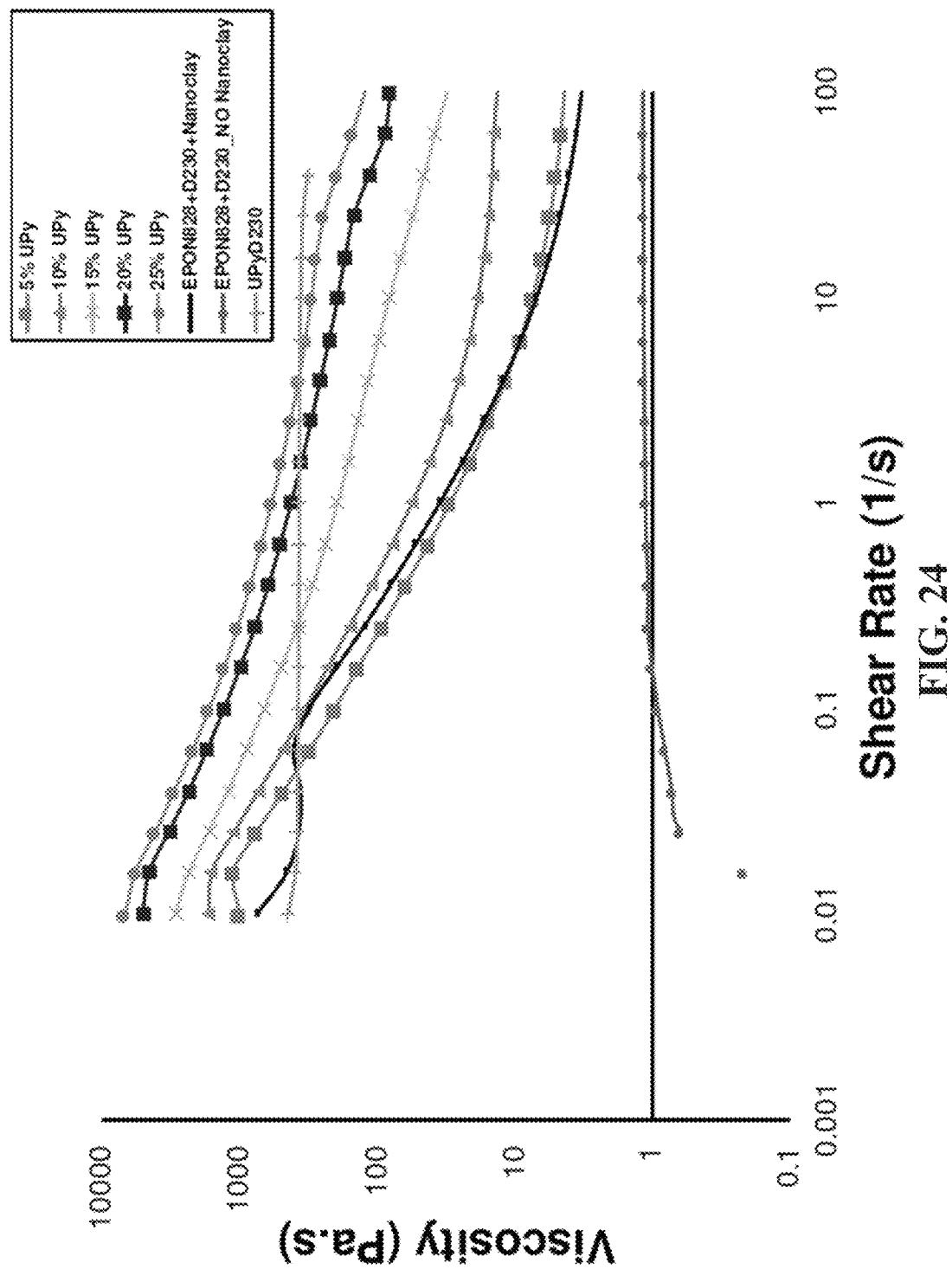
FIG. 24 shows flow sweep curves with increase and decrease shear rates, displaying hysteresis effects with increased UPyD230 content.
Figure 25:
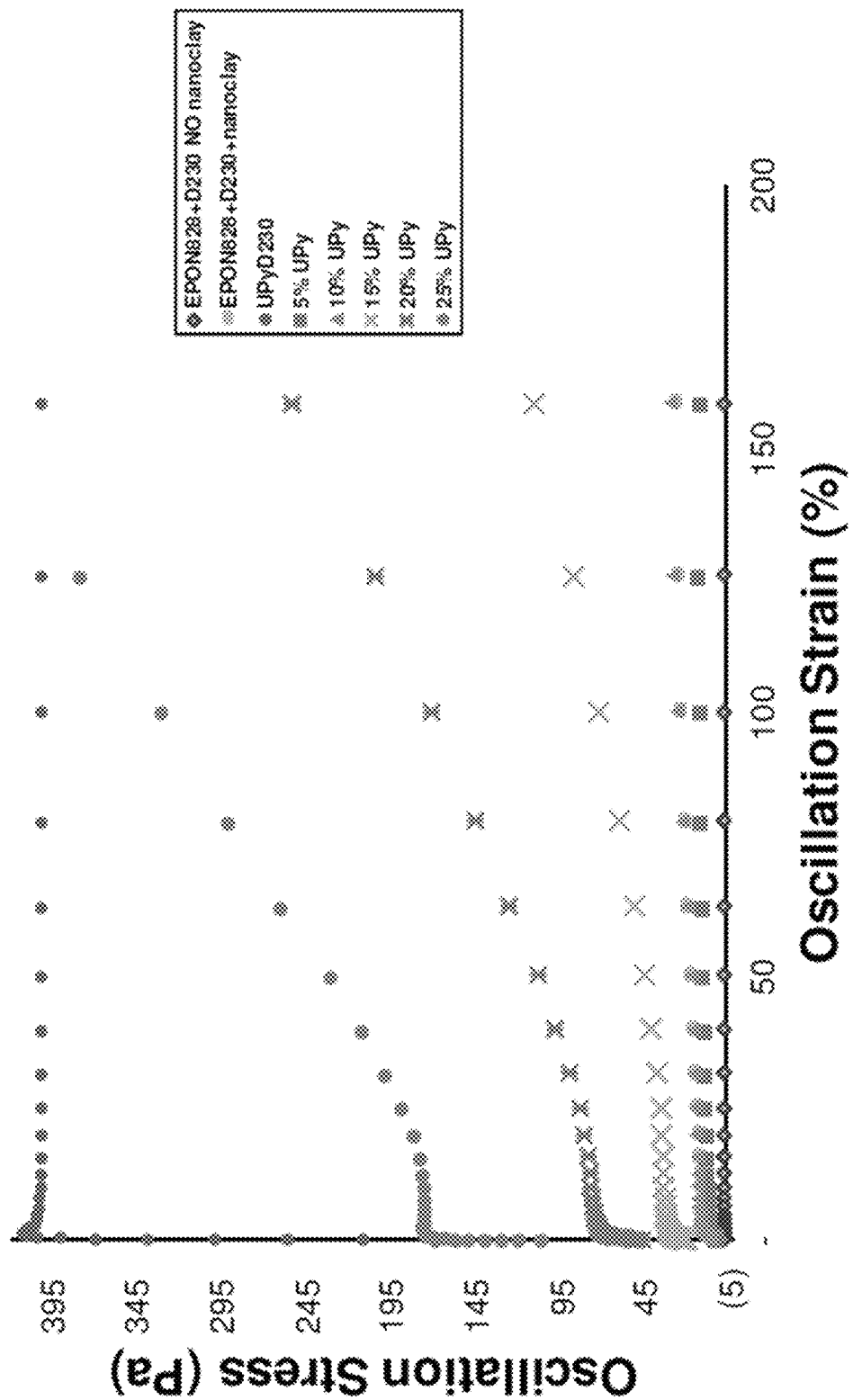
FIG. 25 shows shear stress versus strain curves obtained during oscillatory rheology experiments of resins A-G.

Shear-step experiments were also conducted to analyze the thixotropic behavior of the resins and to simulate shear effects before (Step I), during (Step II), and after (Step III) the printing process. In the experiments, changes in viscosity of Resin B and Resin G over three shear rates were analyzed with respect to time at room temperature (FIG. 21). Step I consisted of an applied shear rate of 0.1 $s^{-1}$ for a period of 60 s to simulate the initial state of the resin before printing. This shear rate is close to the Newtonian plateau for each of the resins tested (FIG. 16). During Step II, the shear rate was increased to 500 $s^{-1}$ for a period of 60 s to simulate the sheared resin during extrusion. Finally, the shear rate was reduced to 0.1 $s^{-1}$ again and held for a final 60 s simulating the resin after extrusion.

Resin B exhibits a decrease in viscosity upon increasing the shear rate from 0.1 to 500 $s^{-1}$, which can be attributed to disruption of nanoclay platelets. At high shear, the viscosity remains constant over the 60 s window indicating that the structure of the solution does not change appreciably over time at relatively high shear rates (i.e., no additional crosslinking or changes in entanglements). Upon removal of the high shear, the resin recovers its initial viscosity after approximately 60 s as the platelet-polymer interactions return to their initial state.

The initial viscosity of resin G is approximately two orders of magnitude higher than that of resin B, highlighting the effects of the addition of UPyD230. At high shear rate, the magnitude of the viscosity change is greater than that of resin B and a time-dependent decrease in viscosity is observed. This thixotropic behavior is indicative of a change in material structure due to the increased shear stresses experienced (i.e., breaking of hydrogen bonds and/or disentanglement of polymer chains). Upon lowering the shear rate to 0.1 $s^{-1}$ the viscosity quickly increases by about an order of magnitude and then gradually increases over the next 60 s as hydrogen bonds reform and polymer chains become entangled in the absence of shear. Addition of the UPyD230 enhances the thixotropic nature of the resins due to the fast recovery of direction UPy/UPy dimers and stabilization through additional hydrogen bonding interactions. Such behavior cannot be obtained in simple epoxy systems, for example, Epon™ 828 cured only with D230.

Example 8: Direct Ink Write 3D Printing of Supramolecular Thermosets

Figure 26:
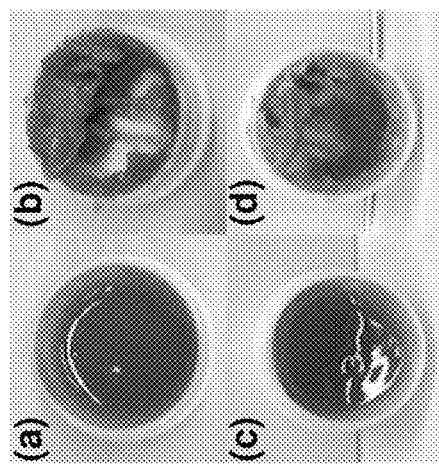
FIG. 26 shows resins B and G containing 0 mol. % and 25 mol. % UPyD230, respectively: (a) resin B placed flat on a surface, (b) resin G placed flat on a surface, (c) resin B tilted 90 degrees to surface, and (d) resin G tilted 90 degrees to surface.

From rheology studies, it was confirmed that the viscosity and yield strength of the material was increased with increasing molar concentrations of UPyD230.[48-50] Furthermore, the resin showed increased thixotropic behavior at 25 mol. % UPyD230, which was attributed to the fast reformation of hydrogen bonds in combination of the dispersion of nanoclay filler post-shear. Control Epon™ 828/D230 mixtures do not possess rheological properties required of DIW inks (i.e., shear-thinning, thixotropic character, yield strength, etc.). Upon the addition of nanoclay, this basic resin system shows viscoelastic character with increased viscosity, shear thinning, and an apparent yield strength, but the combined properties were not enough to produce 3D printed, self-supporting structures (FIG. 22-25). FIG. 26 displays shows how resin B (Epon828/D230/nanoclay) flow's upon tilting the container 90 degrees, whereas resin G (25 mol. % UPyD230) holds its shape, resisting flow.

Resin G (25 mol. % UPyD230) was used as a model system to explore the printability of the supramolecular resins using DIW 3D printing. Storage and loss modulus were measured over time at room temperature to determine an approximate time to gel. This enables a working window of the material upon mixing reactive components to be established. At 11 hours, the sample had overloaded the transducer of the rheometer, and the test was stopped. At this point, G' and G" were close to a crossover point, which is typically characteristic of the gel point, and hence significant cure.

Resin G was printed at room temperature directly upon mixing using a custom engineered DIW robotic deposition platform. The resin was extruded from a 10-mL syringe with a 1.19 mm diameter syringe tip at a rate of approximately 0.026 mL $s^{-1}$. The printed resin(s) were allowed to cure overnight at room temperature followed by 60° C. for 15 hours and 120° C. for 2 hours.

Figure 27:
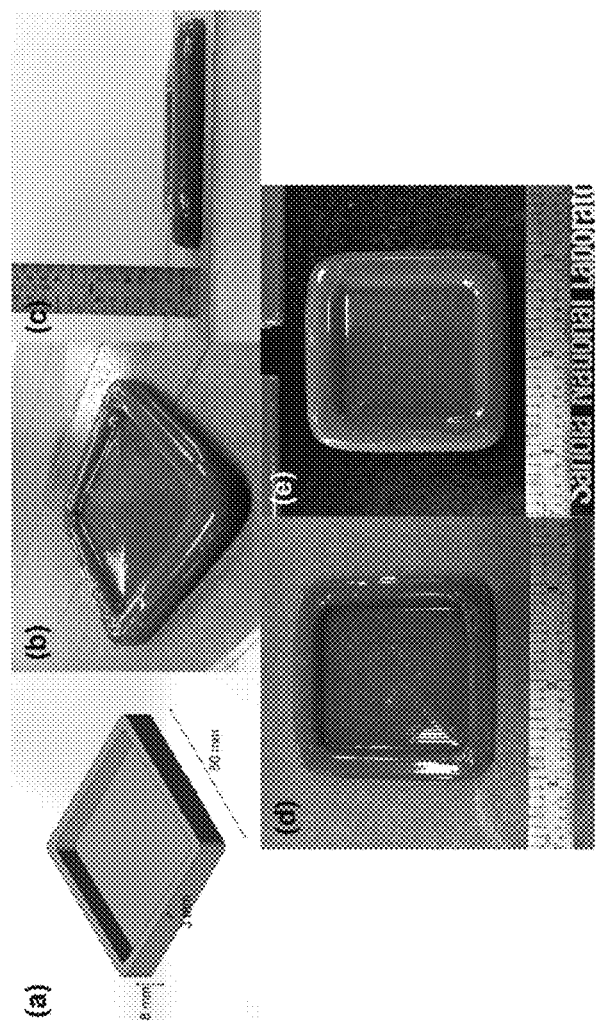
FIG. 27 shows DIW 3D printing of resin G (25 mol. % UPyD230): (a) solid build model, (b) 3 D printed part using resin G, (c) side view of part with scale, (d) top view of part with scale, and (f) final printed and cured part.
Figure 28:
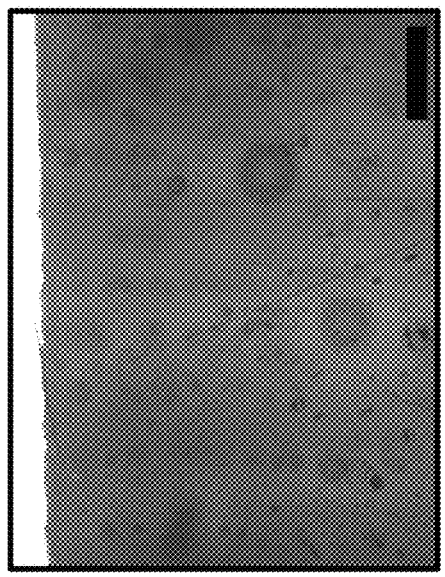
FIG. 28 shows an optical microscope image of 3D printed resin G. Scale bar is equal to 400 microns.

Multi-layer geometric structures could be printed with good shape fidelity when compared to solid build models with some sagging observed prior-to and post-cure (FIG. 27). Viscous flow may contribute to the global sagging of the part and is especially visible in FIG. 27(e) leading to a 2 mm decrease in height prior to cure. Incorporation of a fibrous filler may increase the storage modulus to allow for better part resolution. It is notable that the line features between layers are not as apparent after post cure (FIG. 27(e)). Visually, the pan(s) showed fast interlayer adhesion and the printed lines seemed to coalesce over time likely assisted by slow relaxation and limited viscous flow. Further, shear forces due to printing most likely expose free UPy groups at the surface of the filaments that, can form new hydrogen bonds between layers, akin to Velcro. Poor interlayer adhesion can lead to mechanical fracture sensitivity in the print-direction due to the anisotropy between printed layers. Enhanced, interlayer adhesion yields parts with more uniform mechanical properties and visually with better uniformity that do not need to be tooled post-print (FIG. 27(e) and optical microscope image in FIG. 28).

Example 9: Mechanical Characterization of Printed Specimens

Figure 29A:
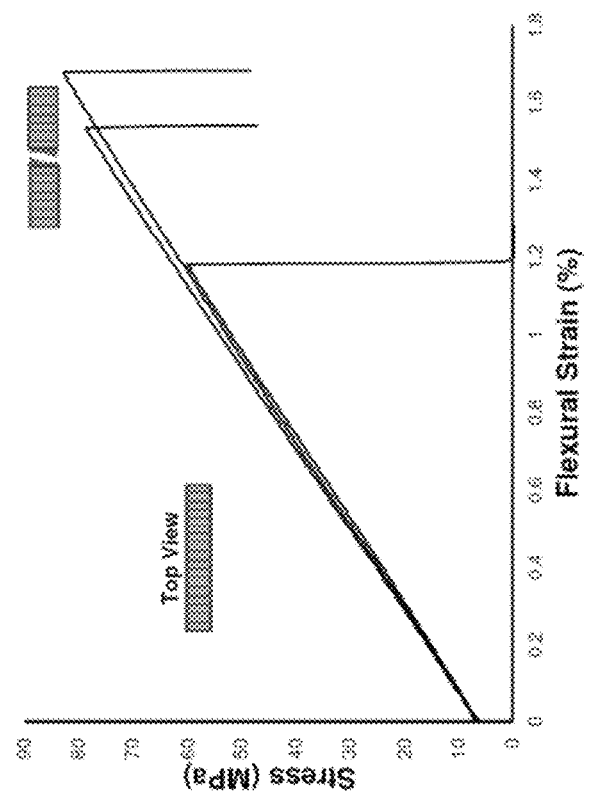
FIG. 29A-29B show stress-strain response curves (over three trials) of 3D printed resin G stressed (A) opposite the printing direction and (B) with the printing direction from a three-point bend test on specimens of about (1 in.)×(0.3 in.)×(0.1 in.) (l×w×h).
Figure 29B:
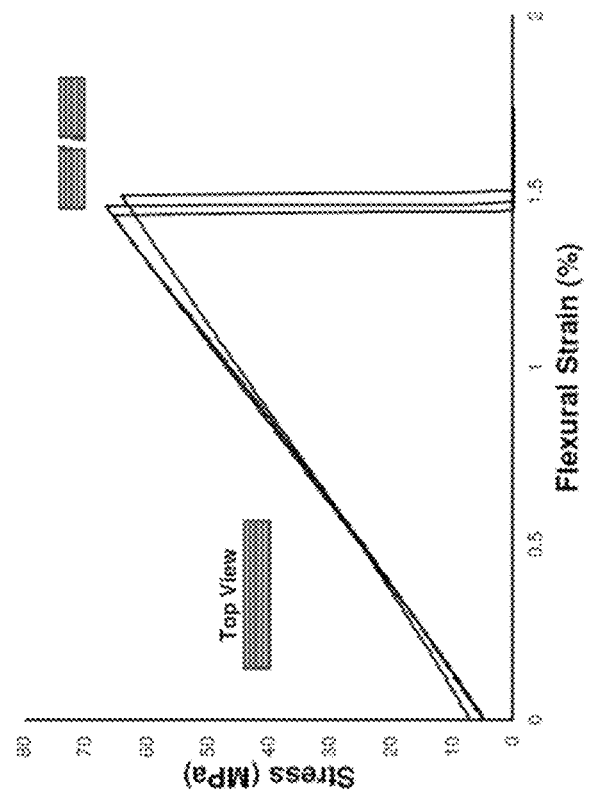

Printed samples were cut with and against the print direction into bars for mechanical testing using a three-point flexural test set-up to analyze the effects of inter-filament adhesion in the form of strain-to-break and Young's modulus derived from basic stress-strain response curves (FIG. 29A-29B). The Young's modulus of samples broken opposite and along the print direction 41.1±2.1. MPa and 46.5±1.1 MPa, respectively. The average maximum load when tested opposite and along the print direction were 43.66 and 47.60 N, respectively. Unlike many AM parts that show a drastic decrease in the mechanical properties when broken with the print direction, the mechanical strength of UPy containing parts are very comparable due to increased interlayer adhesion, which decreases anisotropy between layers.[51]

Figure 30:
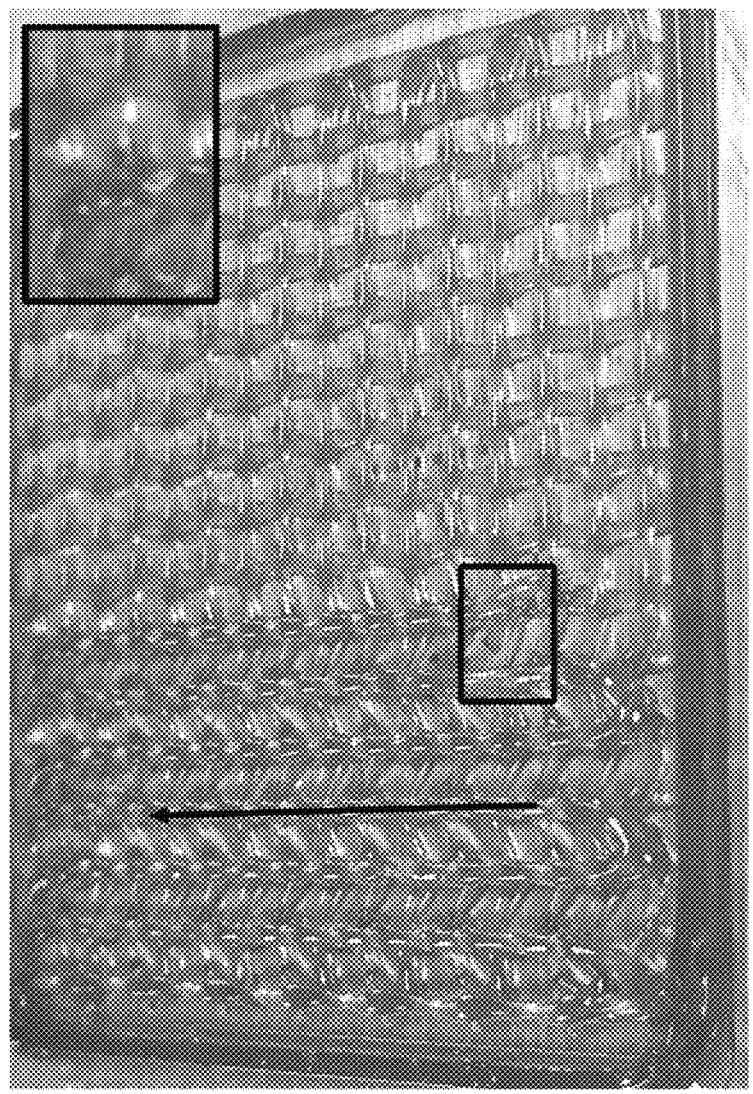
FIG. 30 shows a photograph of a 3D printing attempt of a lattice structure using resin G (25% UPyD230). Inset shows magnified image of a filament bridge. Arrow indicates the printing direction of the top-most layer.

Although interlayer adhesion is beneficial to producing more uniform parts, UPy/UPy interactions between layers did lead to some loss of resolution in the final part. Adhesion between layers led to a slight decrease in the diameter between filaments which globally resulted in a small amount of sagging (FIG. 27(e)). Inter-filament adhesion made printing lattice structures problematic due to pulling of base layers around tight turns and at perpendicular angles (FIG. 30). This pulling effect became more apparent with the deposition of more layers, presumably due to the combined strength of multiple hydrogen bonded layers and competing visco- and elasto-capillary forces.[52] The capillary bridge formed between two layers shows that the diameter of the fluid filament is not uniform across the bridge and decreases towards the midplane.[52] This is indicative of a visco-capillary regime where the capillary forces are balanced by the viscosity of the fluid.[52]

Figure 31:
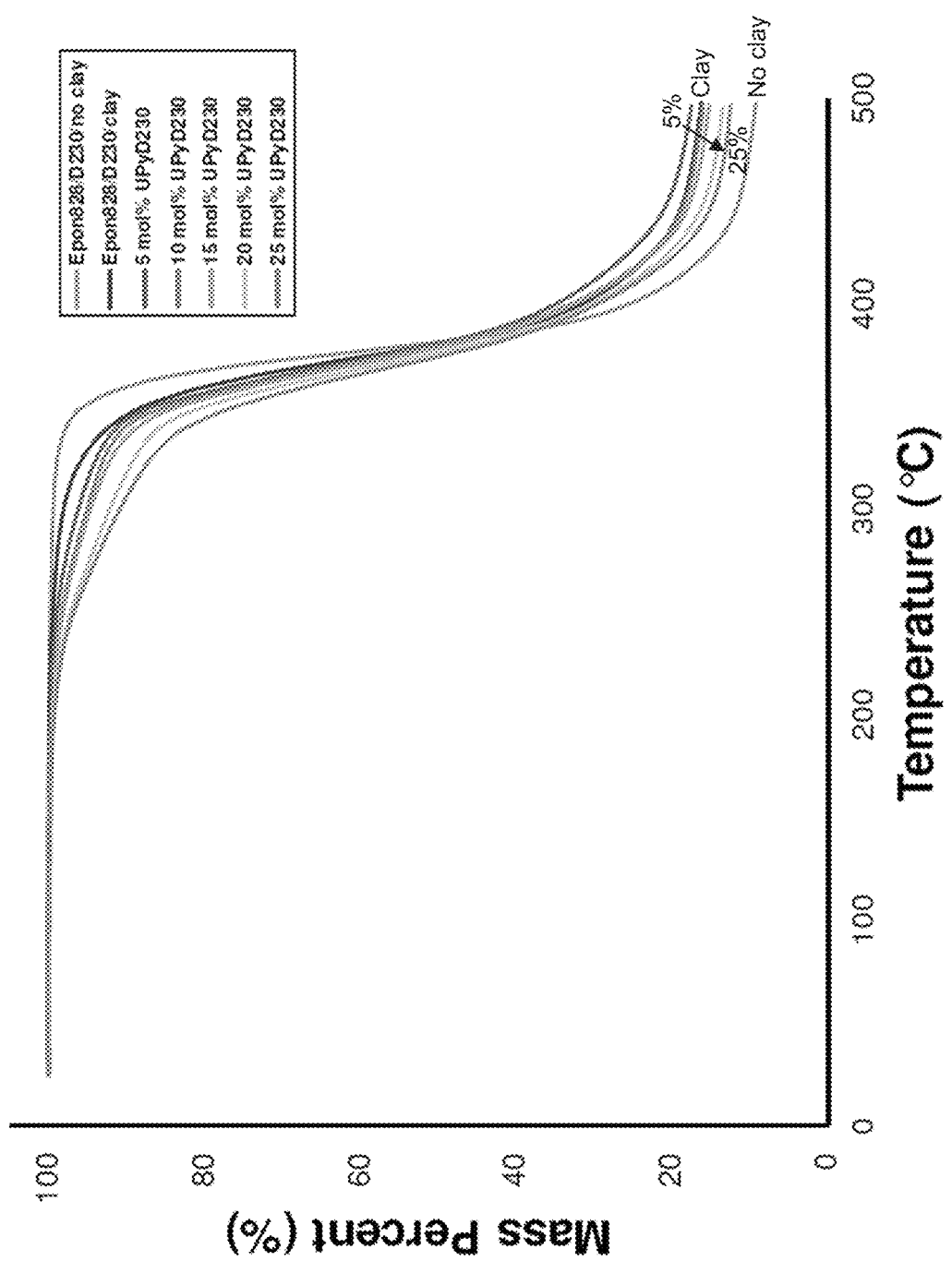
FIG. 31 shows TGA thermograms of mass loss versus temperature for of resin A-G. The resins were cured for 15 h at 60° C., followed by a 2 h post cure at 120° C. prior to analysis.
Figure 32:
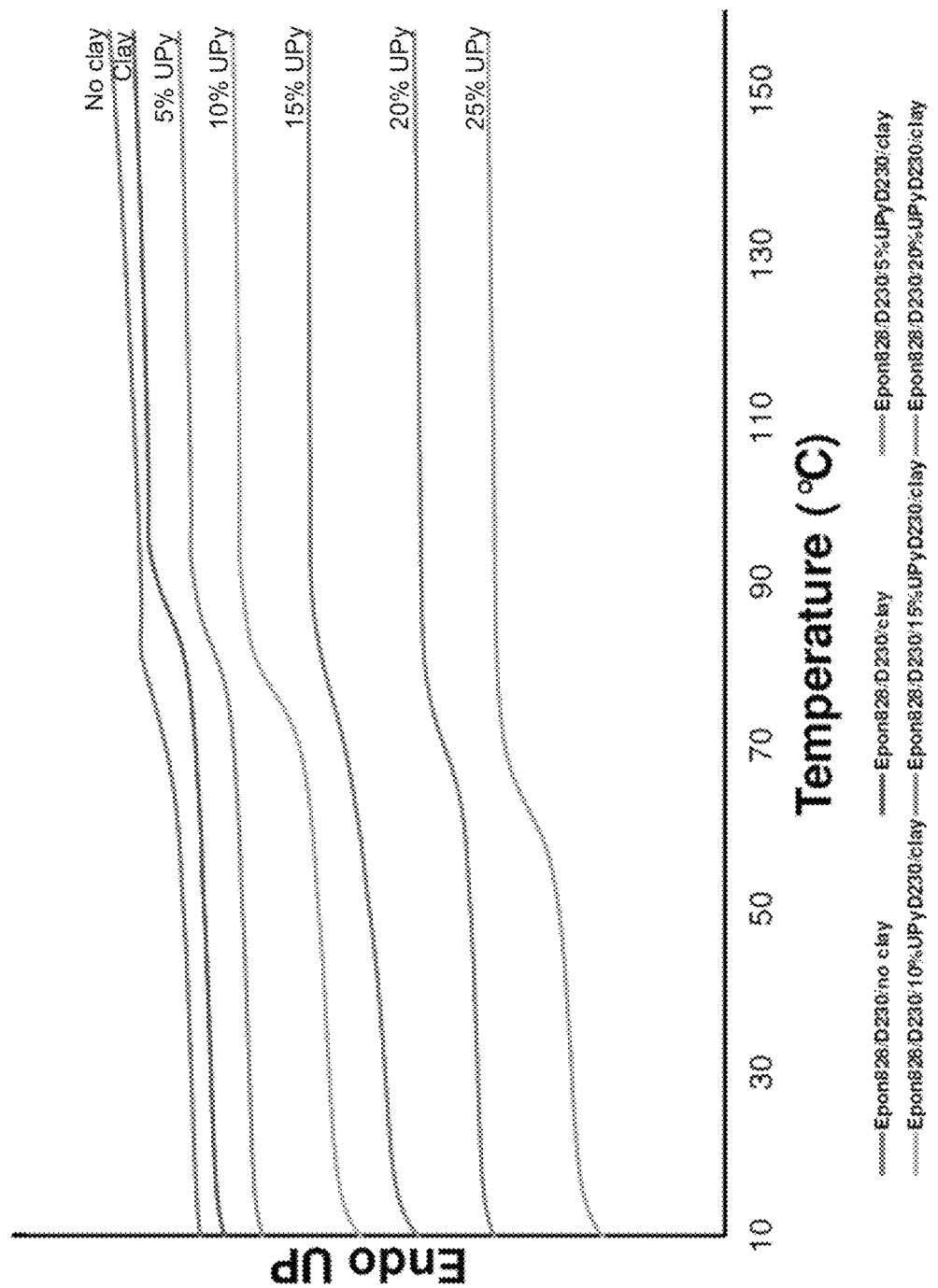
FIG. 32 shows DSC thermograms (second heating) of resin A-G. The resins were cured for 15 h at 60° C., followed by a 2 h post cure at 120° C. prior to analysis.
Figure 33:
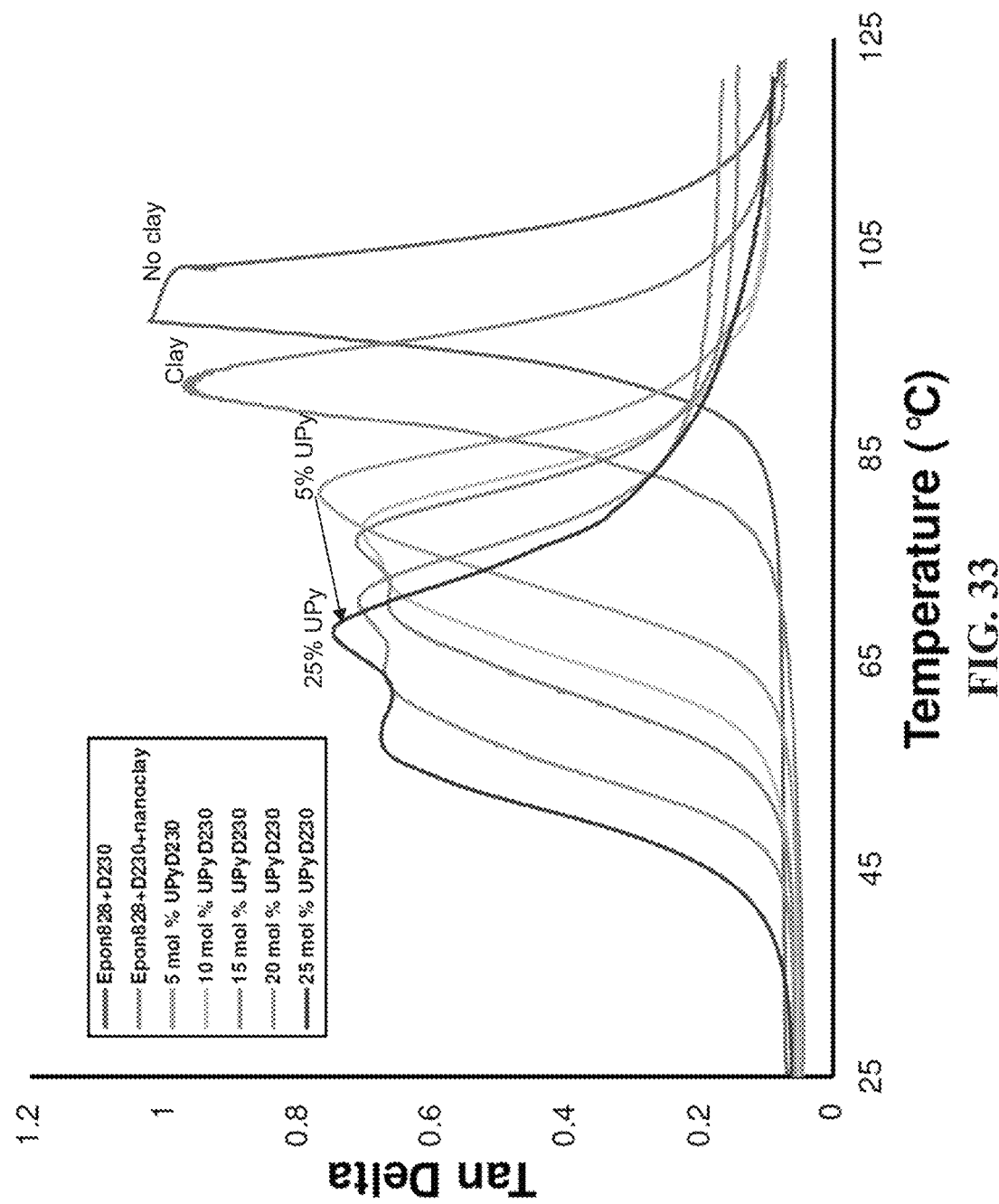
FIG. 33 shows tan delta versus temperature plot of resins A-G obtained using temperature-ramped DMA analysis. The peak maximum of the tan delta cure was used to determine the $T_g$. The resins were cured for 15 h at 60° C., followed by a 2 h post cure at 120° C.
Figure 34:
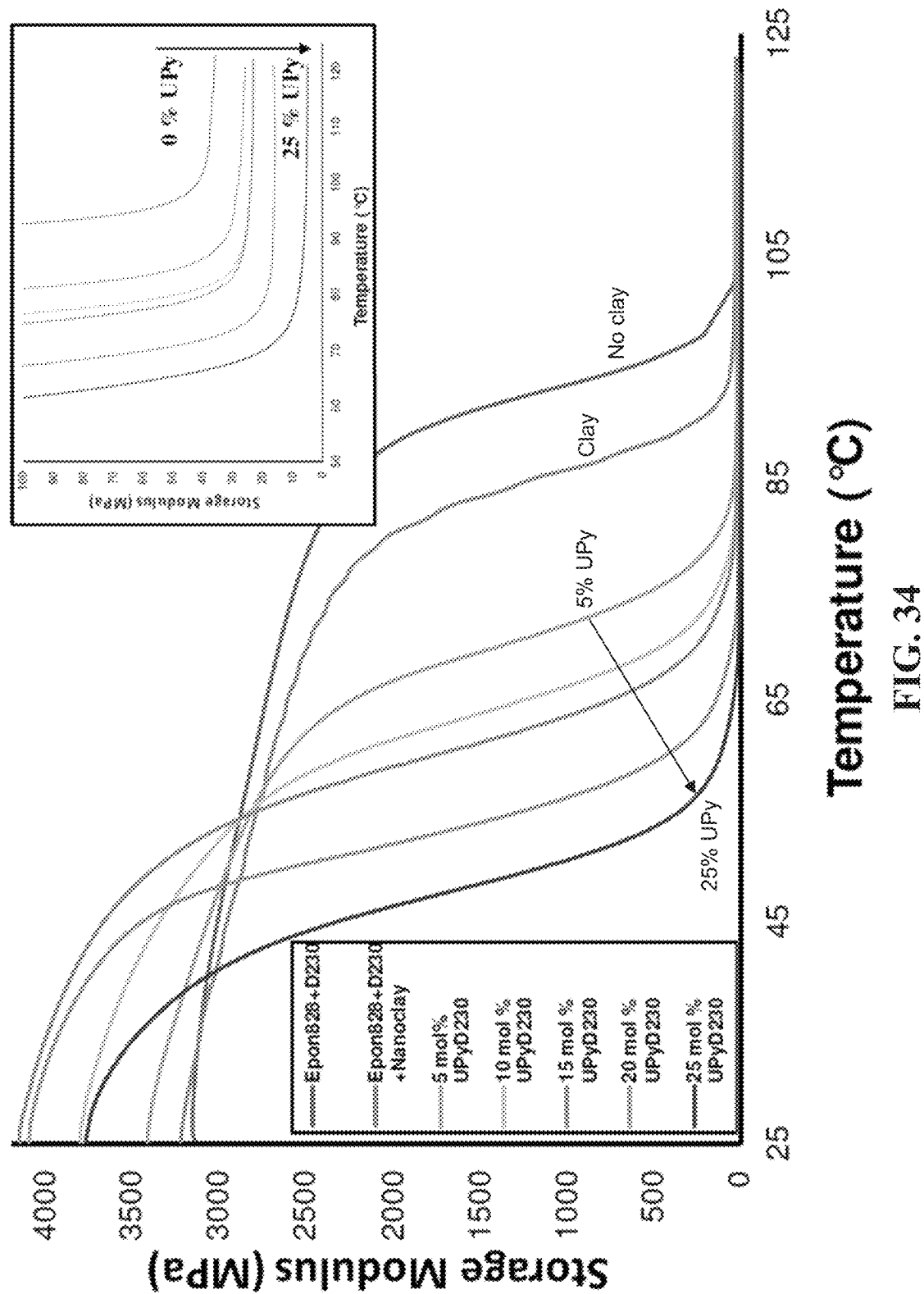
FIG. 34 shows the influence of incorporation of UPyD230 on the storage modulus from DMA scans.

DSC measurements were carried out by heating the samples to a maximum of 160° C. to prevent degradation. FIG. 31 displays the DSC thermograms corresponding to the second heating curve of the cured epoxy resins. When compared to the fully covalent resins (A and B), a decrease in the glass transition temperature ($T_g$) is observed with respect to increasing amount of UPyD230 (FIG. 31, Table 2). A decrease in $T_g$ with increasing incorporation of UPyD230 was also observed using DMA (FIGS. 33-34, Table 2).

TABLE 2

Formulations and thermal characterization of epoxy resins, including Cross model and power law parameters

| Resin | Epoxy Resin | D230 [eq] | UPyD230 [eq] | Ratio (E/NH) | UPyD230 (mol. %) | $T_g^a$ [° C.] | $T_g^b$ [° C.] | $T_g^c$ [° C.] |
|---|---|---|---|---|---|---|---|---|
| A | Epon828$^d$ | 1 | 0 | 1:1 | 0 | ≈90.0 | 97.8 | 102.7 |
| B | Epon828 | 1 | 0 | 1:1 | 0 | ≈90.0 | 91.2 | 84.3 |
| C | Epon828 | 0.9 | 0.1 | 1:1 | 5 | ≈85.0 | 82.1 | 69.9 |
| D | Epon828 | 0.8 | 0.2 | 1:1 | 10 | ≈80.0 | 78.7 | 63.9 |
| E | Epon828 | 0.7 | 0.3 | 1:1 | 15 | ≈75.0 | 77.4 | 59.3 |
| F | Epon828 | 0.6 | 0.4 | 1:1 | 20 | ≈70.0 | 71.5 | 52.2 |
| G | Epon828 | 0.5 | 0.5 | 1:1 | 25 | ≈60.0 | 68.4 | 47.6 |

Resins were cured at 60° C. for 15 h, followed by a post-cure at 120° C. for 2 h. Note that $T_g^a$ is the glass transition temperature based on the DSC second-heating curve; $T_g^b$ is the maximum tan δ; $T_g^c$ is the mid-point of E' obtained via DMA analysis; and Resin A does not contain nanoclay.

The printed resin G was analyzed by SEM to assess if the printing process had any affected on the underlying morphology. Images of the fracture surface appears generally rough akin the unprinted resins C-G, but with more smooth portions similar to resin B with no UPyD230, which were attributed to poor interactions between the nanoclay and resin. Phase separated material was also observed with similar fibrous nucleation comparable to the SEM image of Epon828/UPyD230 without nanoclay. We attribute the changes in morphology to the cure schedule for the printed part. The printed resins were cured overnight at room temperature in order to preserve part fidelity since increasing temperature would lower the viscosity due to loss of non-covalent interactions. The resin components could have phase separated to a degree over time due to a combination of competing interactions such as UPy/UPy related hydrogen bonding, clay-matrix interactions, and resin crosslinking. Despite vacuum mixing the resin prior to printing, morphological features were observed that indicate there was also significantly more air bubbles introduced into the resin during the printing process, which can weaken the mechanical properties as well as affect the rheological during extrusion.

Example 10: Glass Transition Temperature and Thermal Stability of the Cured Resins The effects of the incorporation of UPyD230 on the glass transition behavior and thermal stability of the cured epoxy resins were evaluated using thermogravimetric analysis (TGA), differential scanning calorimetry (DSC), and dynamic mechanical analysis (DMA). TGA analysis of the cured resins showed stability up to approximately 210° C. for all of the resins (FIG. 31). Increasing the amount of UPyD230 led to a greater mass loss in the early decomposition regime beyond 210° C., However, only 10% mass loss was observed at 300° C. in resin G (25 mol. % UPyD230), indicating that incorporation of the UPy motif does not drastically affect thermal stability.

Figure 35:
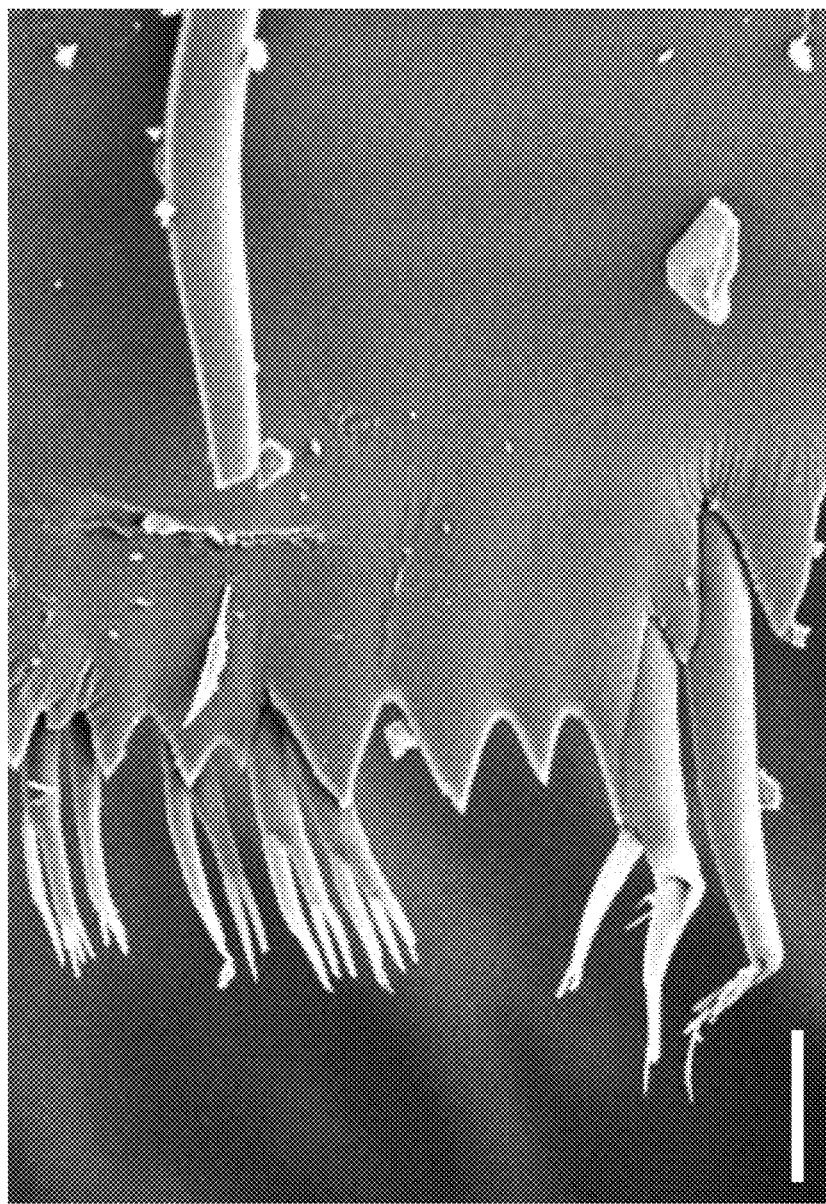
FIG. 35 shows an SEM image at fracture site of a 1:1 mixture of Epon™ 828:UPyD230 cured at 60° C. for 15 hours and 120° C. for 2 hours. This mixture does not contain nanoclay. Scale bar is 10 microns.
Figure 36:
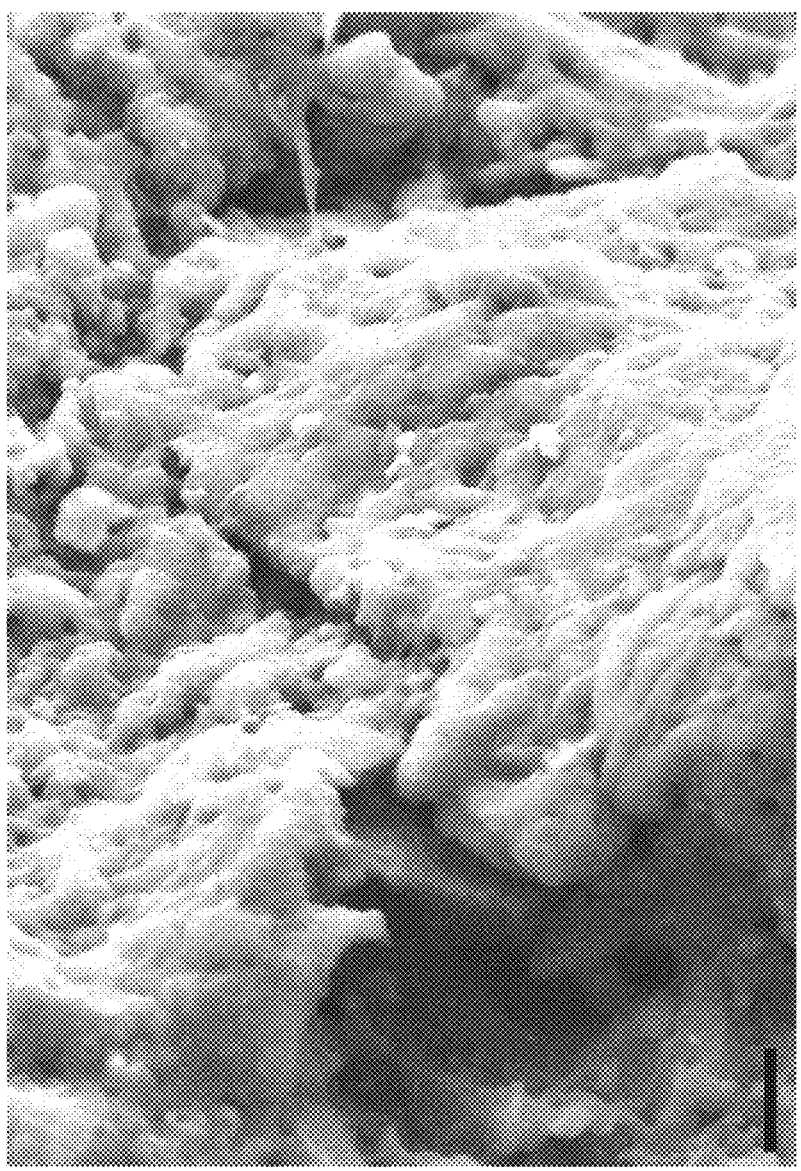
FIG. 36 shows an SEM image at fracture site of resin B (Epon™ 828/D230/nanoclay). Scale bar is 1 micron.

FIG. 33 displays the tan δ curves of the resins obtained using DMA. It is observable that resins D-G (10-25 mol. % UPyD23) display two maxima, indicative of a two-phase system. We attribute this phase separation behavior to the formation of ureidopyrimidinone clusters or domains. SEM analysis of the resins revealed further evidence for phase separation and is most clearly illustrated by the formation of fibril-like domains of up to approximately 5 microns in size in a cured mixture of 1:1 Epon™ 828/UPyD230 (devoid of nanoclay) (FIG. 35). Upon the addition of nanoclay, the fracture surface of control resin B displays flat surfaces and rough cracks around the aggregated nanoclay cluster due to poorly dispersed nanoclay agglomerations and filler/resin interactions (FIG. 36).[53] It is noteworthy that the day appeared more evenly dispersed in resins C-G (5-25% UPyD230) with rougher fracture surfaces, indicating UPyD230 may facilitate nanoclay dispersion due to non-covalent associations, increased surface area at the fracture site with additional hydrogen bonding may also lead to resin toughening, although this was not investigated in the current contribution.[34-56]

Example 11: Structural Characteristics of the Cross-Linked Network

DMA measurements were employed to determine the cross-link density of the cured resins and to understand the effects of the physical UPyD230 cross-links on the network structure (FIG. 34). DMA was used to determine the storage modulus (E'), loss modulus (E''), and tan δ as a function of temperature. The storage modulus at the maximum temperature was used to calculate the cross-link density values (XLD) and the molecular weight between crosslinks ($M_c$) (Table 3).[55] The storage modulus of the resins at room temperature does not change significantly with the incorporation of UPyD230, although there is an observed global increase in the storage modulus at room temperature in resins that contain UPyD230.

TABLE 3

Cross-link density values for various resins compositions.

| Resin | XLD [mol cm$^{-3}$] | M$_c$ [g mol$^{-1}$] |
|---|---|---|
| A[a] | 2.1 × 10$^{-3}$ | 472 |
| B | 3.7 × 10$^{-3}$ | 268 |
| C | 2.7 × 10$^{-3}$ | 373 |
| D | 2.4 × 10$^{-3}$ | 423 |
| E | 2.4 × 10$^{-3}$ | 415 |
| F | 1.7 × 10$^{-3}$ | 591 |
| G | 5.1 × 10$^{-4}$ | 1959 |

[a]This resin does not contain nanoclay.

This could be attributed to an increase in the overall cross-link density by the combination of physical and chemical crosslinks. The onset temperature of the glass transition was lower with respect to increasing UPyD230 content, consistent with the $T_g$ trends reported in Table 2. Further, breadth of the glass transition region was also narrower for samples containing greater amounts of UPyD230 (i.e., the tan delta peaks become narrower with greater amounts of UPyD230). At room temperature, any hydrogen bonding maintained in the resin, post-cure, would increase the overall crosslink density, leading to an increased storage modulus. The greatest cross-link density was observed for resin B, which contained zero UPyD230 content. The crosslink density drastically decreased with increasing amounts of UPyD230, despite there being a greater ratio of physical to chemical cross-links (XX % decrease in XLD when UPyD230 content increases front X to Y).

At elevated temperatures, however, breaking of hydrogen bonds would allow for increased polymer chain mobility. Most importantly, the effective crosslink density decreased with increasing amounts of UPyD230, despite there being more physical than chemical crosslinks. Greater crosslink density typically leads to an increase in the $T_g$ of a material. A decrease in the crosslink density could account for the lower $T_g$ of the materials containing UPyD230. The $M_c$ values also indicate the molecular weight between crosslinks is increased with increasing percentages of UPyD230, which may also yield a lowered $T_g$ due to increased chain mobility.

Example 12: Self-Healing Behavior

Figure 37:
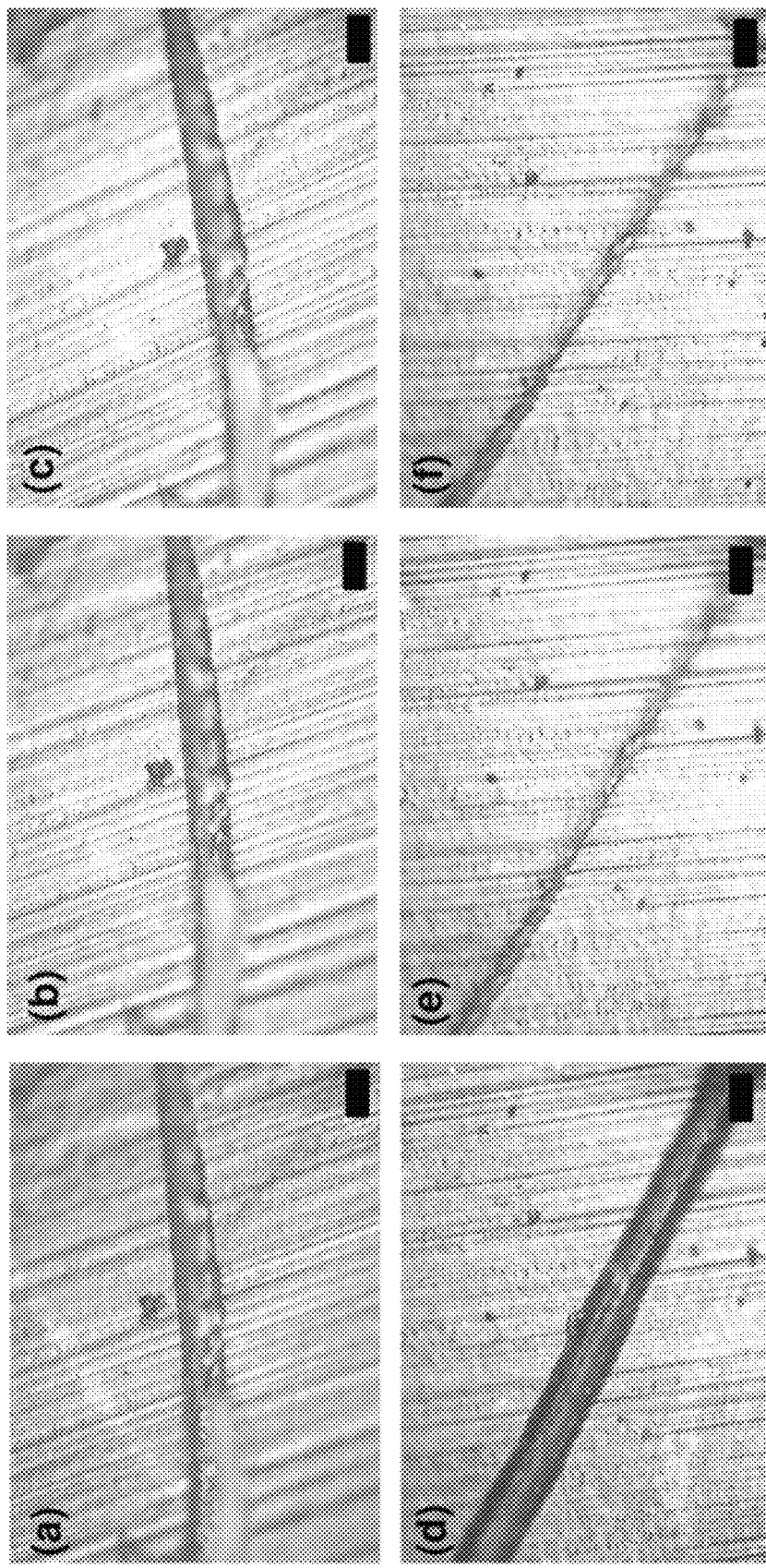
FIG. 37 shows optical microscope images of notched resins B and G: (a) resin B at room temperature, (b) resin B at room temperature after heating at 80° C. for 15 minutes, (c) resin B at room temperature after heating at 80° C. for 45 minutes, (d) resin G at room temperature, (e) resin G at room temperature after heating at 80° C. for 15 minutes, and (f) resin G at room temperature after heating at 80° C. for 45 minutes. Scale bar is equal to 100 microns.

In many examples, the incorporation of hydrogen bonding interactions into a material has been well-reported to yield self-healing properties.[55-60] Hydrogen bonding interactions have been incorporated into a variety of thermosetting material, producing self-healing character.[55] In order to preliminarily assess the self-healing behavior of the composite, a notch of ≈100 μm width and ≈60 μm depth was created on the material with compositions of 0% UPyD230 (resin B) and 25% UPyD230 (resin G) and examined by optical microscopy (FIG. 37).

The progress of self-healing was monitored at room temperature for approximately 1 hour, whereupon no change was observed. The resins were heated to 80° C. in order to induce disassembly of UPy/UPy associations[61] and observed at room temperature after 15 and 45 minutes. No visible changes were observed in the notch of the control resin B (Resin B was also heated above the $T_g$ for 1 hour; and no visible changes to the notch were observed by optical microscopy). Resin G containing 25% UPyD230 showed partial healing of the notch after 15 minutes that remained the same after 45 minutes. We expect that this healing behavior will not only affect the healing of damage, but also the recovery of the initial mechanical properties. Future studies can include, e.g., probing how UPy content, temperature, humidity and thermal history affect the self-healing behavior of these materials.

Overall, described herein is a novel dually-functional ureidopyrimidinone curative (UPyD230), which was incorporated into an epoxy-amine thermoset in order to investigate its effects on tuneability of rheological behavior towards 3D printing, as well as general material properties. UPyD230 was incorporated in various molar concentrations and confirmed to possess good reactivity with the commercial resin system. IR spectroscopy studies revealed the network to have multiple hydrogen bonding interactions in combination to UPy/UPy dimers and that temperature and crosslinking affected the fidelity of H-bonds. The $T_g$ of the materials decreased with increasing UPy content with evidence of phase separation as well as a lower crosslink density, displaying that UPyD23G can be used to control temperature-related properties of thermoset materials. Preliminary studies also revealed UPy resins to possess self-healing properties as observed by optical microscopy, which may be applicable to various applications, including encapsulant technologies.

Various rheological properties were investigated towards developing DIW printable inks, such as shear-thinning, yield stress, viscosity, and thixotropic behavior. UPyD230 was found to significantly increase the viscosity and apparent yield stress of the resins. The resins also display thixotropic behavior at greater concentrations of UPyD230. These studies reveal that incorporation of self-assembling ureidopyrimidinone cans be as rheology modifiers towards DIW 3D printing applications. More generally, self-assembly can be exploited as an alternative means toward tunable viscoelastic behavior in currently unprintable resins.

A resin containing 25 mol. % of UPyD230 possessed a rheological profile amendable to DIW printing. Multi-layer structures were able to be fabricated with fairly good retention of build models. Sagging was observed in the final parts and lattice structures were unable to be printed due to interlayer adhesive forces as well as modulus properties. Although we were unable to fabricate high aspect ratio parts, these studies highlight the potential for incorporating supramolecular interactions into the printing process and how supramolecular interactions can be useful for obtaining good interlayer adhesion between printed filament. This proof of principle study highlights the potential utility of incorporating supramolecular interactions into the 3D printing process and may prove modular by careful selection of the strength, type, and orthogonality to resin chemistries in order to exploit properties inherent to self-assembly independent to resin crosslinking. Future studies can include, e.g., optimizing the structure as well as the architecture of the UPy curative in order to further analyze the effects on rheology towards 3 D printing, without the cost of lower temperature stability of the final cured resin. We also hope to achieve 3D printability without the use of nanoclay and hope that structural modification of the UPy curative will increase its ability to homogenize with commercial resins.

REFERENCES FOR EXAMPLE 1

1. Lehn J M, *Supramolecular Chemistry: Concepts and Perspectives*, Wiley-VCH: Weinheim, Germany, 1995 (271 pp.).
2. Prins L J et al., "Noncovalent synthesis using hydrogen bonding," *Angew. Chem. Int. Ed.* 2001; 70:2382-426.

3. Brunsveld L et al., "Supramolecular polymers," *Chem. Rev.* 2001; 702:4071-98.
4. Yang L et al., "Supramolecular polymers: historical development, preparation, characterization, and functions," *Chem. Rev.* 2015; 775:7196-239.
5. Monemian S et al., "Exploring the role of supramolecular associations in mechanical toughening of interpenetrating polymer networks," *Macromolecules* 2015; 75:7146-55.
6. Monemian S et al., "Probing the interplay of ultraviolet cross-linking and noncovalent interactions in supramolecular elastomers," *Macromolecules* 2014; 77:5633-42.
7. Ligon S C et al., "Polymers for 3D printing and customized additive manufacturing," *Chem. Rev.* 2017; 777:10212-90.
8. Bosman A W et al., "Supramolecular polymers at work," *Mater. Today* 2004; 7:34-9.
9. Yu R et al., "Three-dimensional printing of shape memory composites with epoxy-acrylate hybrid photopolymer," *ACS Appl. Mater. Interfaces* 2017; 9:1820-9.
10. Shi Q et al., "Recyclable 3D printing of vitrimer epoxy," *Mater. Horizons* 2017; 7:598-607.
11. Compton B G et al., "3D-printing of lightweight cellular composites," *Adv. Mater.* 2014; 26:5930-5.
12. Yan X et al., "Dendronized organoplatinum(II) metallacyclic polymers constructed by hierarchical coordination-driven self-assembly and hydrogen-bonding interfaces," *J. Am. Chem. Soc.* 2013; 755:16813-6.
13. Zhou Z et al., "Engineering functionalization in a supramolecular polymer: hierarchical self-organization of triply orthogonal non-covalent interactions on a supramolecular coordination complex platform," *J. Am. Chem. Soc.* 2016; 735:806-9.
14. Kushner A M et al, "Biomimetie design of reversibly unfolding cross-linker to enhance mechanical properties of 3D network polymers," *J. Am. Chem. Soc.* 2007; 729:14110-1.
15. Xiao T et al, "Novel self-assembled dynamic [2]catenanes interlocked by the quadruple hydrogen bonding ureidopyrimidinone motif," *Chem. Sci.* 2012; 3:1417-21.
16. Folmer B J B et al., "Supramolecular polymer materials: chain extension of telechelic polymers using a reactive hydrogen-bonding synthon," *Adv. Mater,* 2000; 72:874-8.
17. Guo M et al., "Tough stimuli-responsive supramolecular hydrogels with hydrogen-bonding network junctions," *J. Am. Chem. Soc.* 2014; 736:6969-77.
18. Appel W P J et al, "Aggregation of ureido-pyrimidinone supramolecular thermoplastic elastomers into nanofibers: a kinetic analysis," *Macromolecules* 2011; 99:6776-84.
19. Chai Z Y et al., "High impact resistance epoxy resin by incorporation of quadruply hydrogen bonded supramolecular polymers," *Chinese J. Polym. Sci.* 2016; 39:850-7,
20. Beijer F H et al., "Strong dimerization of ureidopyrimidones via quadruple hydrogen bonding,"*J. Am. Chem. Soc.* 1998; 720:6761-9.
21. Söntjens S H M et al., "Stability and lifetime of quadruply hydrogen bonded 2-ureido-4[1H]-pyrirnidinone dimers,", *J. Am. Chem. Soc.* 2000; 722:7487-93.
22. SupraPolix B V, Eindhoven, the Netherlands, see, e.g., suprapolix.com/.
23. Pekkanen A M et al., "3D printing polymers with supramolecular functionality for biological applications," *Biomacromolecules* 2017; 75:2669-87.
24. Hart L R et al., "3D printing of biocompatible supramolecular polymers and their composites," *ACS Appl. Mater. Interfaces* 2016: 5:3115-22.
25. Aida T et al., "Functional supramolecular polymers," *Science* 2012; 335:813-7.
26. Balkenende D W R et al., "Epoxy resin-inspired reconfigurable supramolecular networks," *Macromolecules* 2016; 99:7877-885.
27. Li F et al., "Multi-responsive wrinkling patterns by the photoswitchable supramolecular network," *ACM Macro Lett.* 2017; 6:848-53.
28. Comi M et al., "Adaptive bio-based polyurethane elastomers engineered by ionic hydrogen bonding interactions," *Eur. Polym. J.* 2017; 91:408-19.
29. Callies X et al., "Combined effect of chain extension and supramolecular interactions on rheological and adhesive properties of acrylic pressure-sensitive adhesives," *ACS Appl. Mater. Interfaces* 2016; 5:33307-15.
30. Heinzmann C et al., "Supramolecular polymer adhesives: advanced materials inspired by nature," *Chem. Soc. Rev.* 2016; 95:342-58.
31. Teunissen A J P et al., "Supramolecular polymerization of a ureidopyrimidinone-based [2]catenane prepared via ring-closing metathesis," *J. Polym. Sci. A Polym. Chem.* 2017:55:2971-6.

REFERENCES FOR EXAMPLES 2-12

1. Lewis J A, "Direct ink writing of 3D functional materials," *Adv. Functional Mat.* 2006; 76:2193-204.
2. Yu R et al., "Three-dimensional printing of shape memory composites with epoxy-acrylate hybrid photopolymer," *ACS Appl. Mater. Interfaces* 2017; 9:1820-9.
3. Lebel L L et al., "Ultraviolet-assisted direct-write fabrication of carbon nanotube/polymer nanocomposite microcoils," *Adv. Mater.* 2010; 22:592-6.
4. Griffini G et al., "3D-printable CFR polymer composites with dual-cure sequential IPNs," *Polymer* 2016; 91: 174-9.
5. Shi Q et al, "Recyclable 3D printing of vitrimer epoxy," *Mater. Horizons* 2017; 4:598-607.
6. Compton B G et al., "3D-printing of lightweight cellular composites," *Adv. Mater.* 2014; 26:5930-5.
7. Lewicki J P et al., "3D-Printing of meso-structurally ordered carbon fiber/polymer composites with unprecedented orthotropic physical properties," *Sci. Rep.* 2017; 7: Art. 43401 (14 pp.)
8. Chandrasekaran S et al., "3D printing of high performance cyanate ester thermoset polymers," *J. Mater. Chem. A* 2018; 6:853-8.
9. Chen K et al., "Fabrication of tough epoxy with shape memory effects by U V-assisted direct-ink write printing," *Soft Matter* 2018; 74:1879-86.
10. Hmeidat N S et al., "High-strength epoxy nanocomposites for 3D printing," *Composites Sri. Technol.* 2018; 760:9-20.
11. Compton B G et al., "Electrical and mechanical properties of 3D-printed graphene-reinforced epoxy," *JOM* 2018; 70:292-7.
12. Folmer B J B et al., "Supramolecular polymer materials: chain extension of telechelic polymers using a reactive hydrogen-bonding synthon," *Adv. Mater.* 2000; 72:874-8.
13. Appel W P J et al., "Aggregation of ureido-pyrimidinone supramolecular thermoplastic elastomers into nanofibers: a kinetic analysis," *Macromolecules* 2011; 44:6776-84,
14. Chai Z Y et al., "High impact resistance epoxy resin by incorporation of quadruply hydrogen bonded supramolecular polymers," Chinese *J. Polym. Sci.* 2016; 34:850-7,
15. Beijer F H et al., "Strong dimerization of ureidopyrimidones via quadruple hydrogen bonding," *J. Am. Chem. Soc.* 1998; 720:6761-9.

16. Sontjens S B M et al., "Stability and lifetime of quadruply hydrogen bonded 2-ureido-4[1H]-pyrimidinone dimers,", *J. Am. Chem. Soc.* 2000; 722:7487-93.
17. Bang J et al., "Facile routes to patterned surface neutralization layers for block copolymer lithography," *Adv. Mater.* 2007; 79:4552-7.
18. Xu D et al., "Mechanism of shear thickening ins reversibly cross-linked supramolecular polymer networks," *Macromolecules* 2010; 73:3556-65.
19. Bosnian A W et al., "Supramolecular polymers at work," *Mater. Today* 2004; 7:34-9.
20. Pekkanen A M et al., "3D printing polymers with supramolecular functionality for biological applications," *Biomacromolecules* 2017; 75:2669-87.
21. Hart L R et al., "3D printing of biocompatible supramolecular polymers and their composites," *ACS Appl. Mater. Interfaces* 2016; 3:3115-22.
22. Ligon S C et al., "Polymers for 3D printing and customized additive manufacturing," *Chem. Rev.* 2017; 777:10212-90.
23. Li L et al., "Hierarchical co-assembly enhanced direct ink writing," *Angew. Chem. Jut. Ed* 2018; 57:5105-9; *Angew. Chem.* 2018; 730:5199-230.
24. Balkenende D W R et al., "Epoxy resin-inspired reconfigurable supramolecular networks," *Macromolecules* 2016; 79:7877-885.
25. Li F et al., "Multi-responsive wrinkling patterns by the photoswitchable supramolecular network," *ACS Macro Lett.* 2017; 6:848-53.
26. Comi M et al., "Adaptive bio-based polyurethane elastomers engineered by ionic hydrogen bonding interactions," *Eur. Polym. J.* 2017; 97:408-19.
27. Callies X et al., "Combined effect of chain extension and supramolecular interactions on rheological and adhesive properties of acrylic pressure-sensitive adhesives," *ACS Appl. Mater. Interfaces* 2016; 5:33307-15.
28. Heinzmann C et al., "Supramolecular polymer adhesives: advanced materials inspired by nature," *Chem. Soc. Rev.* 2016; 75:342-58.
29. Celina M et al., "An overview of high temperature micro-ATR IR spectroscopy to monitor polymer reactions," *Polymer* 2012; 53:4461-71.
30. Meis N N A H et al., "Extreme wet adhesion of a novel epoxy-amine coating on aluminum alloy 2024-T3," *Prog. Org. Coatings* 2014; 77:176-83.
31. Alexander A M et al., "Probing the solvent-induced tautomerism of a redox-active ureidopyrimidinone," *Chem. Commun.* 2007; (22):2246-8.
32. Lam C K et al., "Effect of ultrasound sonication in nanoclay clusters of nanoclay/epoxy composites," *Mater. Lett.* 2005; 59:1369-72.
33. Kim B C et al., "Fracture toughness of the nano-particle reinforced epoxy composite," *Composite Struct.* 2008; 56:69-77.
34. Ho M W et al., "Mechanical properties of epoxy-based composites using nanoclays," *Composite Struct.* 2006; 75:415-21.
35. Chan M L et al., Mechanism of reinforcement in a nanoclay/polymer composite," *Composites B Eng.* 2011: 72:1708-12.
36. Zhu B et al., "Hierarchical nacre mimetics with synergistic mechanical properties by control of molecular interactions in self-healing polymers," *Angew. Chem. Int. Ed* 2015; 57:8653-7.
37. Zhu B et al., "Light-adaptive supramolecular nacre-mimetic nanocomposites," *Nano Lett.* 2016; 76:5176-82.
38. Coleman M M et al., "Hydrogen bonding in polymers. 4. Infrared temperature studies of a simple polyurethane," *Macromolecules* 1986; 79:2149-57.
39. Lee H S et al., "Spectroscopic analysis of phase separation behavior of model polyurethanes," *Macromolecules* 1987; 20:2089-95.
40. Lortie F et al., "N,N'-disubstituted ureas: influence of substituents on the formation of supramolecular polymers," *Chemistry* 2003; 9:3008-14,
41. Cross M M, "Rheology of non-Newtonian fluids: a new flow equation for pseudoplastic systems,", *J. Colloid Sci.* 1965; 20:417-37.
42. van Beek D J M et al., "Unidirectional dimerization and stacking of ureidopyrimidinone end groups in polycaprolactone supramolecular polymers," *Macromolecules* 2007; 70:8464-75.
43. Lewis C L et al, "Synthesis, swelling behavior, and viscoelastic properties of functional poly(hydroxyethyl methacrylate) with ureidopyrimidinone side-groups," *Soft Matter* 2013; 9:4058-66.
44. Elkins C E et al., "Synthesis and characterization of poly(2-ethylhexyl methacrylate) copolymers containing pendant, self-complementary multiple-hydrogen-bonding sites," *J. Polym. Sci. A* 2005; 75:4618-31.
45. Folmer B J B et al., "Polymeric materials based on reversible supramolecular assemblies," in Proceedings of the Polymer Processing Society; 15th annual meeting (PPS-15), held in 's-Hertogenbosch, The Netherlands, from 31 May 31-4 Jun. 1999.
46. Teunissen A J P et al., "Mechanically induced gelation of a kinetically trapped supramolecular polymer," *Macromolecules* 2014; 47:8429-36,
47. Cravotto G et al., "Molecular self-assembly and patterning induced by sound waves: the case of gelation," *Chem. Soc. Rev.* 2009; 35:2684-97.
48. Nesaei S et al., "Additive manufacturing with conductive, viscoelastic polymer composites: direct-ink-writing of electrolytic and anodic poly(ethylene oxide) composites," *J. Manuf. Sci. Eng.* 2017; 757:Art. 111004 (12 pp.),
49. Ladd C et al., "3D Printing of free standing liquid metal microstructures," *Adv. Mater.* 2013; 25:5081-5.
50. Lewis J A et al., "Direct ink writing of three-dimensional ceramic structures," *J. Am. Ceram. Soc.* 2006; 59:3599-609.
51. Stansbury J W et al., "3D printing with polymers: challenges among expanding options and opportunities," *Dent. Mater.* 2016; 32:54-64.
52. Jaishankar A et al., "Probing hydrogen bond interactions in a shear thickening polysaccharide using nonlinear shear and extensional rheology," *Carbohydr. Polym.* 2015; 723: 136-45,
53. Kim D H et al., "Waterproof characteristics of nanoclay/ epoxy nanocomposite in adhesively bonded joints," *Composites B Eng.* 2013; 55:86-95.
54. Krushnamurty K et al., "Effect of nanoclay on the toughness of epoxy and mechanical, impact properties of E-glass-epoxy composites," *Adv. Mater. Lett.* 2015; 6:684-9.
55. Villani M et al., "Superior relaxation of stresses and self-healing behavior of epoxy-amine coatings," *RSC Adv.* 2016; 6:245-59.
56. Natarajan B et al., "Binary cellulose nanocrystal blends for bioinspired damage tolerant photonic films," *Adv. Functional Mater.* 2018; 25:Art. 1800032 (11 pp.).
57. Yang L et al., "Supramolecular polymers: historical development, preparation, characterization, and functions," *Chem. Rev.* 2015; 775:7196-239.

58. Brunsveld L et al., "Supramolecular polymers," *Chem. Rev.* 2001; 707:4071-98.
59. Yoon J et al., "Thermochromic block copolymer photonic gel," *Macromolecules* 2008; 47:4582-4.
60. Herbst F et al., "Self-healing polymers via supramolecular, hydrogen-bonded networks." in *Self-healing polymers; from principles to applications* (W H Binder, ed.), 2013 (Wiley-VCH Verlag GmbH & Co. KGaA, Weinheim, Germany), Chapter 11 (pp, 273-300),
61. Houston K R et al., "Supramolecular engineering polyesters: endgroup functionalization of glycol modified PET with ureidopyrimidinone," *Polym. Chem.* 2016; 7:6744-51.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method comprising:
   providing a formulation comprising:
   (i) an epoxy monomer comprising one or more epoxy groups;
   (ii) a self-assembly monomer comprising a structure of formula (I) or (Ia):

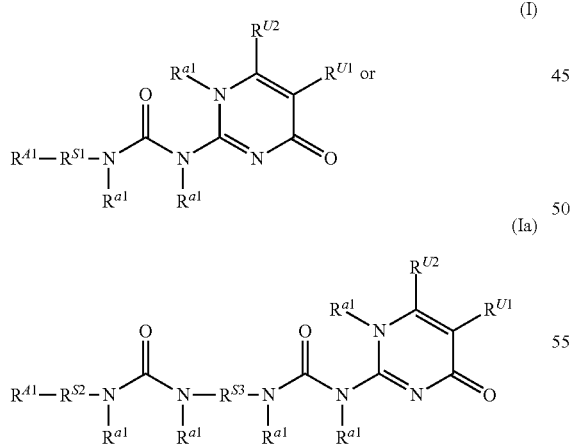

or a salt thereof, wherein:
   each of $R^{U1}$ and $R^{U2}$ is, independently, H, optionally substituted alkyl, optionally substituted heteroalkyl, optionally substituted aryl, or optionally substituted alkaryl,
   each of $R^{a1}$ is, independently, H or optionally substituted alkyl, each of $R^{S1}$, $R^{S2}$, and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, and each of $R^{A1}$ is, independently, a reactive moiety configured to react with the one or more epoxy groups of the epoxy monomer;

(iii) a curative monomer comprising one or more reactive moieties configured to react with the one or more epoxy groups of the epoxy monomer; and (iv) an optional filler;

printing a structure with the formulation at a first temperature of from about 20° C. to about 40° C., thereby providing a printed structure; and curing the printed structure at a second temperature that is greater than the first temperature, thereby providing a cured structure.

2. The method of claim 1, wherein each of $R^{A1}$ in the self-assembly monomer is, independently, an amino.

3. The method of claim 1, wherein a ratio of a number of the one or more epoxy groups and a number of reactive moieties of the self-assembly monomer and the curative monomer are of from about 4:1 to 1:4.

4. A method comprising:
   providing a formulation comprising:
   (i) an epoxy monomer comprising one or more epoxy groups;
   (ii) a self-assembly monomer comprising a structure of formula (IV-1), (IV-2), (IV-3), (V-1), (V-2), (V-3), (VI-1), (VI-2), (VI-3)

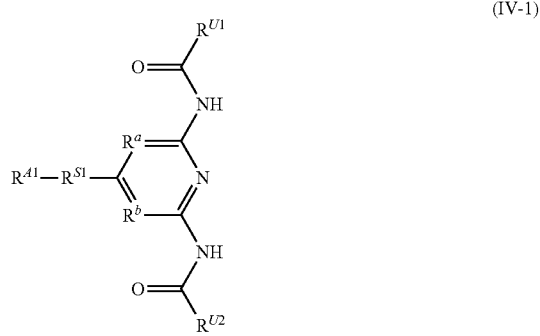

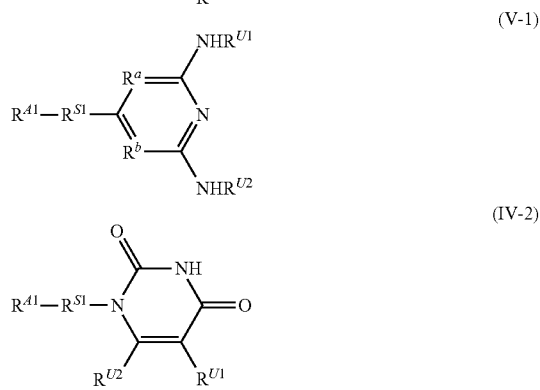

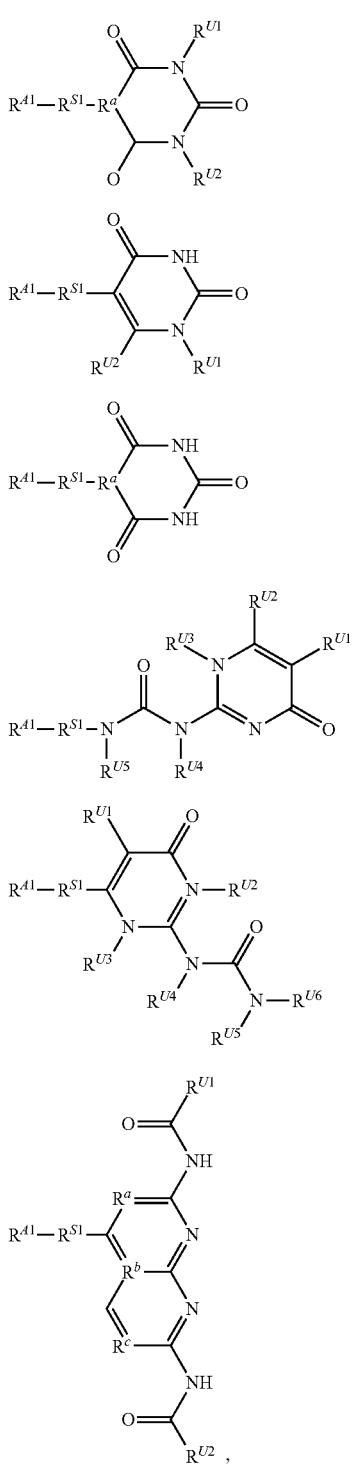

or a salt thereof, and wherein:

each of $R^{U1}$, $R^{U2}$, $R^{U3}$, $R^{U4}$, $R^{U5}$, and $R^{U6}$ is, independently, H, optionally substituted alkyl, optionally substituted heteroalkyl, optionally substituted aryl, or optionally substituted alkaryl;

$R^{S1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof;

each of $R^a$, $R^b$, and $R^c$ is, independently, $-CR^d-$ or $-N-$, wherein $R^d$ is H, optionally substituted alkyl, optionally substituted heteroalkyl, optionally substituted aryl, or optionally substituted alkaryl; and each of $R^{A1}$ is, independently, a reactive moiety configured to react with one or more epoxy groups of the epoxy monomer; and wherein the self-assembly monomer comprises at least one hydrogen-bond donating primary or secondary amine and at least one hydrogen-bond accepting carbonyl group or pyridine-based moiety to facilitate intermolecular reversible hydrogen bonding; and (iii) a curative monomer comprising one or more reactive moieties configured to react with one or more epoxy groups of the epoxy monomer;

printing a structure with the formulation at a first temperature of from about 20° C. to about 40° C., thereby providing a printed structure; and curing the printed structure at a second temperature that is greater than the first temperature, thereby providing a cured structure.

5. The method of claims 4 or 1, wherein the curative monomer comprises a structure of formula (II), (IIa), or (IIb):

$$R^{A2}-(R^{C1})_{c1}-R^{A3}, \quad (II)$$

$$R^{A2}-(R^{C2})_{c2}-(R^{C3})_{c3}-R^{A3}, \quad (IIa)$$

$$R^{A2}-(R^{C2})_{c2}-\underset{\underset{R^{A4}}{\overset{(R^{C4})_{c4}}{|}}}{\overset{R^C}{\underset{|}{C}}}-(R^{C3})_{c3}-R^{A3}, \quad (IIb)$$

or a salt thereof, and wherein:

each of $R^{C1}$, $R^{C2}$, $R^{C3}$, and $R^{C4}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof;

$R^C$ is, independently, H, optionally substituted alkyl, optionally substituted heteroalkyl, optionally substituted aryl, or optionally substituted alkaryl;

each of c1, c2, c3, and c4 is, independently, a number of from about 1 to about 500; and each of $R^{A2}$, $R^{A3}$, and $R^{A4}$ is, independently, H, optionally substituted alkyl, or a reactive moiety, in which at least one of $R^{A2}$ and $R^{A3}$ and $R^{A4}$ is a reactive moiety.

6. The method of claims 4 or 1, wherein the epoxy monomer comprises a structure of formula (III), (IIIa), (IIIb), or (IIIc):

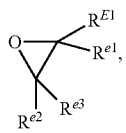 (III)

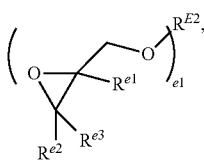 (IIIa)

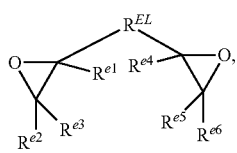 (IIIb)

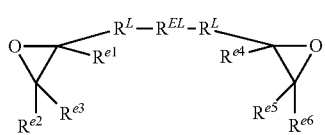 (IIIc)

or a salt thereof, and wherein:
  each of $R^{E1}$ and $R^{E2}$ is, independently, a moiety including one or more epoxy groups, optionally substituted alkyl, optionally substituted alkoxyalkyl, optionally substituted aryloxyalkyl, haloalkyl, optionally substituted aryl, or optionally substituted aryloxy;
  each of $R^{e1}$, $R^{e2}$, $R^{e3}$, $R^{e4}$, $R^{e5}$, and $R^{e6}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl;
  e1 is, independently, a number of from about 1 to about 500;
  $R^{EL}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof; and
  each $R^L$ is, independently, optionally substituted alkylene, optionally substituted alkenylene, optionally substituted heteroalkylene, thio, oxy, optionally substituted alkyleneoxy, or optionally substituted thioalkylene.

7. The method of claim 1, wherein the second temperature is of from about 30° C. to about 130° C.

8. The method of claim 7, further comprising:
  treating the cured structure at a third temperature that is greater than the second temperature, thereby providing a fully cured structure.

9. The method of claim 8, wherein the third temperature is of from about 80° C. to about 150° C.

10. The method of claims 4 or 1, further comprising a filler.

11. The method of claim 10, wherein the filler comprises clay, nanoclay, montmorillonite clay, silica, glass, carbon fiber, titanium oxide, aluminum oxide, barium sulfate, calcium carbonate, barium titanate, silicon oxide, talc, hydrotalcite, and/or mica.

12. The method of claims 4 or 1, wherein the self-assembly monomer is present at an amount of from about 1 mol. % to about 30 mol. % of the combined epoxy monomer, self-assembly monomer, and curative monomer.

13. A method comprising:
  providing a formulation comprising:
  (i) an epoxy monomer comprising a structure of formula (III):

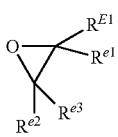 (III)

or a salt thereof, wherein:
  $R^{E1}$ is a moiety including one or more epoxy groups, optionally substituted alkyl, optionally substituted alkoxyalkyl, optionally substituted aryloxyalkyl, haloalkyl, optionally substituted aryl, or optionally substituted aryloxy; and
  each of $R^{e1}$, $R^{e2}$, and $R^{e3}$ is, independently, H, optionally substituted alkyl, optionally substituted heteroalkyl, optionally substituted aryl, or optionally substituted alkaryl, or in which each of $R^{e1}$ and $R^{e2}$ or $R^{e2}$ and $R^{e3}$, taken together, form an optionally substituted cycloalkyl or an optionally substituted heterocyclyl;
  (ii) a self-assembly monomer comprising a structure of formula (I) or (Ia):

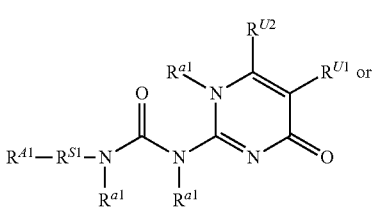 (I)

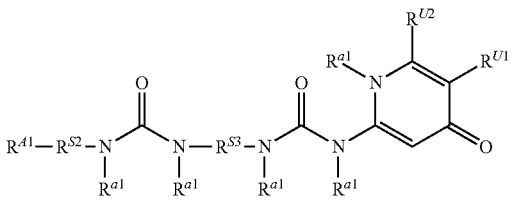 (Ia)

or a salt thereof, wherein:
  each of $R^{U1}$ and $R^{U2}$ is, independently, H, optionally substituted alkyl, optionally substituted heteroalkyl, optionally substituted aryl, or optionally substituted alkaryl,
  each of $R^{a1}$ is, independently, H or optionally substituted alkyl,
  each of $R^{S1}$, $R^{S2}$, and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, and each of $R^{A1}$ is, independently, a reactive moiety configured to react with the one or more epoxy groups of the epoxy monomer;

(iii) a curative monomer comprising a structure of formula (II):

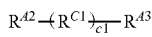
(II)

or a salt thereof, wherein:

$R^{C1}$ is optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, or a combination thereof;

c1 is a number of from about 1 to about 500; and each of $R^{A2}$ and $R^{A3}$ is, independently, H, optionally substituted alkyl, or a reactive moiety, in which at least one of $R^{A2}$ and $R^{A3}$ is a reactive moiety configured to react with the one or more epoxy groups of the epoxy monomer; and (iv) an optional filler; and wherein the formulation comprises from about 10 wt. % to about 90 wt. % of the epoxy monomer;

from about 5 wt. % to about 40 wt. % of the self-assembly monomer;

from about 2 wt. % to about 15 wt. % of the curative monomer; and from about 5 wt. % to about 60 wt. % of the filler; and printing a structure with the formulation at a first temperature of from about 20° C. to about 40° C. thereby providing a printed structure; and curing the printed structure at a second temperature that is greater than the first temperature, thereby providing a cured structure.

14. The method of claim 13, wherein each of $R^{A1}$ in the self-assembly monomer is, independently, an amino.

15. The method of claim 14, wherein each of $R^{A2}$ and $R^{A3}$ in the curative monomer is, independently, an amino.

16. The method of claim 13, wherein a ratio of a number of the one or more epoxy groups and a number of reactive moieties of the self-assembly monomer and the curative monomer are of from about 4:1 to 1:4.

17. A method comprising:

providing a formulation comprising:

(i) an epoxy monomer comprising one or more epoxy groups;

(ii) a self-assembly monomer comprising a structure of formula (I) or (Ia):

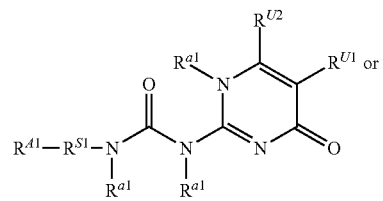
(I)

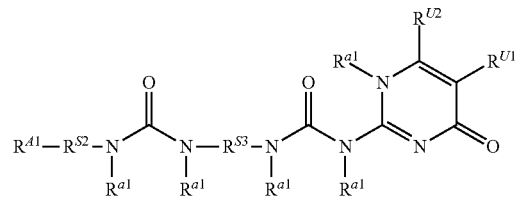
(Ia)

or a salt thereof, wherein:

each of $R^{U1}$ and $R^{U2}$ is, independently, H, optionally substituted alkyl, optionally substituted heteroalkyl, optionally substituted aryl, or optionally substituted alkaryl, each of $R^{a1}$ is, independently, H or optionally substituted alkyl, each of $R^{S1}$, $R^{S2}$, and $R^{S3}$ is, independently, optionally substituted alkylene, optionally substituted heteroalkylene, optionally substituted alkyleneoxy, optionally substituted heteroalkyleneoxy, optionally substituted arylene, optionally substituted aryleneoxy, an ether subunit, an arylether subunit, a polyethylene glycol subunit, or a combination thereof, and each of $R^{A1}$ is, independently, a reactive moiety configured to react with the one or more epoxy groups of the epoxy monomer;

(iii) a curative monomer comprising one or more reactive moieties configured to react with the one or more epoxy groups of the epoxy monomer; and (iv) an optional filler;

treating the formulation under a first stimulus, thereby providing a treated formulation;

printing a structure with the treated formulation, thereby providing a printed structure; and curing the printed structure with a second stimulus, thereby providing a cured structure.

18. The method of claim 17, wherein the first stimulus comprises exposure to a first temperature of from about 30° C. to about 130° C.; the second stimulus comprises exposure to an ultraviolet light or to a second temperature of from about 30° C. to about 130° C., in which the second temperature is greater than the first temperature.

* * * * *